US012673578B2

(12) United States Patent
Sato et al.

(10) Patent No.: US 12,673,578 B2
(45) Date of Patent: Jul. 7, 2026

(54) COMPARISON SYSTEM, INFORMATION PROCESSING DEVICE, COMPARISON METHOD, AND COMPUTER-READABLE STORAGE MEDIUM

(71) Applicant: HONDA MOTOR CO., LTD., Tokyo (JP)

(72) Inventors: Takao Sato, Saitama (JP); Takahito Fujita, Saitama (JP); Takashi Iwasa, Saitama (JP); Yuichi Futamura, Saitama (JP); Shinya Agatsuma, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 387 days.

(21) Appl. No.: 18/264,936

(22) PCT Filed: Feb. 10, 2022

(86) PCT No.: PCT/JP2022/005370
§ 371 (c)(1),
(2) Date: Aug. 10, 2023

(87) PCT Pub. No.: WO2022/172998
PCT Pub. Date: Aug. 18, 2022

(65) Prior Publication Data
US 2024/0051427 A1      Feb. 15, 2024

(30) Foreign Application Priority Data
Feb. 12, 2021      (JP) ................................. 2021-021310

(51) Int. Cl.
*B60L 53/80*          (2019.01)
*B60L 3/00*           (2019.01)
(Continued)

(52) U.S. Cl.
CPC ............. *B60L 53/80* (2019.02); *B60L 3/0046* (2013.01); *B60L 50/64* (2019.02); *B60L 53/53* (2019.02);
(Continued)

(58) Field of Classification Search
CPC ........ B60L 53/80; B60L 53/53; B60L 3/0046; B60L 50/64; B60L 53/63; B60L 53/67;
(Continued)

(56) References Cited

U.S. PATENT DOCUMENTS

2014/0101463 A1* 4/2014 Ju ............................. G06F 1/26
                                                  713/300
2018/0286609 A1  10/2018 Chang
(Continued)

FOREIGN PATENT DOCUMENTS

JP       H11259709 A       9/1999
JP       2010237187 A      10/2010
JP       2018160073 A      10/2018

OTHER PUBLICATIONS

International Search Report and Written Opinion (ISA/237) of the International Search Authority for International Patent Application No. PCT/JP2022/005370, mailed by the Japan Patent Office on Apr. 19, 2022.

*Primary Examiner* — Rodney A Butler

(57) ABSTRACT

A comparison system includes: a first acquisition unit which acquires a first input/output electrical power amount of a first electrical power device including a first terminal, the first input/output electrical power amount being an input/output electrical power amount more on a side of the first electrical power device than the first terminal; a second acquisition unit which acquires a second input/output electrical power amount of a second electrical power device including a second terminal attachable to the first terminal, the second input/output electrical power amount being an (Continued)

100 input/output electrical power amount more on a side of the second electrical power device than the second terminal; and a comparison unit which compares the first input/output electrical power amount and the second input/output electrical power amount when input/output of electrical power is performed between the first and second electrical power device while the first and second terminal are attached to each other.

18 Claims, 15 Drawing Sheets

(51) Int. Cl.

| | |
|---|---|
| *B60L 50/64* | (2019.01) |
| *B60L 53/53* | (2019.01) |
| *B60L 53/63* | (2019.01) |
| *B60L 53/67* | (2019.01) |
| *B60L 53/68* | (2019.01) |
| *B60L 58/16* | (2019.01) |
| *G06Q 50/06* | (2024.01) |
| *G07C 5/00* | (2006.01) |
| *H01M 10/44* | (2006.01) |
| *H01M 10/48* | (2006.01) |
| *H02J 7/00* | (2026.01) |
| *H02J 7/02* | (2016.01) |

(52) U.S. Cl.
CPC ............... *B60L 53/63* (2019.02); *B60L 53/67* (2019.02); *B60L 53/68* (2019.02); *B60L 58/16* (2019.02); *G06Q 50/06* (2013.01); *G07C 5/006* (2013.01); *H01M 10/44* (2013.01); *H01M 10/48* (2013.01); *H02J 7/00* (2013.01); *H02J 7/02* (2013.01)

(58) Field of Classification Search
CPC ......... B60L 53/68; B60L 58/16; G07C 5/006; G06Q 50/06; H01M 10/44; H01M 10/48; H02J 7/00; H02J 7/02
See application file for complete search history.

(56) References Cited

U.S. PATENT DOCUMENTS

| | | |
|---|---|---|
| 2019/0013628 A1 | 1/2019 | Zhang |
| 2020/0018800 A1 | 1/2020 | Oshima |

* cited by examiner

100

110

112

510

710

<u>246</u>

STATE MANAGEMENT
UNIT

840

CONNECTION
MANAGEMENT UNIT

INDIVIDUAL INDEX
DETERMINATION UNIT          842

GENERAL INDEX
DETERMINATION UNIT          844

CONNECTION STATE
DETERMINATION UNIT          846

CONNECTION ANOMALY
DETECTION UNIT          862

CONTROL SIGNAL
OUTPUT UNIT          864

MESSAGE OUTPUT UNIT          866

250

3000

COMPARISON SYSTEM, INFORMATION PROCESSING DEVICE, COMPARISON METHOD, AND COMPUTER-READABLE STORAGE MEDIUM

BACKGROUND

1. Technical Field

The present invention relates to a comparison system, an information processing device, a comparison method, and a computer-readable recording medium.

2. Related Art

A charging device that charges a portable battery and supplies the charged battery according to a user request is known. Patent Document 1 discloses that, when an anomaly of the charging device is detected, an operation rate of the charging device is adjusted. Patent Document 2 discloses that first, fully-charged batteries are lent out in order from a battery that has been fully charged earliest, and when there are no more fully-charged batteries, the remaining batteries are lent out in order from a battery in a state closest to the fully-charged state.

PRIOR ART DOCUMENT

Patent Documents

Patent Document 1: Japanese Patent Application Publication No. 2018-160073
Patent Document 2: Japanese Patent Application Publication No. H11-259709

DESCRIPTION OF EXEMPLARY EMBODIMENTS

Figure 1:
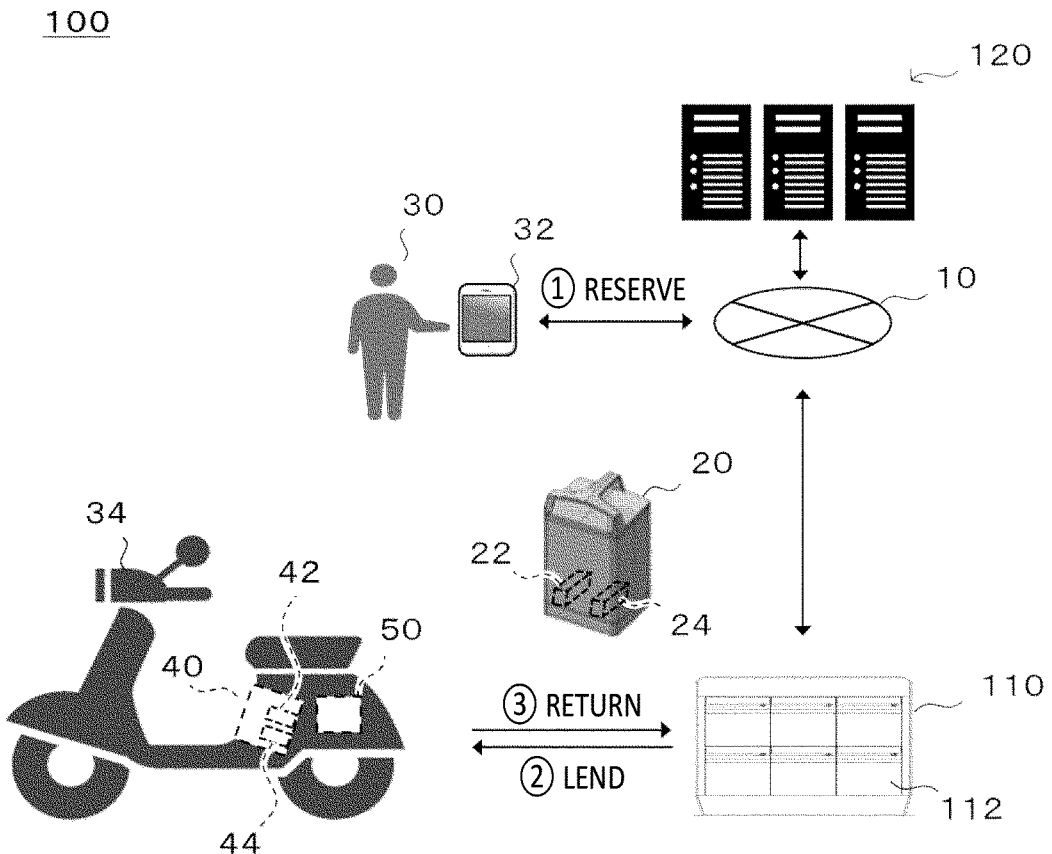
FIG. 1 schematically illustrates an example of a system configuration of a battery management system 100.

Hereinafter, the present invention will be described through embodiments of the present invention, but the following embodiments do not limit the present invention according to claims. In addition, not all combinations of features described in the embodiment are essential to the solution of the invention. Note that in the drawings, same or similar parts are assigned with same reference signs, and duplicated descriptions may be omitted.

[Overview of battery management system 100] FIG. 1 schematically illustrates an example of a system configuration of a battery management system 100. In the present embodiment, the battery management system 100 will be described in detail while taking a case where the battery management system 100 manages one or a plurality of (may be referred to as one or more) batteries 20 as an example. More specifically, the battery management system 100 will be described in detail while taking a case where the battery management system 100 provides one or more batteries 20 to each of one or more users 30 as an example.

In the present embodiment, the battery management system 100 includes, for example, a battery station 110 and a management server 120. In the present embodiment, the battery station 110 includes one or more slots 112 for storing the batteries 20. In the present embodiment, the battery 20 includes a power connector 22 and a communication connector 24.

In the present embodiment, an example of the battery management system 100 will be described while taking a case where the battery 20 is used as a power supply of an electric motorbike 34 as an example. In the present embodiment, the electric motorbike 34 includes a slot 40 which accommodates the battery 20 and a motorbike control unit 50. The slot 40 includes a power connector 42 and a communication connector 44.

In the present embodiment, the battery station 110 and the management server 120 can mutually transmit and receive information via a communication network 10, for example. In the present embodiment, the battery station 110 and the management server 120 can transmit and receive information to/from a communication terminal 32 of a user 30 via the communication network 10, for example.

According to the present embodiment, for example, the user 30 uses the communication terminal 32 to request the battery management system 100 to lend out the battery 20 stored in a particular battery station 110. More specifically, for example, the above-described request (may be referred to as a reservation request, a lending request, or the like) is transmitted from the communication terminal 32 to the management server 120. Accordingly, the user 30 can reserve the use of the battery 20.

In response to the above-described reservation request, the management server 120 executes processing for lending out the above-described battery 20 to the user 30. For example, the management server 120 transmits, to the above-described particular battery station 110 designated by the reservation request, an instruction for causing supply processing of the designated number of batteries 20, that has been designated by the reservation request, to be executed. Accordingly, the user 30 can take out the battery 20 stored in the battery station 110. The user 30 uses the battery 20 lent out from the battery management system 100 as the power supply of the electric motorbike 34, for example.

When a charging rate or SOC of the battery 20 mounted on the electric motorbike 34 becomes small, the user 30 returns the above-described battery 20 to an arbitrary battery station 110. More specifically, the user 30 removes the battery 20 from the electric motorbike 34 and inserts the removed battery 20 into the slot 112 of the battery station 110. When the user 30 has reserved the use of another battery 20 stored in the above-described battery station 110, the user 30 takes out the battery 20 from the above-described battery station 110 and mounts it on the electric motorbike 34. Accordingly, according to the present embodiment, lending and return of the battery 20 are repeated.

When the lending and return of the battery 20 are repeated, not only the battery 20 but also various components constituting the battery station 110 deteriorate. When the deterioration of components progresses, a possibility of an anomaly being caused in the battery station 110 increases.

Therefore, according to the battery management system 100 of the present embodiment, the deterioration of the components constituting the battery station 110 is managed. For example, the battery management system 100 manages deterioration of at least a part of one or more components constituting the battery station 110. Further, by managing the above-described deterioration of the components, the battery management system 100 can output (i) information to be supplied to a manufacturing plan or distribution plan of the components and (ii) information to be supplied to a maintenance plan of the battery station 110.

Particularly, when the deterioration of the power connector 22 of the battery 20 progresses, the charging efficiency or discharging efficiency of the battery 20 falls. Similarly, when a connector that is provided inside the slot 112 and is electrically connected to the power connector 22 (not illustrated in FIG. 1) is deteriorated, the charging efficiency or discharging efficiency of the battery 20 falls. Therefore, while it is desirable to replace the deteriorated connector at an early stage, an increase in frequency of a periodic inspection or repair/maintenance for detecting the deterioration of the connector at an early stage leads to an increase in costs related to the inspection or repair/maintenance.

Further, other than the deterioration of various components constituting the battery 20 and/or the battery station 110, when a foreign matter enters the slot 112 when the battery 20 is accommodated in the slot 112, for example, there is a possibility that a failure of the battery 20 and/or the battery station 110 will be caused. Therefore, while it is desirable to eliminate an anomaly such as a foreign matter inclusion at an early stage, an increase in frequency of a periodic inspection or repair/maintenance for detecting the anomaly such as a foreign matter inclusion at an early stage leads to an increase in costs related to the inspection or repair/maintenance.

In this regard, according to the battery management system 100 of the present embodiment, a state of an electrical power exchange between the battery 20 and the battery station 110 or electric motorbike 34 is monitored during at least a part of a period in which electrical power is input to the battery 20 or a period in which electrical power is output from the battery 20. Moreover, the above-described progress of the deterioration of the connector and an occurrence of an anomaly such as foreign matter inclusion are detected, estimated, or predicted based on the above-described monitoring result.

For example, the battery management system 100 executes the following information processing when input/output of electrical power is performed between the battery 20 and the battery station 110 or electric motorbike 34 in a state where the power connector 22 of the battery 20 and the electric terminal of the battery station 110 or the electric motorbike 34 are attached to each other. The following information processing is executed, for example, (i) when the battery station 110 charges the battery 20, (ii) when the battery station 110 receives electrical power output from the battery 20, or (iii) when the electric motorbike 34 receives electrical power output from the battery 20.

The electric terminal of the electric motorbike 34 is, for example, the power connector 42. The electric terminal of the battery station 110 is, for example, a power connector 352 described in relation to FIG. 3.

First, the battery management system 100 acquires an amount of electrical power (may be referred to as an electrical power amount on an inner side of the battery 20, or the like) in an electrical power transmission path provided more on the inside (may be referred to as the inner side) of the battery 20 than the power connector 22 of the battery 20. The battery management system 100 also acquires an amount of electrical power (may be referred to as an electrical power amount on an inner side of the battery station 110 or the electric motorbike 34, or the like) in an electrical power transmission path provided more on the inside (may be referred to as the inner side) of the battery station 110 or the electric motorbike 34 than the electric terminal of the battery station 110 or the electric motorbike 34. Specific examples of the above-described electrical power transmission paths will be described later.

The amount of electrical power (may simply be referred to as an electrical power amount) in each electrical power transmission path may be an electrical power amount of electricity that flows through each electrical power transmission path. Examples of the above-described electrical power amount include an energization efficiency [Wh/unit time], an electrical power amount of passing electrical power or distribution electrical power [Wh], an integrated value of passing currents [Ah], and the like. Examples of the above-described electrical power amount in the case where input/output of electrical power is performed between the battery 20 and the battery station 110 or electric motorbike 34 include a charging/discharging efficiency [Wh/unit time], an electrical power amount of input/output electrical power [Wh], an integrated value of input/output currents [Ah], and the like.

Next, the battery management system 100 compares the electrical power amount on the inner side of the battery 20 and the electrical power amount on the inner side of the battery station 110 or the electric motorbike 34. Based on the above-described comparison result, the battery management system 100 judges whether an anomalous change has occurred in at least one of (i) the power connector 22 of the battery 20, (ii) the electric terminal of the battery station 110 or the electric motorbike 34, or (iii) a connection portion between the power connector 22 of the battery 20 and the electric terminal of the battery station 110 or the electric motorbike 34. Examples of the anomalous change include an anomaly, a sign of an anomaly, and the like.

According to one embodiment, it is judged as "normal" when a numerical value of a parameter A related to the above-described electric terminal or connection portion falls within a range of a predetermined first numerical range, and it is judged that an "anomalous change" has occurred when the numerical value of the parameter A is outside the range of the first numerical range. Moreover, it may be judged as an "anomaly" when a degree of the anomalous change exceeds a predetermined level.

An upper limit and a lower limit may both be set for each of the numerical ranges described above, or the upper limit or the lower limit does not need to be set. Further, a single parameter or a plurality of parameters may be used for judging an anomalous change or an anomaly.

For example, when the charging/discharging efficiency is evaluated by an 11-step evaluation, 0 is judged as an anomaly, 10 is judged as normal, and a numerical range from 0 to 9 is judged as an anomalous change. Moreover, any numerical range from 1 to 9 is judged as a sign of an anomaly. For example, when the charging/discharging efficiency is evaluated by the 11-step evaluation, a numerical range from 0 to 2 is judged as an anomaly, a numerical range from 8 to 10 is judged as normal, and any numerical range from 3 to 7 is judged as a sign of an anomaly. For example, a numerical range from 3 to 4 is judged as a sign of an anomaly.

In another embodiment, it is judged that an "anomalous change" has occurred when the value of the parameter A changes from a value within a range of a numerical range judged to be normal to a value outside the range of the numerical range. For example, when an anomaly or anomalous change of a component is due to deterioration of the component, a value of a parameter related to a particular physical property of the component gradually changes. For example, when a sudden anomaly or anomalous change occurs in a component, the value of the above-described parameter changes abruptly.

In the above-described judgment processing, predetermined processing may be executed when it is judged that an anomalous change has occurred. At this time, different processing may be executed depending on a type or degree of the anomalous change. For example, different processing is executed for a case where it is judged that an anomaly has occurred and a case where it is judged that a sign of an anomaly has occurred. As described above, the anomaly may be an example of the type of an anomalous change or the degree of an anomalous change.

In the present embodiment, for the purpose of simplifying descriptions, the battery 20, the battery management system 100, or each unit of those will be described in detail while taking, as an example, a case of executing anomaly judgment processing as an example of the anomalous change judgment processing. Further, in the present embodiment, the battery 20, the battery management system 100, or each unit of those will be described in detail while taking, as an example, a case where an upper limit and a lower limit are provided in a numerical range that is to become an anomaly judgment criterion, and an anomaly degree may thus be determined. The anomaly degree may be an example of the degree of an anomalous change.

Other examples of the degree of an anomalous change include an anomaly, a sign of an anomaly, and the like. As described above, for example, it is judged as an "anomaly" when the degree of an anomalous change is large, and judged as a "sign of an anomaly" when the anomaly degree is smaller than that of the "anomaly". Further, as described above, the upper limit and the lower limit may be provided in the numerical range that is to become the judgment criterion for the sign of an anomaly. In this case, a degree of the sign of an anomaly may be an example of the degree of an anomalous change. Note that the anomaly, the sign of an anomaly, or the like may be an example of the type of an anomalous change.

When the anomaly judgment processing is executed as an example of the anomalous change judgment processing, more specifically, first, the battery management system 100 acquires a first input/output electrical power amount which is an input/output electrical power amount more on the battery 20 side than the power connector 22 of the battery 20. Similarly, the battery management system 100 acquires a second input/output electrical power amount which is an input/output electrical power amount more on the battery station 110 or electric motorbike 34 side than the electric terminal of the battery station 110 or the electric motorbike 34.

Then, the battery management system 100 compares the first input/output electrical power amount and the second input/output electrical power amount. Based on the above-described comparison result, the battery management system 100 judges whether an anomaly (including a failure, deterioration, and the like) has occurred in at least one of (i) the power connector 22 of the battery 20, (ii) the electric terminal of the battery station 110 or the electric motorbike 34, or (iii) the connection portion between the power connector 22 of the battery 20 and the electric terminal of the battery station 110 or the electric motorbike 34.

Moreover, in one embodiment, when it is judged that the above-described anomaly has occurred, the battery management system 100 prohibits or suppresses input/output of electrical power between the battery 20 and the battery station 110 or electric motorbike 34. In another embodiment, when it is judged that the above-described anomaly has occurred, the battery management system 100 outputs information representing that the anomaly has occurred to an operator or maintenance person of the battery station 110, for example. Accordingly, the operator or maintenance person of the battery station 110 can acquire (i) information to be supplied to a manufacturing plan or distribution plan of the power connector 22 of the battery 20 or the electric terminal of the battery station 110 or the electric motorbike 34 and/or (ii) information to be supplied to a maintenance plan of the battery station 110.

[Overview of each unit of battery management system 100] In the present embodiment, the communication network 10 is used to transmit information between the battery station 110 and the management server 120. Further, the communication network 10 is used to transmit information between the communication terminal 32 and the battery station 110 or management server 120.

The communication network 10 may be a transmission path for wired communication, may be a transmission path for wireless communication, or may be a combination of a transmission path for wireless communication and a transmission path for wired communication. For example, the communication network 10 includes at least one of a wireless packet communication network, the Internet, a PSP network, a dedicated line, VPN, a power line communication line, a vehicle-to-vehicle communication line, or a road-to-vehicle communication line. The communication network 10 may also include (i) a mobile communication network such as a mobile phone network, and may include (ii) a wireless communication network such as a wireless MAN (for example, WiMAX (registered trademark)), a wireless LAN (for example, WiFi (registered trademark)), Bluetooth (registered trademark), ZigBee (registered trademark), and NFC (Near Field Communication).

In the present embodiment, the battery 20 accumulates electrical energy. Further, the battery 20 provides the electrical energy accumulated in the battery 20 to external electrical equipment. For example, the battery 20 is a replacement-type or portable power storage device, and is mounted on the electric motorbike 34 while being attachable/detachable to/from the electric motorbike 34. The battery 20 mounted on the electric motorbike 34 supplies electrical power to the electric motorbike 34.

Further, the battery 20 removed from the electric motorbike 34 is accommodated in the slot 112 of the battery station 110. The battery 20 is charged by the battery station 110 while being accommodated in the slot 112.

More specifically, when the battery 20 is accommodated in the slot 112, the power connector 22 of the battery 20 and a connector (not illustrated in FIG. 1) provided inside the slot 112 are electrically connected. Accordingly, the battery 20 and the battery station 110 are electrically connected. When the battery 20 and the battery station 110 are electrically connected, the battery station 110 charges the battery 20 at an appropriate period in preparation for the next use of the battery 20.

In the present embodiment, the power connector 22 is formed as a female connector. The connector provided inside the slot 112 (for example, a power connector 352 described with reference to FIG. 3) is formed as a male connector. Accordingly, damage of the power connector 22 can be suppressed.

The male connector is often arranged in the equipment such that it protrudes from a front surface of the equipment. Therefore, the male connector is generally weaker to an impact than the female connector. For example, when the battery 20 is a replacement-type or portable power storage device, there is a possibility that an external force will be applied to the battery 20 in a state where the battery 20 is taken out of the battery station 110 or the electric motorbike 34. Specifically, there is a possibility that the user will drop the battery 20 by mistake while conveying the battery 20, or the user will place the battery 20 on the ground with a surface of the battery 20 on which the power connector 22 is provided facing downward.

At this time, if the power connector 22 is arranged so as to protrude from a housing of the battery 20 as a male connector, there is a possibility that the power connector 22 will be damaged. On the other hand, since the power connector 352 of the slot 112 is protected by the slot 112, the possibility of an external force being unexpectedly applied thereto is lower than the power connector 22. Therefore, in the present embodiment, the female connector is provided on the battery 20 side, and the male connector is provided on the slot 112 side.

Note that the power connector 22 is not limited to the female connector. In another embodiment, the power connector 22 is formed as the male connector, and the power connector 352 of the slot 112 is formed as the female connector. Even in this case, for example, the damage of the power connector 22 is suppressed by providing the battery 20 with a protection member that protects the power connector 22 or providing the power connector 22 in a concave portion of the battery 20.

Note that the reference to "electrically connected" is not limited to direct connection between a particular component and another component. A third element having conductivity may be arranged between a particular element and another element. Also, the reference to "electrically connected" is not limited to a physical connection between a particular element and another element. For example, input winding and output winding in a transformer are not physically connected but are electrically connected.

Further, according to the present embodiment, the communication connector 24 of the battery 20 and the connector provided inside the slot 112 (not illustrated in FIG. 1) are connected in a communicable manner. Accordingly, information can be transmitted and received between the battery 20 and the battery station 110. For example, when the battery 20 includes a storage device such as a memory, the battery station 110 can acquire information stored in the memory. Stored in the storage device of the battery 20 are, for example, a fluctuation history of a charging rate or SOC of the battery 20, a fluctuation history of a temperature of the battery 20, and the like. History information related to various items may be information in which information representing a time and information representing a state of the item at the time are associated with each other.

In the present embodiment, the communication connector 24 is formed as the female connector. The connector provided inside the slot 112 (for example, the communication connector 354 described with reference to FIG. 3) is formed as the male connector. Accordingly, the damage of the communication connector 24 is suppressed. Note that the communication connector 24 is not limited to the female connector. In another embodiment, the communication connector 24 may be formed as the male connector, and the communication connector 354 of the slot 112 may be formed as the female connector.

In the present embodiment, the communication terminal 32 is used by the user 30. The communication terminal 32 functions as an interface between the battery management system 100 and the user 30, for example. The communication terminal 32 may function as an interface between the battery station 110 and the user 30, or may function as an interface between the management server 120 and the user 30.

In one embodiment, the communication terminal 32 accepts an input from the user 30. The communication terminal 32 transmits various requests to the management server 120 based on the input from the user 30. Examples of the above-described requests include a search request for searching for a battery station 110 that matches with specific conditions, a reservation request for reserving any battery 20 or a specific battery 20 stored in a specific battery station 110, or the like.

In another embodiment, the communication terminal 32 presents information to the user 30. For example, the communication terminal 32 outputs, to the user 30, information received from the management server 120. Embodiments of outputting information are not particularly limited. The communication terminal 32 may output an image, or may output sound.

Details of the communication terminal 32 are not particularly limited as long as it is equipment capable of transmitting and receiving information to/from the respective units of the battery management system 100 via the communication network 10. Examples of the communication terminal 32 may include a personal computer, a mobile terminal, and the like. Examples of the mobile terminal may include a mobile phone, a smartphone, a PDA, a tablet, a notebook computer or a laptop computer, a wearable computer, and the like.

In the present embodiment, the electric motorbike 34 operates by consuming electrical power supplied from the battery 20. More specifically, the electric motorbike 34 uses the electrical power supplied from the battery 20 to move. When the battery 20 includes the storage device, for example, the electric motorbike 34 stores at least one of a movement history or an operation history of the electric motorbike 34 in the above-described storage device.

The electric motorbike 34 is configured such that the battery 20 is attachable/detachable to/from the electric motorbike 34. The electric motorbike 34 may be configured such that a single battery 20 is mounted thereon, or may be configured such that a plurality of batteries 20 are mounted thereon.

In the present embodiment, the slot 40 accommodates the battery 20. To the extent that there is no technical contradiction, the slot 40 may have a configuration similar to that of the slot 112, the details of which will be described in relation to FIG. 3. The slot 40 may include functions different from those of the slot 112, or may not include some of the functions of the slot 112.

In the present embodiment, the power connector 42 is electrically connected to the power connector 22 of the battery 20. In the present embodiment, the power connector 42 and the power connector 22 are connected by a wired connection. In the present embodiment, the power connector 42 is formed as a male connector. Accordingly, damage of the power connector 22 can be suppressed.

Note that the power connector 42 is not limited to the male connector. In another embodiment, when the power connector 22 of the battery 20 is formed as the male connector, the power connector 42 may be formed as a female connector.

In the present embodiment, the communication connector 44 is connected to the communication connector 24 of the battery 20 in a communicable manner. In the present embodiment, the communication connector 44 and the power connector 22 are connected by a wired connection. In the present embodiment, the communication connector 44 is formed as a male connector. Accordingly, the damage of the communication connector 24 can be suppressed.

Note that the communication connector 44 is not limited to the male connector. In another embodiment, when the communication connector 24 of the battery 20 is formed as the male connector, the communication connector 44 may be formed as a female connector.

In the present embodiment, the motorbike control unit 50 controls various operations of the electric motorbike 34. The motorbike control unit 50 may control a driving unit (not shown) of the electric motorbike 34 to control the movement of the electric motorbike 34. The motorbike control unit 50 may control electrical power supply from the battery 20 to the electric motorbike 34. The motorbike control unit 50 may control insertion/removal or attachment/detachment of the battery 20.

For example, the motorbike control unit 50 determines or estimates the number of times of accommodation of the battery 20 in the slot 40. Based on the above-described number of times of accommodation, the motorbike control unit 50 determines or estimates the number of times of attachment/detachment between the power connector 22 and the power connector 42 or the number of times of attachment/detachment between the communication connector 24 and the communication connector 44. To the extent that there is no technical contradiction, the motorbike control unit 50 may have a configuration similar to that of a slot control unit 370, the details of which will be described in relation to FIG. 3. The motorbike control unit 50 may include functions different from those of the slot control unit 370, or may not include some of the functions of the slot control unit 370.

In the present embodiment, the battery station 110 is configured to be capable of storing one or more batteries 20. More specifically, the battery station 110 includes one or more slots 112 that accommodate each of the one or more batteries 20. Further, the battery station 110 charges each of the one or more batteries 20 stored in the battery station 110.

In the present embodiment, the battery station 110 controls lending of the battery 20. For example, the battery station 110 selects, out of the one or more batteries 20 stored in the battery station 110, a battery 20 to be provided to the user 30. More specifically, the battery station 110 selects the battery 20 to be provided to the user 30 based on a deterioration degree of the slot 112.

For example, the battery station 110 acquires, from the management server 120, information representing priority of the one or more slots 112 provided in the battery station 110. The battery station 110 selects the battery 20 to be provided to the user 30 such that the battery 20 accommodated in the slot 112 of higher priority is preferentially provided to the user 30.

The priority of the respective slots is determined based on the deterioration degrees of the respective slots, for example. Examples of the information representing the priority of the respective slots include (i) information representing consecutive numerical values or stepwise segments that indicate the priority of the respective slots, (ii) information in which identification information of the respective slots and the information representing consecutive numerical values or stepwise segments that indicate the priority of the respective slots are associated with each other, (iii) identification information of each of the one or more slots 112 from which the battery 20 is to be preferentially lent out, (iv) identification information of each of the one or more slots 112 for which lending of the battery 20 is to be suppressed, and the like.

In one embodiment, for example, the priority of the respective slots is determined such that the priority of the slot of which deterioration has progressed more becomes lower. In this case, the battery 20 to be provided to the user 30 is selected such that, by the lending of the battery 20, an unbalanced state of the deterioration degrees among the slots is eliminated as compared to a state before performing the lending. Further, since deterioration rates of the one or more slots 112 provided in the battery station 110 become comparable, an administrator of the battery station 110 can subject a majority of the slots 112 provided in the battery station 110 to maintenance at once, or replace the whole battery station 110. As a result, maintenance costs of the battery station 110 is reduced.

In another embodiment, for example, the priority of the respective slots is determined such that the priority of the slot of which deterioration has progressed more becomes higher. In this case, the deterioration rate of some of the slots 112 becomes higher than the deterioration rate of other slots. Accordingly, the administrator of the battery station 110 can suppress the number of slots 112 to be subjected to maintenance at once, or prevent a situation where the majority of the slots 112 provided in the battery station 110 become unusable at once from occurring.

In the present embodiment, the management server 120 manages one or more batteries 20. For example, the management server 120 manages a state of each of the one or more batteries 20. Examples of the state of the battery 20 include a lending state (for example, lendable, not lendable, being lent, or the like), an operational state (for example, charging, discharging, standby, or the like), a charged state (for example, current SOC), a storage state (for example, temperature, humidity, or the like), a deterioration state, and the like.

In the present embodiment, the management server 120 manages a reservation of each of the one or more batteries 20. Accordingly, the management server 120 can manage lending of the battery 20 by the battery station 110.

For example, the management server 120 receives a reservation request of the battery 20 from the communication terminal 32 of the user 30. The management server 120 judges whether the battery 20 indicated by the reservation request can be lent out, and determines whether to accept the reservation. When the reservation of the user 30 is accepted, the management server 120 transmits, to the battery station 110 storing the above-described battery 20, various types of information related to the reservation of the above-described battery 20.

In one embodiment, when the battery station 110 provides to the user 30 the batteries 20 in the number reserved by the user 30, the management server 120 transmits information representing a determination criterion (may be referred to as a policy) for determining the battery 20 to be provided preferentially out of the plurality of batteries 20 stored in the battery station 110. The above-described policy is determined based on the deterioration degree of each slot provided in the battery station 110, for example. The information representing the priority of each slot provided in the battery station 110 described above may be an example of the policy.

In another embodiment, the management server 120 transmits identification information of the slot 112 accommodating the battery 20 to be lent out. The slot 112 accommodating the battery 20 to be lent out is determined based on the deterioration degree of each slot provided in the battery station 110, for example.

In the present embodiment, the management server 120 manages maintenance of the battery station 110. In one embodiment, for example, the management server 120 generates a maintenance plan of the battery station 110. Further, the management server 120 manages progress of the maintenance plan of the battery station 110, for example.

In another embodiment, the management server 120 manages manufacturing or distribution of maintenance goods of the battery station 110. For example, the management server 120 generates a manufacturing plan or distribution plan of the maintenance goods. Further, the management server 120 manages progress of the manufacturing plan or distribution plan of the maintenance goods, for example. Examples of the maintenance goods include the battery station 110, the slots 112, constituent components of the slots 112, a fixture for maintenance, and the like.

[Specific configuration of each unit of battery management system 100] Each unit of the battery management system 100 may be realized by hardware, may be realized by software, or may be realized by a combination of hardware and software. When at least some of the components of the battery management system 100 are realized by software, components realized by the software may be realized by launching a program that defines the operations related to the components in an information processing device with a general configuration.

The program may be stored in a computer-readable medium such as a CD-ROM, a DVD-ROM, a memory, and a hard disk, or may be stored in a storage device connected to the network. The program may be installed into the computer configuring at least a part of the battery management system 100 from the computer-readable medium or the storage device connected to the network. When the program is executed, the computer may function as at least a part of each unit of the battery management system 100.

The program that causes the computer to function as at least a part of each unit of the battery management system

100 may be provided with a module that defines an operation of each unit of the battery management system 100. The program or module works with the data processing apparatus, an input apparatus, an output apparatus, the storage device, and the like, and causes the computer to function as each unit of the battery management system 100, or causes the computer to execute an information processing method in each unit of the battery management system 100.

Information processing described in the program functions as specific means in which software associated with the program and various hardware resources of the battery management system 100 work in cooperation when the program is read into the computer. Then, the above-described specific means realizes an arithmetic operation or a process of information according to an intended use of the computer according to the present embodiment to constitute the battery management system 100 according to the intended use.

In one embodiment, the information processing method carried out in each unit of the battery management system 100 may be a comparison method. The comparison method described above is, for example, executed when input/output of electrical power is performed between a first electrical power device including a first terminal and a second electrical power device including a second terminal provided to be attachable to the first terminal in a state where the first terminal and the second terminal are attached to each other. The above-described comparison method includes, for example, acquiring a first input/output electrical power amount which is an input/output electrical power amount more on a side of the first electrical power device than the first terminal. The above-described comparison method includes, for example, acquiring a second input/output electrical power amount which is an input/output electrical power amount more on a side of the second electrical power device than the second terminal. The above-described comparison method includes, for example, comparing the first input/output electrical power amount and the second input/output electrical power amount.

In another embodiment, the information processing method carried out in each unit of the battery management system 100 may be a comparison method. The comparison method described above is, for example, executed when input/output of electrical power is performed between a first electrical power device including a first terminal and a second electrical power device including a second terminal provided to be attachable to the first terminal in a state where the first terminal and the second terminal are attached to each other. The comparison method described above includes, for example, acquiring a first electrical power amount which is an electrical power amount in a first electrical power transmission path provided more on an inner side of the first electrical power device than the first terminal. The comparison method described above includes, for example, acquiring a second electrical power amount which is an electrical power amount in a second electrical power transmission path provided more on an inner side of the second electrical power device than the second terminal.

The comparison method described above includes, for example, comparing the first electrical power amount and the second electrical power amount.

In another embodiment, the information processing method carried out in each unit of the battery management system 100 may be a management method for managing an electrical connection state between the first electrical power device and the second electrical power device. The first electrical power device includes, for example, a first terminal and an internal circuit electrically connected to the first terminal. The second electrical power device includes, for example, a second terminal provided to be attachable to the first terminal. The second electrical power device exchanges electrical power with the first electrical power device via the first terminal and the second terminal, for example. The above-described management method includes, for example, an individual index determination step of determining a value of an individual index which is an index indicating a degree of individual exchange efficiency that is a ratio of the electrical power amount exchanged by the internal circuit to the electrical power amount exchanged by the first terminal. The above-described management method includes, for example, a general index determination step of determining a value of a general index which is an index indicating a degree of general exchange efficiency that is a ratio of the electrical power amount exchanged by the first electrical power device to the electrical power amount exchanged by the second electrical power device. The above-described management method includes, for example, a connection state determination step of determining an electrical connection state between the first electrical power device and the second electrical power device based on the value of the individual index determined in the individual index determination step and the value of the general index determined in the general index determination step.

The battery 20 may be an example of the first electrical power device or the power storage device. The power connector 22 may be an example of the first terminal. The electric motorbike 34 may be an example of the second electrical power device. The battery station 110 may be an example of the second electrical power device or the charging device. The slot 112 may be an example of the second electrical power device. The power connector 42 of the electric motorbike 34 may be an example of the second terminal. The electric terminal of the slot 112 (not illustrated in FIG. 1) may be an example of the second terminal.

The battery management system 100 may be an example of a comparison system or a management device. The battery station 110 may be an example of the comparison system or the management device. The battery station 110 may be an example of a handling unit. The management server 120 may be an example of the handling unit. The management server 120 may be an example of the information processing device.

The electrical power transmission path provided more on the inside of the battery 20 than the power connector 22 of the battery 20 may be an example of the first electrical power transmission path. The electrical power transmission path provided more on the inside of the battery station 110 or the electric motorbike 34 than the electric terminal of the battery station 110 or the electric motorbike 34 may be an example of the second electrical power transmission path.

The electrical power amount on the inner side of the battery 20 may be an example of one of the first electrical power amount or the second electrical power amount. The electrical power amount on the inner side of the battery station 110 or the electric motorbike 34 may be an example of the other one of the first electrical power amount or the second electrical power amount. The first input/output electrical power amount may be an example of the first electrical power amount. The second input/output electrical power amount may be an example of the second electrical power amount.

[One example of another embodiment] Note that in the present embodiment, the battery management system 100 has been described in detail while taking the case where a form in which the battery management system 100 provides the battery 20 is lending, as an example. However, as long as the battery 20 is supplied from the battery station 110 to the user 30, the form of providing the battery 20 is not limited to lending. In another embodiment, a third person other than the administrator of the battery management system 100 may be a proprietor of the battery 20.

In the present embodiment, the battery management system 100 has been described in detail while taking the case where the battery 20 is used as a power supply of the electric motorbike 34 as an example. However, the use of the battery 20 is not limited to the present embodiment. In another embodiment, the battery 20 may be used as a power supply for various types of electrical equipment. As long as the electrical equipment is equipment that operates by consuming electrical power supplied from the battery 20, a type or structure thereof is not limited in particular.

Other examples of the electrical equipment include a movable body that uses an electric motor as a power source, a stationary power storage device, and the like. Examples of the movable body include a vehicle, a marine vessel, a flight vehicle, and the like. Examples of the vehicle include an automobile, a motorcycle, a bicycle, a stand riding type vehicle having a power unit, and the like. Examples of the automobile include an electric automobile, a fuel cell automobile, a hybrid automobile, a small sized commuter, an electric cart, and the like. Examples of the motorcycle include a motorbike, a three-wheeled motorcycle, and the like. Examples of the marine vessel include a ship, a hovercraft, a water bike, a submarine, a submersible craft, an underwater scooter, and the like. Examples of the flight vehicle include an airplane, an air ship or a balloon, a hot-air balloon, a helicopter, a drone, and the like.

In the present embodiment, the battery management system 100 has been described in detail while taking, as an example, the case where the management server 120 transmits, to the battery station 110, information representing the priority of each slot provided in the battery station 110 or identification information of the slot 112 accommodating the battery 20 to be lent out, and the battery station 110 selects the battery 20 to be provided to the user 30 based on the information received from the management server 120. However, the method of selecting the battery 20 to be provided to the user 30 is not limited to the present embodiment. In another embodiment, the battery station 110 may determine the priority of each slot provided in the battery station 110 and select the battery 20 to be provided to the user 30 based on the priority. Further in another embodiment, the battery station 110 may determine the slot 112 accommodating the battery 20 to be lent out so as to select the battery 20 to be provided to the user 30.

In the present embodiment, the battery management system 100 has been described in detail while taking the case where the management server 120 manages one or more batteries 20 and one or more battery stations 110 as an example. However, the battery management system 100 is not limited to the present embodiment. In another embodiment, at least one of the one or more battery stations 110 may have at least some of the functions of the management server 120 described above. For example, at least one of the one or more battery stations 110 may manage one or more batteries 20 and another battery station 110. In this case, the battery management system 100 may include the management server 120, or may not include the management server 120.

In the present embodiment, an example of the battery 20 has been described while taking the case where the battery 20 includes the power connector 22 and the communication connector 24 as an example. However, the battery 20 is not limited to the present embodiment.

In another embodiment, the power connector 22 and the communication connector 24 may be formed integrally. For example, a power pin and a communication pin are provided inside the connector formed integrally. The power pin may be another example of the power connector 22. The communication pin may be another example of the communication connector 24.

In the present embodiment, an example of the electric motorbike 34 has been described while taking the case where the electric motorbike 34 includes the power connector 42 and the communication connector 44 as an example. However, the electric motorbike 34 is not limited to the present embodiment. In another embodiment, the power connector 42 and the communication connector 44 may be formed integrally. For example, a power pin and a communication pin are provided inside the connector formed integrally. The power pin may be another example of the power connector 42. The communication pin may be another example of the communication connector 44.

In the present embodiment, an example of the battery station 110 has been described while taking the case where the battery station 110 includes the power connector 352 and the communication connector 354 as an example. However, the battery station 110 is not limited to the present embodiment. In another embodiment, the power connector 352 and the communication connector 354 may be formed integrally. For example, a power pin and a communication pin are provided inside the connector formed integrally. The power pin may be another example of the power connector 352. The communication pin may be another example of the communication connector 354.

In the present embodiment, the battery management system 100 has been described in detail while taking the case where the connection between the power connector 42 and the power connector 22 and the connection between the communication connector 44 and the communication connector 24 are wired connections, as an example. However, the battery management system 100 is not limited to the present embodiment. In another embodiment, either one of the connection between the power connector 42 and the power connector 22 or the connection between the communication connector 44 and the communication connector 24 may be a wireless connection.

In the present embodiment, the battery management system 100 has been described in detail while taking the case where the electric motorbike 34 uses electrical power output from the battery 20, as an example. However, the equipment that uses the electrical power output from the battery 20 is not limited to the electric motorbike 34. In another embodiment, the equipment that uses the electrical power output from the battery 20 may be a power storage device that accumulates electrical power or various load devices that consume electrical power. Further in another embodiment, the battery station 110 may use the electrical power output from the battery 20.

In the present embodiment, the battery management system 100 has been described in detail while taking the case where the battery station 110 is an example of the comparison system and the management server 120 is an example of the handling unit as an example. However, the battery management system 100 is not limited to the present embodiment.

In another embodiment, a part of the information processing carried out in the battery station 110 may be executed by the management server 120. For example, the management server 120 acquires various types of information from the battery station 110 and executes various types of information processing based on the information.

For example, the management server 120 receives, from the battery station 110, information representing an electrical power amount on an inner side of the battery 20 and information representing an electrical power amount on an inner side of the battery station 110 or the electric motorbike 34. As described above, the information representing each electrical power amount is acquired by the battery 20 or the battery station 110, for example.

For example, the management server 120 compares the information representing the electrical power amount on the inner side of the battery 20 and the information representing the electrical power amount on the inner side of the battery station 110 or the electric motorbike 34. The above-described comparison processing is executed when input/output of electrical power is performed between the battery 20 and the battery station 110 or electric motorbike 34 in a state where the power connector 22 of the battery 20 and the power connector 352 of the battery station 110 or the power connector 42 of the electric motorbike 34 are attached to each other, for example. Based on the above-described comparison result, the management server 120 may judge whether an anomalous change has occurred in at least one of (i) the power connector 22 of the battery 20, (ii) the power connector 352 of the battery station 110 or the power connector 42 of the electric motorbike 34, or (iii) a connection portion between the power connector 22 of the battery 20 and the power connector 352 of the battery station 110 or the power connector 42 of the electric motorbike 34.

Figure 2:
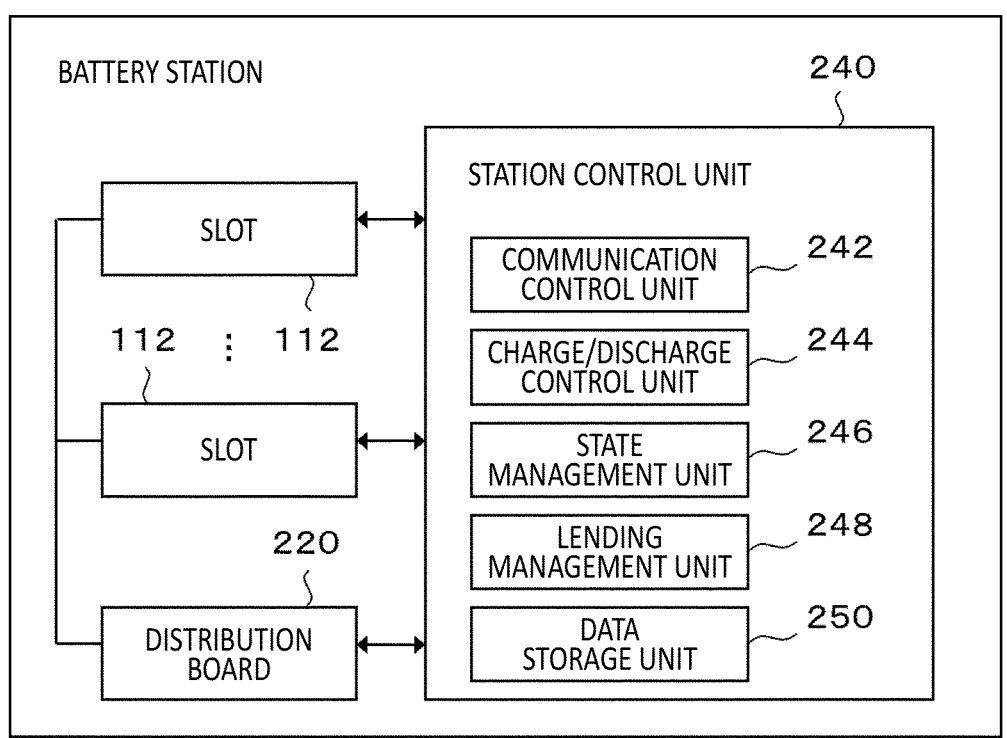
FIG. 2 schematically illustrates an example of an internal configuration of a battery station 110.

FIG. 2 schematically illustrates an example of an internal configuration of the battery station 110. In the present embodiment, the battery station 110 includes, for example, the plurality of slots 112, a distribution board 220, and a station control unit 240. In the present embodiment, the station control unit 240 includes a communication control unit 242, a charge/discharge control unit 244, a state management unit 246, a lending management unit 248, and a data storage unit 250.

In the present embodiment, the slot 112 accommodates the battery 20. The battery 20 is mounted inside the slot 112 by the user 30 and is taken out from the slot 112 by the user 30. For example, the slot 112 is configured such that the battery 20 is insertable/removable into/from the slot 112. In the present embodiment, the slot 112 counts the number of times of accommodation of the battery 20 in the slot 112 and outputs information representing the number of times of accommodation to the station control unit 240. More specifically, the slot 112 detects that the battery 20 has been inserted into the slot 112. The slot 112 determines or estimates the above-described number of times of accommodation of the battery 20 based on the above-described result of detecting the insertion of the battery 20. The slot 112 will be described later in detail.

In the present embodiment, the distribution board 220 receives electrical power from an external power supply, a power generation device, or an electrical power system, and distributes the electrical power to each unit of the battery station 110. For example, the distribution board 220 is electrically connected to each of the plurality of slots 112 provided in the battery station 110. The distribution board 220 includes one or more power conditioning systems and supplies electrical power to each of the plurality of slots 112 in response to an instruction from the station control unit 240. Examples of the power conditioning system include a one-way AC/DC circuit, a bidirectional AC/DC circuit, a one-way DC/DC circuit, a bidirectional DC/DC circuit, and the like.

In the present embodiment, the station control unit 240 controls the battery station 110. For example, the station control unit 240 controls operations of the battery station 110. Further, the station control unit 240 acquires outputs from various sensors provided in the battery station 110. Accordingly, the station control unit 240 can manage the state of the battery station 110.

In the present embodiment, the station control unit 240 cooperates with the management server 120 to control the battery station 110. The station control unit 240 will be described later in detail.

In the present embodiment, the communication control unit 242 controls communication between the station control unit 240 and the management server 120 or communication terminal 32. In one embodiment, the communication control unit 242 controls transmission and reception of information used in one of charge processing or lending processing of the battery 20, between the station control unit 240 and the management server 120. In another embodiment, the communication control unit 242 controls transmission and reception of information used in authentication processing of the user 30 who wishes to rent the battery 20, between the station control unit 240 and the communication terminal 32.

In the present embodiment, the charge/discharge control unit 244 controls charge and discharge of the one or more batteries 20 accommodated in the battery station 110. For example, the charge/discharge control unit 244 controls operations of the slot 112 accommodating the battery 20 to thus control charge and discharge of the battery 20.

For example, the charge/discharge control unit 244 generates a charging plan and controls charge and discharge of each of the one or more batteries 20 based on the charging plan. More specifically, the charge/discharge control unit 244 acquires information representing a supply and demand situation of the battery 20 from the management server 120, and determines the number of batteries 20 that are lendable during a particular period based on the information. Examples of the information representing the supply and demand situation of the battery 20 include information representing a reservation status of the battery 20, information representing a demand prediction of the battery 20, and the like. At a beginning of the particular period, for example, the charge/discharge control unit 244 charges the one or more batteries 20 accommodated in the battery station 110 so that the charging rate or SOC of at least the above-described number of batteries 20 becomes equal to or larger than a lendable value.

For example, depending on power supply performance of the distribution board 220, the number of batteries 20 that the battery station 110 can charge at the same time may be smaller than the number of batteries 20 that require charging. In this case, considering the power supply performance of the distribution board 220, the charge/discharge control unit 244 determines the slot 112 for which the battery 20 is to be charged out of the slots 112 accommodating the batteries 20. Further, when an electric utility rate fluctuates depending on a time of day, for example, considering the electric utility rate for each time of day, the charge/discharge control unit 244 determines the slot 112 for which the battery 20 is to be charged out of the slots 112 accommodating the batteries 20.

In such cases, for example, the charge/discharge control unit 244 acquires, from the management server 120, the information representing the policy described above or the information representing the priority of each slot, and determines the slot 112 to be used for charging the battery 20 based on the information. By determining the slot 112 to be used for charging the battery 20 based on the above-described policy or priority, a lending frequency of the battery 20 accommodated in a particular slot 112 may become higher than lending frequencies of the batteries 20 accommodated in other slots 112.

As described above, the above-described policy or priority is determined based on the deterioration degree of the slot 112. Accordingly, the charge/discharge control unit 244 can promote deterioration of a particular slot 112 more than the deterioration of other slots 112, or eliminate an unbalanced state of the deterioration degrees of the plurality of slots 112 provided in the battery station 110.

In the present embodiment, the state management unit 246 manages the state of each unit of the battery station 110. For example, the state management unit 246 manages the state of each of the plurality of slots 112 provided in the battery station 110. An example of the state of each slot is a usage state or deterioration state of each slot. Examples of the usage state or deterioration state of each slot include the number of times of accommodation of the battery 20 in each slot, the number of times of attachment/detachment between each slot and the battery 20, and the like.

Other examples of the state of each slot include presence or absence of an anomaly caused in each slot, a type of the anomaly, a degree of the anomaly, and the like. Examples of the above-described type of the anomaly include (i) an anomaly related to the power connector 22 of the battery 20 stored in each slot, (ii) an anomaly related to the electric terminal of each slot, (iii) an anomaly related to a connection portion between the electric circuit of the battery 20 stored in each slot and the electric circuit of each slot, and the like.

Examples of the anomaly related to the power connector 22 include a situation where the deterioration degree of the power connector 22 has progressed more than a predetermined degree, a failure of the power connector 22, and the like. Examples of the anomaly related to the electric terminal of each slot include a situation where the deterioration degree of the electric terminal has progressed more than a predetermined degree, a failure of the electric terminal, and the like. Examples of the failure of the power connector 22 or the electric terminal include disconnection, bending, and the like. Examples of the above-described anomaly related to the connection portion include foreign matter inclusion (may be referred to as biting), the failure of the power connector 22 or the electric terminal described above, and the like.

For example, the state management unit 246 monitors a state of an electrical power exchange between the battery 20 and the battery station 110 or electric motorbike 34 during at least a part of a period in which electrical power is input to the battery 20 or a period in which electrical power is output from the battery 20. Moreover, the state management unit 246 determines whether an anomaly has occurred in the slot 112 storing the above-described battery 20 based on the above-described monitoring result. The state management unit 246 may judge a type of the above-described anomaly and/or a degree of the anomaly.

The state management unit 246 may transmit information representing a state of each unit of the battery station 110 to the management server 120. For example, the state management unit 246 acquires information representing a state of each of the plurality of slots 112 provided in the battery station 110. Further, the state management unit 246 transmits, to the management server 120, identification information of each of the plurality of slots 112 and information representing the state of the slot in association with each other. The state management unit 246 will be described later in detail.

In the present embodiment, the lending management unit 248 manages lending of the battery 20. Further, the lending management unit 248 manages return of the battery 20.

In one embodiment, for example, the lending management unit 248 determines the battery 20 to be lent out to the user 30 out of the batteries 20 accommodated in the slots 112 of the battery station 110. In the present embodiment, the battery 20 to be lent out to the user 30 is determined based on the deterioration degrees of the plurality of slots 112 provided in the battery station 110.

More specifically, the lending management unit 248 acquires, from the management server 120, information representing the policy described above or information representing the priority of each slot, and determines the battery 20 to be lent out to the user 30 based on the information. For example, when the user 30 drives the electric motorbike 34 to move to an installed location of the battery station 110 and requests the battery station 110 to lend out the battery 20 that has been reserved in advance, the lending management unit 248 instructs the slot 112 of high priority, out of the one or more slots 112 accommodating the lendable batteries 20, to lend out the battery 20.

As described above, the above-described policy or priority is determined based on the deterioration degree of the slot 112. An example of the deterioration degree of the slot 112 is a deterioration degree of the connector that is provided inside the slot 112 and is connected with the power connector 22 or communication connector 24 of the battery 20. Accordingly, the lending management unit 248 can select the battery 20 to be provided to the user 30 out of the one or more batteries 20, based on the deterioration degrees of the slots 112.

In one embodiment, for example, when the priority is determined such that the priority becomes higher as the deterioration degree of the slot 112 becomes smaller, the lending management unit 248 selects the battery 20 to be provided to the user 30 such that the battery 20 accommodated in the slot 112 having a smaller deterioration degree is provided to the user 30 more preferentially than the battery 20 accommodated in the slot 112 having a larger deterioration degree. Accordingly, the unbalanced state of the deterioration degrees of the plurality of slots 112 provided in the battery station 110 can be eliminated.

In another embodiment, for example, when the priority is determined such that the priority becomes lower as the deterioration degree of the slot 112 becomes smaller, the lending management unit 248 selects the battery 20 to be provided to the user 30 such that the battery 20 accommodated in the slot 112 having a larger deterioration degree is provided to the user 30 more preferentially than the battery 20 accommodated in the slot 112 having a smaller deterioration degree. Accordingly, deterioration of a particular slot 112 can be promoted more than the deterioration of other slots 112.

In another embodiment, for example, the lending management unit 248 determines the slot 112 to accept return of the battery 20 out of the slots 112 not accommodating the batteries 20. In the present embodiment, the slot 112 to accept return of the battery 20 is determined based on the deterioration degrees of the plurality of slots 112 provided in the battery station 110.

More specifically, the lending management unit 248 acquires, from the management server 120, information representing the policy described above or information representing the priority of each slot, and determines the slot 112 to accept return of the battery 20 based on the information. For example, when the user 30 drives the electric motorbike 34 to move to the installed location of the battery station 110 and requests the battery station 110 to lend out the battery 20 that has been reserved in advance, the lending management unit 248 instructs the slot 112 of high priority out of the one or more slots 112 not accommodating the batteries 20, to execute processing for accepting the battery 20 to be returned.

As described above, the above-described policy or priority is determined based on the deterioration degree of the slot 112. Accordingly, the lending management unit 248 can select the slot 112 to be used for returning the battery 20 out of the one or more slots 112, based on the deterioration degrees of the slots 112.

In one embodiment, for example, when the priority is determined such that the priority becomes higher as the deterioration degree of the slot 112 becomes smaller, the lending management unit 248 selects the slot 112 to accept return of the battery 20 such that the slot 112 having a smaller deterioration degree accepts the battery 20 more preferentially than the slot 112 having a larger deterioration degree. Accordingly, the unbalanced state of the deterioration degrees of the plurality of slots 112 provided in the battery station 110 can be eliminated.

In another embodiment, for example, when the priority is determined such that the priority becomes lower as the deterioration degree of the slot 112 becomes smaller, the lending management unit 248 selects the slot 112 to accept return of the battery 20 such that the slot 112 having a larger deterioration degree accepts the battery 20 more preferentially than the slot 112 having a smaller deterioration degree. Accordingly, deterioration of a particular slot 112 can be promoted more than the deterioration of other slots 112.

Further in another embodiment, the battery 20 to be lent out to the user 30 is determined based on a state of an anomaly that has occurred in each of the plurality of slots 112 provided in the battery station 110. As described above, examples of the state of the anomaly include presence or absence of an anomaly, a type of an anomaly, a degree of an anomaly, and the like.

In the present embodiment, the data storage unit 250 stores various types of information. In one embodiment, the data storage unit 250 stores information used in information processing carried out in the station control unit 240. For example, the data storage unit 250 stores information that the station control unit 240 has acquired from the management server 120 (for example, the information representing the policy). In another embodiment, the data storage unit 250 stores information generated or acquired by the information processing carried out in the station control unit 240. For example, the data storage unit 250 stores information that the station control unit 240 has acquired from the slot 112 (for example, the number of times of insertion/removal or the number of times of attachment/detachment of the battery 20) and information that the station control unit 240 has acquired from the battery 20 (for example, the charging rate or SOC of the battery 20). The data storage unit 250 will be described later in detail.

The slot 112 may be an example of a first acquisition unit or a second acquisition unit. The state management unit 246 may be an example of the comparison unit, the handling unit, the comparison system, or the management device. The charge/discharge control unit 244 may be an example of the handling unit. The lending management unit 248 may be an example of the handling unit. The data storage unit 250 may be an example of a storage unit or an internal resistance storage unit.

[One example of another embodiment] Note that in the present embodiment, the lending management unit 248 has been described in detail while taking, as an example, the case where the lending management unit 248 acquires, from the management server 120, the information representing the policy or the information representing the priority of each slot, and determines the battery 20 to be lent out to the user 30 based on the information. However, the lending management unit 248 is not limited to the present embodiment. In another embodiment, the lending management unit 248 may determine the priority of each slot based on the deterioration degree of each slot, and determine the battery 20 to be lent out to the user 30 based on the priority.

In the present embodiment, the battery management system 100 has been described in detail while taking, as an example, the case of selecting the slot 112 to execute the lending processing at the time the user 30 arrives at the installed location of the battery station 110 and requests the battery station 110 to lend out the battery 20. However, the timing of selecting the slot 112 to execute the lending processing is not limited to the present embodiment. In another embodiment, the slot 112 to execute the lending processing may be selected when the management server 120 accepts a reservation request from the user 30 or while the management server 120 is processing the reservation request. The above-described selection processing may be executed by the management server 120, or may be executed by the station control unit 240.

In the present embodiment, the battery management system 100 has been described in detail while taking, as an example, the case of selecting the slot 112 to execute the return processing at the time the user 30 arrives at the installed location of the battery station 110 and requests the battery station 110 to lend out the battery 20. However, the timing of selecting the slot 112 to execute the return processing is not limited to the present embodiment. In another embodiment, the slot 112 to execute the return processing may be selected when the management server 120 accepts a reservation request from the user 30 or while the management server 120 is processing the reservation request. The above-described selection processing may be executed by the management server 120, or may be executed by the station control unit 240.

In the present embodiment, an example of the battery station 110 has been described while taking, as an example, the case where the state management unit 246 manages, as the state of each slot, presence or absence of an anomaly caused in each slot, a type of the anomaly, a degree of the anomaly, or the like. As described above, the anomaly may be an example of the anomalous change. In another embodiment, the state management unit 246 may manage, as the state of each slot, presence or absence of an anomalous change caused in each slot, a type of the anomalous change, a degree of the anomalous change, or the like. Examples of the above-described type of an anomalous change include (i) an anomalous change related to the power connector 22 of the battery 20 stored in each slot, (ii) an anomalous change related to the electric terminal of each slot, (iii) an anomalous change related to the connection portion between the electric circuit of the battery 20 stored in each slot and the electric circuit of each slot, and the like.

In the present embodiment, an example of the battery station 110 has been described while taking, as an example, the case where the battery 20 to be lent out to the user 30 is determined based on a state of an anomaly caused in each of the plurality of slots 112 provided in the battery station 110. As described above, the anomaly may be an example of the anomalous change. In another embodiment, the battery 20 to be lent out to the user 30 may be determined based on a state of an anomalous change caused in each of the plurality of slots 112 provided in the battery station 110. Examples of the state of an anomalous change include presence or absence of an anomalous change, a type of the anomalous change, a degree of the anomalous change, and the like.

Figure 3:
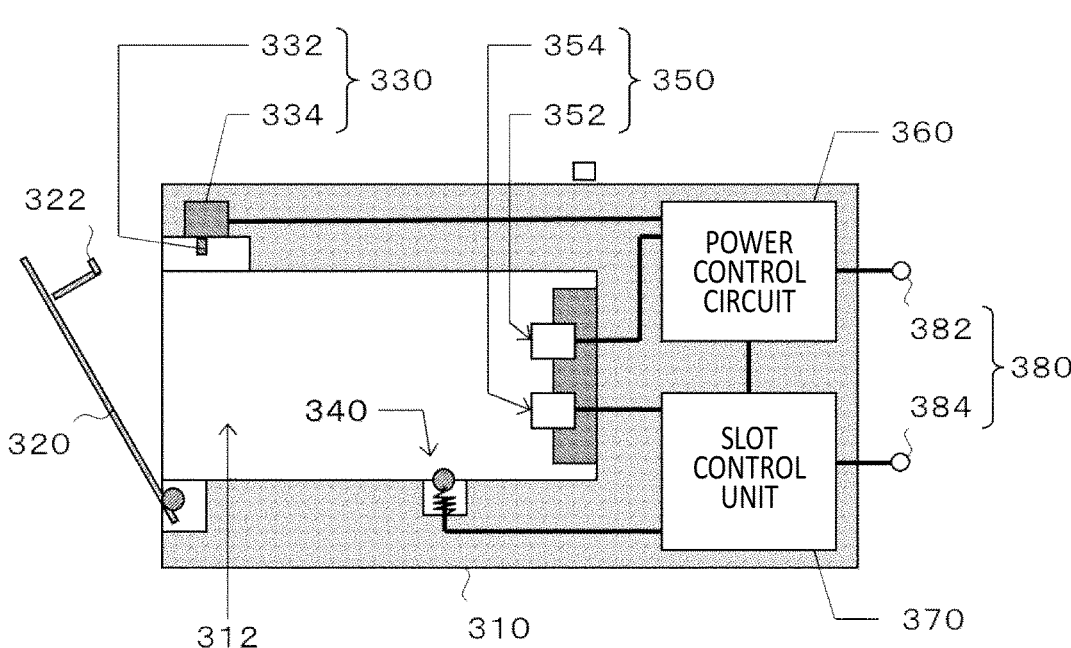
FIG. 3 schematically illustrates an example of an internal configuration of a slot 112.

FIG. 3 schematically illustrates an example of an internal configuration of the slot 112. In the present embodiment, the slot 112 includes, for example, a housing 310, an opening/closing cover 320, a locking portion 330, a battery detection unit 340, a connector 350, a power control circuit 360, a slot control unit 370, and a connector 380. The slot 112 may also include a plurality of battery detection units 340.

In the present embodiment, a battery accommodation chamber 312 is formed inside the housing 310. In the present embodiment, the opening/closing cover 320 is provided with a lock member 322. In the present embodiment, the locking portion 330 includes a locking member 332 and a driving member 334. In the present embodiment, the connector 350 includes the power connector 352 and the communication connector 354. In the present embodiment, the connector 380 includes a power connector 382 and a communication connector 384.

In the present embodiment, the housing 310 is configured to be attachable/detachable to/from a body of the battery station 110. Accordingly, when a failure occurs in a part of the slot 112, the whole slot 112 can be replaced. By enabling the whole slot 112 to be replaced, a degree of freedom in maintenance is improved. For example, regarding a case of replacing a component in which a failure has occurred, a case of replacing the whole slot 112, and a case of replacing the whole battery station 110, the battery management system 100 or the administrator of the battery management system 100 can compare maintenance costs considering maintenance labor costs, construction costs, lost profits during a maintenance period, or the like, to thus determine a maintenance plan.

In the present embodiment, the battery accommodation chamber 312 is provided inside the housing 310 and accommodates the battery 20. The battery accommodation chamber 312 is configured such that the battery 20 is insertable/removable into/from the battery accommodation chamber 312. For example, an opening is formed on one side surface of the battery accommodation chamber 312 so as to enable the battery 20 to move in and out of the battery accommodation chamber 312.

In the present embodiment, the opening/closing cover 320 is provided so as to cover the opening of the battery accommodation chamber 312. The opening/closing cover 320 is configured to be capable of opening/closing the above-described opening. Accordingly, a switch is made between a state where insertion/removal of the battery 20 by the user 30 is permitted and a state where the insertion/removal of the battery 20 by the user 30 is prohibited. In the present embodiment, the opening/closing cover 320 is provided with the lock member 322 that is used to lock the opening/closing cover 320.

In the present embodiment, the locking portion 330 locks and unlocks the opening/closing cover 320. Accordingly, a switch is made between a state where opening/closing of the opening/closing cover 320 by the user 30 is permitted and a state where the opening/closing of the opening/closing cover 320 by the user 30 is prohibited.

In the present embodiment, the locking member 332 cooperates with the lock member 322 to control opening/closing of the opening/closing cover 320. For example, when the locking member 332 moves to a locking position in a state where the opening/closing cover 320 is closed, the movement of the lock member 322 is restricted, and thus the user 30 cannot open the opening/closing cover 320. On the other hand, when the locking member 332 moves to an unlocking position, the movement of the lock member 322 is not restricted, and thus the user 30 can open the opening/closing cover 320. In the present embodiment, the driving member 334 causes the locking member 332 to move between the locking position and the unlocking position. The driving member 334 causes the locking member 332 to move in response to an instruction from the slot control unit 370, for example.

In the present embodiment, the battery detection unit 340 counts the number of times of accommodation of the battery 20 in the battery accommodation chamber 312. More specifically, the battery detection unit 340 detects that the battery 20 has been inserted into the battery accommodation chamber 312. The battery detection unit 340 outputs information representing the detection result to the slot control unit 370.

A detection principle of the battery 20 by the battery detection unit 340 is not limited in particular. The battery detection unit 340 may detect the insertion of the battery 20 by a contact type sensor, or may detect the insertion of the battery 20 by a non-contact sensor.

In the present embodiment, the connector 350 is connected to the power connector 22 and communication connector 24 of the battery 20. The connector 350 is configured to be attachable/detachable to/from the power connector 22 and communication connector 24 of the battery 20.

In the present embodiment, the power connector 352 is electrically connected to the power connector 22 of the battery 20. In the present embodiment, the power connector 352 and the power connector 22 are connected by a wired connection. The power connector 352 is electrically connected to the power control circuit 360, and the power connector 352 is electrically connected to the power connector 22, with the result that the power control circuit 360 and the battery 20 are electrically connected. Accordingly, charge and discharge of the battery 20 become possible.

In the present embodiment, the communication connector 354 is connected to the communication connector 24 of the battery 20 in a communicable manner. In the present embodiment, the communication connector 354 and the communication connector 24 are connected by a wired connection. The communication connector 354 is connected to the slot control unit 370 in a communicable manner, and the communication connector 354 is connected to the communication connector 24 in a communicable manner, with the result that the slot control unit 370 and the battery 20 are connected in a communicable manner. Accordingly, information can be transmitted and received between the slot control unit 370 and the battery 20.

In the present embodiment, the power control circuit 360 receives electrical power supplied from the distribution board 220 of the battery station 110. Further, the power control circuit 360 supplies electrical power to each unit of the slot 112. The power control circuit 360 supplies electrical power to each unit of the slot 112 in response to an instruction from the slot control unit 370, for example. The power control circuit 360 will be described later in detail.

In the present embodiment, the slot control unit 370 controls operations of each unit of the slot 112. For example, the slot control unit 370 controls operations of the power control circuit 360 to adjust electrical power supplied from the power control circuit 360 to each unit of the slot 112, thereby controlling the operations of each unit of the slot 112.

More specifically, the slot control unit 370 controls the power control circuit 360 based on an instruction from the charge/discharge control unit 244, to thus control charge and discharge of the battery 20. Further, the slot control unit 370 controls the power control circuit 360 based on an instruction from the lending management unit 248, to thus control locking or unlocking of the locking portion 330.

In the present embodiment, the slot control unit 370 manages the state of each unit of the slot 112. For example, the slot control unit 370 acquires information representing the state of each unit of the slot 112. Further, the slot control unit 370 transmits the information representing the state of each unit of the slot 112 to the state management unit 246.

In one embodiment, the slot control unit 370 acquires information representing a detection result of the battery 20 from the battery detection unit 340. The slot control unit 370 counts the number of times the insertion of the battery 20 is detected. The slot control unit 370 determines or estimates the number of times of accommodation of the battery 20 in the battery accommodation chamber 312 based on the number of times the insertion of the battery 20 is detected. Specifically, the slot control unit 370 assumes the number of times the insertion of the battery 20 is detected as the number of times of accommodation of the battery 20 in the battery accommodation chamber 312, to determine or estimate the number of times of accommodation.

Further, the slot control unit 370 determines or estimates, based on the above-described number of times of accommodation, the number of times of attachment/detachment between the power connector 22 and the power connector 352 or the number of times of attachment/detachment between the communication connector 24 and the communication connector 354. Accordingly, the slot control unit 370 can acquire information representing the number of times of attachment/detachment between the connector of the battery 20 and the connector of the slot 112.

In one embodiment, the slot control unit 370 acquires, regarding the power connector 22 and the power connector 352, the number of times of attachment/detachment between the power connector 22 and the power connector 352. The number of times of attachment/detachment between the power connector 22 and the power connector 352 regarding the power connector 22 and the power connector 352 may simply be referred to as the number of times of attachment/detachment between the power connector 22 and the power connector 352. The above-described number of times of attachment/detachment may be referred to as the number of times of attachment/detachment between the power connector 22 and the power connector 352 regarding the power connector 22, the number of times of attachment/detachment between the power connector 22 and the power connector 352 regarding the power connector 352, the number of times of attachment/detachment in the power connector 22, the number of times of attachment/detachment in the power connector 352, or the like.

In another embodiment, the slot control unit 370 acquires, regarding the communication connector 24 and the communication connector 354, the number of times of attachment/detachment between the communication connector 24 and the communication connector 354. The number of times of attachment/detachment between the communication connector 24 and the communication connector 354 regarding the communication connector 24 and the communication connector 354 may simply be referred to as the number of times of attachment/detachment between the communication connector 24 and the communication connector 354, the number of times of attachment/detachment between the communication connector 24 and the communication connector 354 regarding the communication connector 24, the number of times of attachment/detachment between the communication connector 24 and the communication connector 354 regarding the communication connector 354, the number of times of attachment/detachment in the communication connector 24, the number of times of attachment/detachment in the communication connector 354, or the like.

In another embodiment, the slot control unit 370 acquires information representing an opening/closing state of the opening/closing cover 320. Further, the slot control unit 370 acquires information representing a locking state of the opening/closing cover 320 by the locking portion 330. Further in another embodiment, the slot control unit 370 acquires information representing the charging rate or SOC of the battery 20. When the battery 20 includes a storage device, the slot control unit 370 may read various types of information stored in the storage device of the battery 20.

Further in another embodiment, the slot control unit 370 acquires, from the battery 20, various types of information related to the battery 20. For example, the slot control unit 370 acquires information related to input/output of electrical power in the battery 20, information representing a value of internal resistance of the battery 20, or the like. In addition, the slot control unit 370 acquires, from the power control circuit 360, various types of information related to the power control circuit 360. For example, the slot control unit 370 acquires information related to input/output of electrical power in the slot 112. The slot control unit 370 will be described later in detail.

In the present embodiment, the connector 380 connects the body of the battery station 110 and the slot 112. The connector 380 is configured to be attachable/detachable to/from a connector (not illustrated in FIG. 1) provided in the body of the battery station 110. In the present embodiment, the power connector 382 is electrically connected to the distribution board 220. Further, the communication connector 384 is connected to the station control unit 240 in a communicable manner.

The power control circuit 360 may be an example of the second electrical power device or the charging device. The slot control unit 370 may be an example of the first acquisition unit or the second acquisition unit. The power connector 352 may be an example of the second terminal.

[One example of another embodiment] Note that in the present embodiment, the slot control unit 370 has been described in detail while taking, as an example, the case where the slot control unit 370 determines or estimates the number of times of attachment/detachment of the battery 20 based on the number of times of insertion or number of times of accommodation of the battery 20. However, the slot control unit 370 is not limited to the present embodiment. In another embodiment, the slot control unit 370 may determine the number of times of attachment/detachment of the battery 20 based on an output from an appropriate sensor that actually detects the insertion/removal of the connector of the battery 20 and the connector 350 of the slot 112.

In the present embodiment, the battery management system 100 has been described in detail while taking, as an example, the case where the connection between the power connector 352 and the power connector 22 and the connection between the communication connector 354 and the communication connector 24 are wired connections. However, the battery management system 100 is not limited to the present embodiment. In another embodiment, either one of the connection between the power connector 352 and the power connector 22 or the connection between the communication connector 354 and the communication connector 24 may be a wireless connection.

Figure 4:
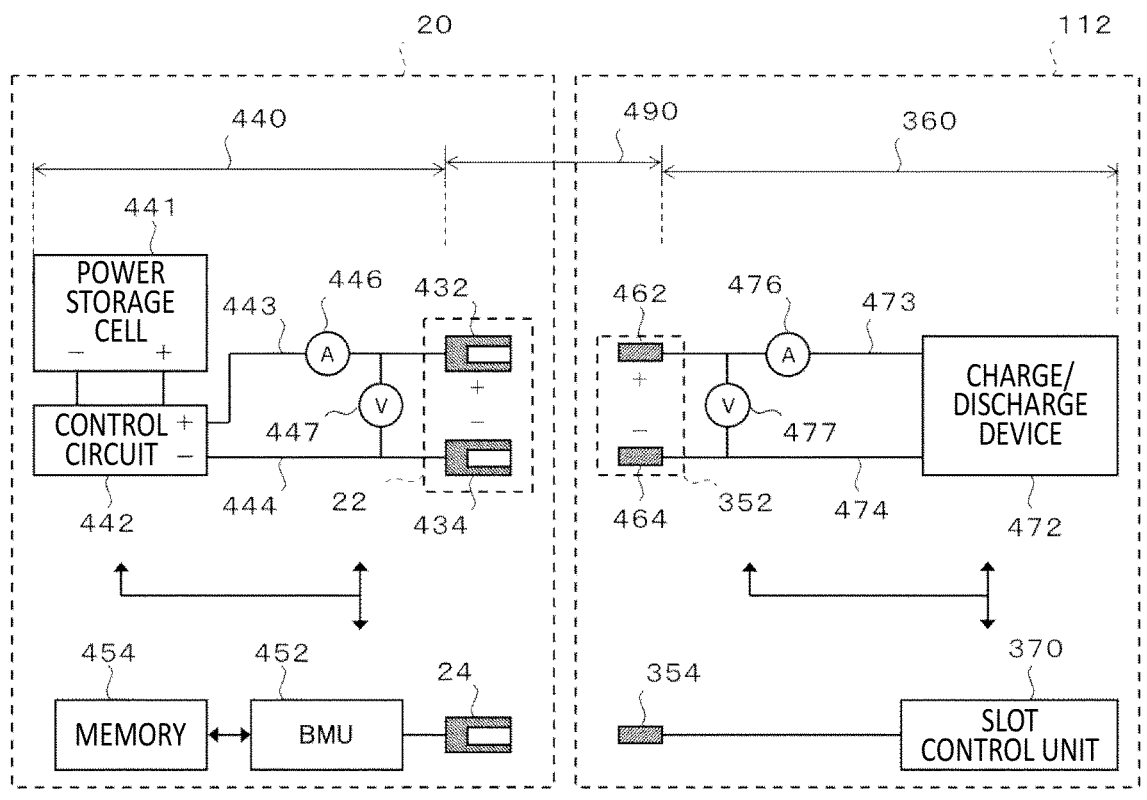
FIG. 4 schematically illustrates an example of an internal configuration of a battery 20.

FIG. 4 schematically illustrates an example of an internal configuration of the battery 20. FIG. 4 also schematically illustrates an example of an internal structure of the slot 112.

As shown in FIG. 4, in the present embodiment, the battery 20 includes the power connector 22 and the internal circuit 440. In the present embodiment, the power connector 22 includes an electric terminal 432 and an electric terminal 434. In the present embodiment, the internal circuit 440 includes a power storage cell 441, a control circuit 442, a wiring 443, a wiring 444, a current detector 446, and a voltage detector 447. In addition, in the present embodiment, the battery 20 includes the communication connector 24, a battery management unit 452 (the battery management unit may be abbreviated to BMU), and a memory 454.

As shown in FIG. 4, in the present embodiment, the slot 112 includes the power connector 352 and the power control circuit 360. In the present embodiment, the power connector 352 includes an electric terminal 462 and an electric terminal 464. In the present embodiment, the power control circuit 360 includes a charge/discharge device 472, a wiring 473, a wiring 474, a current detector 476, and a voltage detector 477. Also in the present embodiment, the slot 112 includes the communication connector 354 and the slot control unit 370.

Note that in the present embodiment, for the purpose of simplifying descriptions, a case where the power connector 22 and the power connector 352 are physically spaced apart from each other at a connection portion 490 between the battery 20 and the slot 112 will be exemplified. When the battery 20 is stored in the slot 112 and the power connector 22 and the power connector 352 are attached to each other, the electric terminal 432 and the electric terminal 462 are electrically connected, and the electric terminal 434 and the electric terminal 464 are electrically connected. Moreover, the communication connector 24 and the communication connector 354 are connected in a communicable manner.

In the present embodiment, the electric terminal 432 is electrically connected to a positive electrode of the power storage cell 441. The electric terminal 432 is electrically connected to the positive electrode of the power storage cell 441 via the control circuit 442 and the wiring 443, for example.

In the present embodiment, the electric terminal 434 is electrically connected to a negative electrode of the power storage cell 441. The electric terminal 434 is electrically connected to the negative electrode of the power storage cell 441 via the control circuit 442 and the wiring 444, for example.

In present embodiment, the internal circuit 440 is electrically connected to the power connector 22. The internal circuit 440 includes, for example, an electric circuit which connects the electric terminal 432 and electric terminal 434 and the power storage cell 441 in series. When the battery 20 is attached to the slot 112, the internal circuit 440 is provided more on the battery 20 side than the power connector 22.

In the present embodiment, the power storage cell 441 accumulates electrical power. The power storage cell 441 receives electrical power output by the slot 112 via the power connector 22. Accordingly, the power storage cell 441 is charged. The power storage cell 441 may also output electrical power to the slot 112 via the power connector 22. Accordingly, the power storage cell 441 is discharged.

In the present embodiment, the control circuit 442 controls charging of the power storage cell 441. For example, the control circuit 442 controls a start or stop of the charging of the power storage cell 441. The control circuit 442 may control at least one of a charging current or charging voltage of the power storage cell 441. The control circuit 442 may also control discharging of the power storage cell 441. For example, the control circuit 442 controls a start or stop of the discharging of the power storage cell 441. The control circuit 442 may control at least one of a discharging current or discharging voltage of the power storage cell 441. Accordingly, the battery 20 can be used as a constant-current power supply or a constant-voltage power supply.

In the present embodiment, the control circuit 442 may control at least one of the charging or discharging of the power storage cell 441 based on an instruction from the battery management unit 452. Moreover, the control circuit 442 executes an operation for measuring a state of the internal circuit 440 based on an instruction from the battery management unit 452.

In one embodiment, the control circuit 442 executes an operation for measuring an open circuit voltage (may be referred to as OCV) of the internal circuit 440 based on an instruction from the battery management unit 452. In another embodiment, the control circuit 442 executes an operation for measuring a closed circuit voltage (may be referred to as CCV) of the internal circuit 440 based on an instruction from the battery management unit 452. Further in another embodiment, the control circuit 442 executes an operation for measuring an operating voltage of the internal circuit 440 based on an instruction from the battery management unit 452.

In the present embodiment, the wiring 443 electrically connects the electric terminal 432 and the positive electrode of the power storage cell 441. The wiring 443 electrically connects the electric terminal 432 and the positive electrode of the power storage cell 441 via the control circuit 442, for example.

In the present embodiment, the wiring 444 electrically connects the electric terminal 434 and the negative electrode of the power storage cell 441. The wiring 444 electrically connects the electric terminal 434 and the negative electrode of the power storage cell 441 via the control circuit 442, for example.

In the present embodiment, the current detector 446 detects a current flowing through the internal circuit 440. The current detector 446 may output information representing a value of the detected current to the battery management unit 452. For example, the current detector 446 is connected in series with the power storage cell 441 at any position on the electric circuit including the electric terminal 432, the wiring 443, the power storage cell 441, the wiring 444, and the electric terminal 434.

In the present embodiment, the voltage detector 447 detects a voltage of the internal circuit 440. The voltage detector 447 may output information representing a value of the detected voltage to the battery management unit 452. For example, the voltage detector 447 is connected in parallel with the power storage cell 441 at any position on the electric circuit including the electric terminal 432, the wiring 443, the power storage cell 441, the wiring 444, and the electric terminal 434.

In the present embodiment, the battery management unit 452 manages the battery 20. The battery management unit 452 transmits and receives information to/from the slot control unit 370 via the communication connector 24 and the communication connector 354. The battery management unit 452 may write information in the memory 454 or may read information stored in the memory 454. The battery management unit 452 may also delete information stored in the memory 454.

In one embodiment, the battery management unit 452 controls operations of the battery 20. For example, the battery management unit 452 controls at least one of charging or discharging of the power storage cell 441. The battery management unit 452 may control the control circuit 442 to control the operations of the battery 20. The battery management unit 452 may control the operations of the battery 20 based on an instruction from the slot control unit 370.

In another embodiment, the battery management unit 452 manages a state of the battery 20. For example, the battery management unit 452 acquires information representing a current value output by the current detector 446. In addition, the battery management unit 452 acquires information representing a voltage value output by the voltage detector 447.

The battery management unit 452 may derive an electrical power amount input to the internal circuit 440 based on the current value detected by the current detector 446 and the voltage value detected by the voltage detector 447 during a period in which the battery 20 is receiving electrical power. The battery management unit 452 may derive an electrical power amount output by the internal circuit 440 based on the current value detected by the current detector 446 and the voltage value detected by the voltage detector 447 during a period in which the battery 20 is outputting electrical power.

The electrical power amount input to the internal circuit 440 and the electrical power amount output by the internal circuit 440 may be electrical power amounts of electricity flowing through the internal circuit 440. Examples of the above-described electrical power amount include an energization efficiency [Wh/unit time], an electrical power amount of passing electrical power or distribution electrical power [Wh], an integrated value of passing currents [Ah], and the like.

The electrical power amount input to the internal circuit 440 may be expressed by an electrical power amount of input electrical power [Wh], may be expressed by a charging efficiency [Wh/unit time], or may be expressed by an integrated value of input currents [Ah]. The electrical power amount output by the internal circuit 440 may be expressed by an electrical power amount of output electrical power [Wh], may be expressed by a discharging efficiency [Wh/unit time], or may be expressed by an integrated value of output currents [Ah].

According to the present embodiment, the current detector 446 and the voltage detector 447 are provided more on the battery 20 side than the power connector 22. Therefore, the battery management unit 452 can derive at least one of the output electrical power amount or the input electrical power amount (may be referred to as the first input/output electrical power amount) more on the battery 20 side than the power connector 22. Accordingly, the battery management unit 452 can acquire the first input/output electrical power amount.

The battery management unit 452 may output information representing the first input/output electrical power amount to the slot control unit 370. The battery management unit 452 may output, to the slot control unit 370, information representing a time or period and information representing the first input/output electrical power amount obtained at the time or during the period in association with each other. The battery management unit 452 may store the information representing the first input/output electrical power amount in the memory 454. The battery management unit 452 may store information representing a first input/output electrical power amount that has been derived last, in the memory 454. The battery management unit 452 may store, in the memory 454, information representing a time or period and information representing a first input/output electrical power amount obtained at the time or during the period in association with each other.

In another embodiment, the battery management unit 452 derives a value of resistance of the internal circuit 440 (may be referred to as internal resistance R of the battery 20). For example, the battery management unit 452 controls the control circuit 442 and measures the open circuit voltage (OCV) and the closed circuit voltage (CCV) of the internal circuit 440 during a period in which charging and discharging of the battery 20 are not performed. Specifically, the battery management unit 452 acquires the voltage value of OCV and the voltage value of CCV that have been detected by the voltage detector 447. Similarly, the battery management unit 452 acquires a current value I that has been detected by the current detector 446 and obtained during the CCV measurement. Accordingly, the battery management unit 452 can derive the internal resistance R of the battery 20 as (voltage value of CCV–voltage value of OCV)/current value I.

Note that the derivation method of the internal resistance R is not limited to the present embodiment. For example, during a period in which the battery 20 is attached to the electric motorbike 34 or the slot 112 and the battery 20 is supplying electrical power to the electric motorbike 34 or the slot 112, the battery management unit 452 measures an inter-terminal voltage between the electric terminal 432 and the electric terminal 434 (may be referred to as an operating voltage E) and the current value I of the output current of the battery 20. Specifically, the battery management unit 452 acquires a voltage value of the operating voltage E and the voltage value of OCV detected by the voltage detector 447. Similarly, the battery management unit 452 acquires the current value I of the output current detected by the current detector 446. Accordingly, the battery management unit 452 can derive the internal resistance R of the battery 20 as (OCV–operating voltage E)/current value I.

The battery management unit 452 may output information representing the internal resistance R to the slot control unit 370. The battery management unit 452 may output, to the slot control unit 370, information representing a time or period and information representing the internal resistance R obtained at the time or during the period in association with each other. The battery management unit 452 may store the information representing the internal resistance R in the memory 454. The battery management unit 452 may store information representing internal resistance R that has been derived last, in the memory 454. The battery management unit 452 may store, in the memory 454, information representing a time or period and information representing the internal resistance R obtained at the time or during the period in association with each other.

In another embodiment, the battery management unit 452 derives a ratio of the electrical power amount exchanged by the internal circuit 440 to the electrical power amount exchanged by the power connector 22 (may be referred to as individual exchange efficiency of the battery 20). The individual exchange efficiency may be expressed by a decimal of 0 or more and 1 or less, or may be expressed by a value of 0% or more and 100% or less using a percentage.

For example, the individual exchange efficiency obtained during charging of the battery 20 (may be referred to as the charging efficiency) is derived as a ratio of the input electrical power amount derived by the battery management unit 452 based on the current detector 446 and the voltage detector 447 to the electrical power amount received by the power connector 22. Similarly, the individual exchange efficiency obtained during discharging of the battery 20 (may be referred to as the discharging efficiency) is derived as a ratio of the electrical power amount output by the power connector 22 to the output electrical power amount derived by the battery management unit 452 based on the current detector 446 and the voltage detector 447.

The battery management unit 452 derives a value of the charging efficiency or the discharging efficiency based on the value of the internal resistance R of the battery 20 described above, for example. Specifically, the battery management unit 452 references information representing a correspondence relationship between the value of the internal resistance R of the battery 20 and the value of the charging efficiency or the discharging efficiency (may be referred to as correspondence relationship information), to derive a value of the charging efficiency or discharging efficiency corresponding to the current internal resistance R of the battery 20. Accordingly, the battery management unit 452 can estimate the value of the charging efficiency or the discharging efficiency as an example of the individual exchange efficiency.

The correspondence relationship information may be a table that stores the value of the internal resistance R of the battery 20 and the value of the charging efficiency or the discharging efficiency in association with each other, or may be a function that uses the charging efficiency or the discharging efficiency as an objective variable and uses the internal resistance R of the battery 20 as an explanatory variable. The correspondence relationship information may be stored in advance in the memory 454, for example.

The battery management unit 452 may output information representing the individual exchange efficiency to the slot control unit 370. The battery management unit 452 may output, to the slot control unit 370, information representing a time or period and information representing the individual exchange efficiency obtained at the time or during the period in association with each other. The battery management unit 452 may store the information representing the individual exchange efficiency in the memory 454. The battery management unit 452 may store information representing individual exchange efficiency that has been derived last, in the memory 454. The battery management unit 452 may store, in the memory 454, information representing a time or period and information representing the individual exchange efficiency obtained at the time or during the period in association with each other.

In the present embodiment, the memory 454 stores various types of information. As described above, the memory 454 stores information representing the value of the internal resistance R of the battery 20. The memory 454 stores information representing the value of the individual exchange efficiency.

The memory 454 may store identification information of the battery 20. The memory 454 may store a usage history of the battery 20. Examples of the usage history include identification information of the user 30 who has used the battery 20, identification information of the electric motor-bike 34 to which the battery 20 is attached, identification information of the battery station 110 or slot 112 storing the battery 20, and the like. The usage history may be information in which (i) information representing a time or period and (ii) at least one of identification information of the user 30 who has used the battery 20, identification information of the electric motorbike 34 to which the battery 20 is attached, or identification information of the battery station 110 or slot 112 storing the battery 20, that has been obtained at the time or during the period, are associated with each other. Other examples of the usage history include a fluctuation of an SOC of the battery 20, a fluctuation of a temperature of the battery 20, and the like.

In the present embodiment, the electric terminal 462 is configured to be attachable to the electric terminal 432. The electric terminal 462 is electrically connected to the electric terminal 432 when the battery 20 is stored in the slot 112, for example. The electric terminal 462 may be electrically connected to the electric terminal 432 when electrical power is exchanged between the slot 112 and the battery 20.

In the present embodiment, the electric terminal 464 is configured to be attachable to the electric terminal 434. The electric terminal 464 is electrically connected to the electric terminal 434 when the battery 20 is stored in the slot 112, for example. The electric terminal 464 may be electrically connected to the electric terminal 434 when electrical power is exchanged between the slot 112 and the battery 20.

In the present embodiment, the charge/discharge device 472 is electrically connected to the power connector 382. The charge/discharge device 472 receives electrical power from the power connector 382 and supplies the electrical power to the battery 20. Accordingly, the battery 20 is charged. Moreover, the charge/discharge device 472 receives electrical power output by the battery 20 and outputs the electrical power to the power connector 382. Accordingly, the battery 20 is discharged.

The charge/discharge device 472 may control charging or discharging of the battery 20 based on an instruction from the slot control unit 370. The charge/discharge device 472 may include one or more power conditioning systems. Examples of the power conditioning system include a one-way AC/DC circuit, a bidirectional AC/DC circuit, a one-way DC/DC circuit, a bidirectional DC/DC circuit, and the like.

In the present embodiment, the wiring 473 electrically connects the electric terminal 462 with one of a pair of electric terminals (not shown) provided in the charge/discharge device 472. In the present embodiment, the wiring 474 electrically connects the electric terminal 464 with the other one of the pair of electric terminals provided in the charge/discharge device 472.

In the present embodiment, the current detector 476 detects a current flowing through the power control circuit 360. The current detector 476 may output information representing a value of the detected current to the slot control unit 370. For example, the current detector 476 is connected in series with the charge/discharge device 472 at any position on the electric circuit including the electric terminal 462, the wiring 473, the charge/discharge device 472, the wiring 474, and the electric terminal 464.

In the present embodiment, the voltage detector 477 detects a voltage of the power control circuit 360. The voltage detector 477 may output information representing a value of the detected voltage to the slot control unit 370. For example, the voltage detector 477 is connected in parallel with the charge/discharge device 472 at any position on the electric circuit including the electric terminal 462, the wiring 473, the charge/discharge device 472, the wiring 474, and the electric terminal 464.

As described above, in the present embodiment, the slot control unit 370 may acquire various types of information related to the battery 20 from the battery management unit 452 of the battery 20. The slot control unit 370 may output various instructions for controlling operations of the battery 20 to the battery management unit 452 of the battery 20. Moreover, the slot control unit 370 may acquire, from the power control circuit 360, various types of information related to the power control circuit 360. The slot control unit 370 may output various instructions for controlling operations of the power control circuit 360 to the power control circuit 360.

Further, the slot control unit 370 may process information acquired from the battery 20 or the power control circuit 360, and generate various indices related to the exchange of electrical power between the battery 20 and the power control circuit 360. For example, the slot control unit 370 derives an electrical power amount output by the power control circuit 360 based on the current value detected by the current detector 476 and the voltage value detected by the voltage detector 477 during a period in which the charge/discharge device 472 is supplying electrical power to the battery 20. The slot control unit 370 may derive an electrical power amount input to the power control circuit 360 based on the current value detected by the current detector 476 and the voltage value detected by the voltage detector 477 during a period in which the charge/discharge device 472 is receiving electrical power from the battery 20.

The electrical power amount input to the power control circuit 360 and the electrical power amount output by the power control circuit 360 may be electrical power amounts of electricity flowing through the power control circuit 360. Examples of the above-described electrical power amount include an energization efficiency [Wh/unit time], an electrical power amount of passing electrical power or distribution electrical power [Wh], an integrated value of passing currents [Ah], and the like.

The electrical power amount input to the power control circuit 360 may be expressed by an electrical power amount of input electrical power [Wh], may be expressed by a charging efficiency [Wh/unit time], or may be expressed by an integrated value of input currents [Ah]. The electrical power amount output by the power control circuit 360 may be expressed by an electrical power amount of output electrical power [Wh], may be expressed by a discharging efficiency [Wh/unit time], or may be expressed by an integrated value of output currents [Ah].

According to the present embodiment, the current detector 476 and the voltage detector 477 are provided more on the slot 112 side than the power connector 352. Therefore, the slot control unit 370 can derive at least one of the output electrical power amount or the input electrical power amount (may be referred to as a second input/output electrical power amount) more on the slot 112 side than the power connector 352. Accordingly, the slot control unit 370 can acquire the second input/output electrical power amount.

In the present embodiment, the slot control unit 370 outputs various types of information related to the battery 20 to the state management unit 246. The slot control unit 370 also outputs various types of information related to the power control circuit 360 to the state management unit 246.

The electric terminal 432 may be an example of the first terminal. The electric terminal 434 may be an example of the first terminal. The power storage cell 441 may be an example of the power storage device. The current detector 446 may be an example of the current detector provided on the first electrical power device side. The voltage detector 447 may be an example of the voltage detector provided on the first electrical power device side. The battery management unit 452 may be an example of the first acquisition unit, the internal resistance derivation unit, or the charging efficiency estimation unit. The memory 454 may be an example of the internal resistance storage unit. The electric terminal 462 may be an example of the second terminal. The electric terminal 464 may be an example of the second terminal. The charge/discharge device 472 may be an example of the second electrical power device or the charging device. The current detector 476 may be an example of the current detector provided on the second electrical power device side. The voltage detector 477 may be an example of the voltage detector provided on the second electrical power device side. The slot control unit 370 may be an example of the first acquisition unit or the second acquisition unit.

At least a part of the power control circuit 360 may be an example of the second electrical power transmission path. The power control circuit 360 excluding the charge/discharge device 472 may be an example of the second electrical power transmission path. The circuit that transmits electrical power in the power control circuit 360 may be an example of the second electrical power transmission path. The circuit that causes electricity to flow between the electric terminal 462 and the electric terminal 464 in the power control circuit 360 may be an example of the second electrical power transmission path. The wiring 473 may be an example of the second electrical power transmission path.

At least a part of the internal circuit 440 may be an example of the first electrical power transmission path. The circuit that transmits electrical power in the internal circuit 440 may be an example of the first electrical power transmission path. The circuit that causes electricity to flow between the electric terminal 432 and the electric terminal 434 in the internal circuit 440 may be an example of the first electrical power transmission path.

[One example of another embodiment] In the present embodiment, for the purpose of simplifying descriptions, the internal structures of the battery 20 and the slot 112 have been described in detail while taking the case where the battery 20 and the slot 112 are electrically connected as an example. As described above, the battery 20 may also be attached to the electric motorbike 34. When the battery 20 is attached to the electric motorbike 34, the power connector 22 of the battery 20 and the power connector of the electric motorbike 34 are electrically connected. The electric motorbike 34 may include an electric circuit similar to that of the slot 112 except that an appropriate power conversion device is provided in place of the charge/discharge device 472.

In the present embodiment, an example of the internal circuit 440 has been described while taking, as an example, the case where the current detector 446 and the voltage detector 447 are used to determine at least one of the input electrical power amount or the output electrical power amount of the internal circuit 440. Moreover, an example of the power control circuit 360 has been described while taking, as an example, the case where the current detector 476 and the voltage detector 477 are used to determine at least one of the input electrical power amount or the output electrical power amount of the power control circuit 360. However, the method of determining the input electrical power amount and the output electrical power amount is not limited to the present embodiment. In another embodiment, any method for determining the electrical power amounts may be adopted.

In the present embodiment, an example of the battery 20 or the battery station 110 has been described while taking the case where the battery management unit 452 derives the value of the internal resistance R of the battery 20 as an example. However, the battery 20 or the battery station 110 is not limited to the present embodiment. In another embodiment, the slot control unit 370 may derive the value of the internal resistance R of the battery 20. In this case, the slot control unit 370 may be an example of the internal resistance derivation unit.

In the present embodiment, an example of the battery 20 or the battery station 110 has been described while taking the case where the battery management unit 452 derives the individual exchange efficiency of the battery 20 as an example. However, the battery 20 or the battery station 110 is not limited to the present embodiment. In another embodiment, the slot control unit 370 may derive the individual exchange efficiency of the battery 20. In this case, the slot control unit 370 may be an example of the charging efficiency estimation unit.

In the present embodiment, the battery management system 100 has been described in detail while taking, as an example, the case where the input/output electrical power amount more on the inner side of the battery 20 than the power connector 22 is measured using the current detector 446 and/or the voltage detector 447. However, the battery management system 100 is not limited to the present embodiment. In another embodiment, the above-described input/output electrical power amount may be measured at any position between the power connector 22 and a power consumption unit or power generation unit provided adjacent to the power connector 22 in the internal circuit 440. For example, the above-described input/output electrical power amount is measured at any position on the wiring 443.

Similarly, in the present embodiment, the battery management system 100 has been described in detail while taking, as an example, the case where the input/output electrical power amount more on the inner side of the slot 112 than the power connector 352 is measured using the current detector 476 and/or the voltage detector 477. However, the battery management system 100 is not limited to the present embodiment. In another embodiment, the above-described input/output electrical power amount may be measured at any position between the power connector 352 and a power consumption unit or power generation unit provided adjacent to the power connector 352 in the power control circuit 360. For example, the above-described input/output electrical power amount is measured at any position on the wiring 473.

The power consumption unit or the power generation unit may be a component in which electrical power changes largely by a flow of a current as compared to a switching element such as a switch. Examples of the power consumption unit or the power generation unit include an inverter, a converter, a battery, a resistor, and the like.

Figure 5:
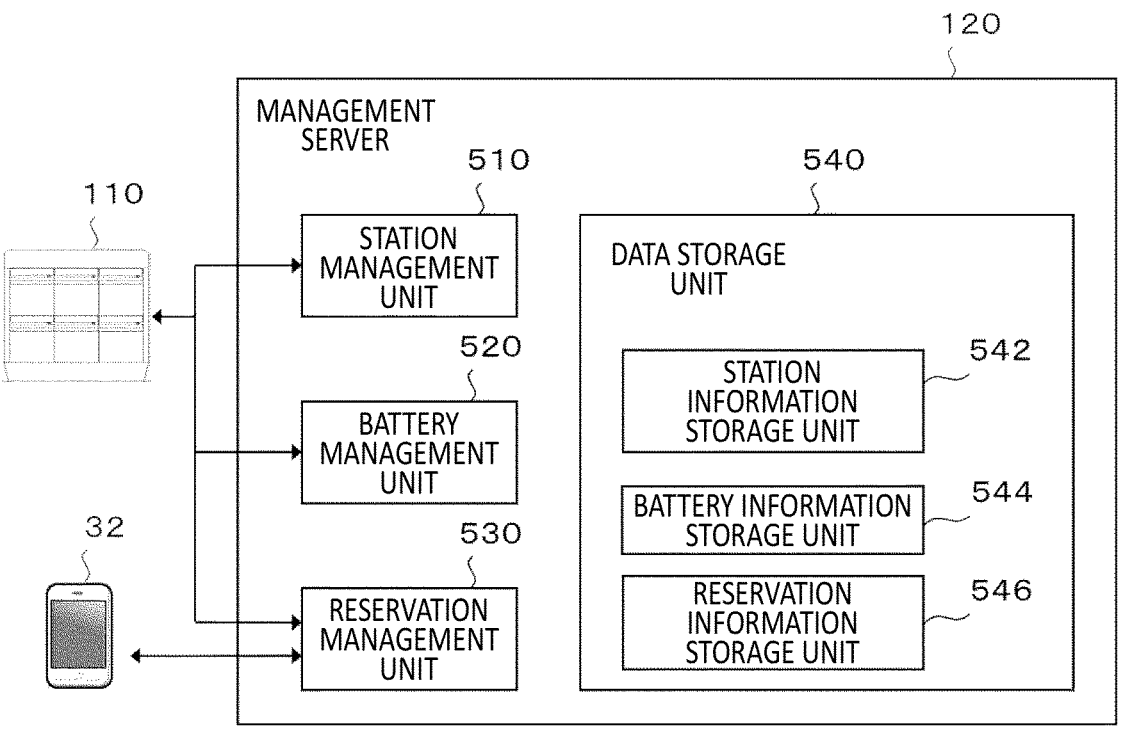
FIG. 5 schematically illustrates an example of an internal configuration of a management server 120.

FIG. 5 schematically illustrates an example of an internal configuration of the management server 120. In the present embodiment, the management server 120 includes, for example, a station management unit 510, a battery management unit 520, a reservation management unit 530, and a data storage unit 540. In the present embodiment, the data storage unit 540 includes a station information storage unit 542, a battery information storage unit 544, and a reservation information storage unit 546.

In the present embodiment, the station management unit 510 manages one or more battery stations 110 constituting the battery management system 100. The station management unit 510 stores various types of information related to each of the one or more battery stations 110 in the station information storage unit 542 of the data storage unit 540.

In the present embodiment, the station management unit 510 acquires various types of information related to each battery station from each of the one or more battery stations 110. The station management unit 510 generates information representing the policy or priority described above for each of the one or more battery stations 110. The station management unit 510 transmits information representing the policy or priority related to each battery station to each of the one or more battery stations 110. The station management unit 510 will be described later in detail.

In the present embodiment, the battery management unit 520 manages one or more batteries 20. The battery management unit 520 manages, for example, at least one of an operational state, a charged state, a storage state, or a deterioration state of each of the one or more batteries 20 to be managed. The battery management unit 520 stores various types of information related to the one or more batteries 20 in the battery information storage unit 544 of the data storage unit 540.

In the present embodiment, the battery management unit 520 manages a charging plan of the one or more batteries 20, for example. For each of the one or more battery stations 110, the battery management unit 520 manages a charging plan of the batteries 20 stored in each battery station.

In one embodiment, the battery management unit 520 creates a charging plan of the batteries 20 based on at least one of a reservation request from the communication terminal 32 or a demand prediction of the battery 20, for example. In another embodiment, the battery management unit 520 acquires, from each of the one or more battery stations 110, information representing a content of the charging plan generated by the charge/discharge control unit 244 of each battery station. Examples of the charging plan include (i) information in which information representing a time and information representing the number of lendable batteries 20 for which charging has been completed before the time are associated with each other, (ii) information in which information representing a time and identification information of the slot 112 for which charging of the battery 20 is to be completed before the time are associated with each other, and the like.

In the present embodiment, the battery management unit 520 manages progress of the charging plan of each of the one or more battery stations 110. For example, the battery management unit 520 acquires, from each of the one or more battery stations 110, information representing a charging rate or SOC of the battery 20 stored in each battery station.

In the present embodiment, the reservation management unit 530 manages a reservation status of the battery 20 to be managed. For example, the reservation management unit 530 accepts a reservation request from the communication terminal 32 and executes reservation processing. The reservation management unit 530 stores information representing a result of executing the reservation processing (may be referred to as reservation information) in the reservation information storage unit 546 of the data storage unit 540. The reservation information includes, for example, information related to a user ID, a lending desired date, a lending desired time, a station ID, a battery ID, a desired charged state, a use fee, a payment method, and the like. The reservation information may include information representing a time at which the reservation request has been accepted (may be referred to as a reservation time) and information representing a position of the user at the reservation time.

In the present embodiment, the data storage unit 540 stores various types of information. In one embodiment, the data storage unit 540 stores information used by information processing in the management server 120. In another embodiment, the data storage unit 540 stores information generated or acquired by the information processing in the management server 120.

The station management unit 510 may be an example of the handling unit.

[One example of another embodiment] In the present embodiment, the battery management system 100 has been described in detail while taking, as an example, the case where (i) the management server 120 generates information representing the policy or priority related to each of the one or more battery stations 110, and (ii) the lending management unit 248 of each battery station selects the battery 20 to be lent out to the user 30 or selects the slot 112 to be used for returning the battery 20 based on the policy or priority. However, the battery management system 100 is not limited to the present embodiment. In another embodiment, at least one of the above-described selection processing of the battery 20 or the selection processing of the slot 112 may be executed in the management server 120 instead of being executed by the lending management unit 248. In this case, the management server 120 or each unit thereof may be an example of the selection unit.

Figure 6:
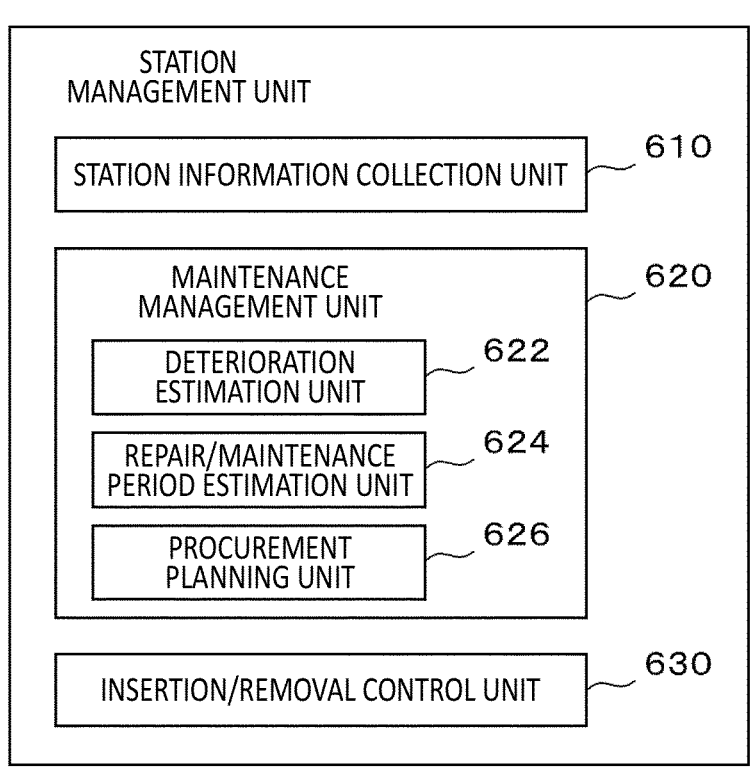
FIG. 6 schematically illustrates an example of an internal configuration of a station management unit 510.

FIG. 6 schematically illustrates an example of an internal configuration of the station management unit 510. In the present embodiment, the station management unit 510 includes, for example, a station information collection unit 610, a maintenance management unit 620, and an insertion/removal control unit 630. In the present embodiment, the maintenance management unit 620 includes a deterioration estimation unit 622, a repair/maintenance period estimation unit 624, and a procurement planning unit 626.

In the present embodiment, the station information collection unit 610 collects various types of information related to each of the one or more battery stations 110. For example, the station information collection unit 610 collects various types of information related to the state of each battery station from the state management unit 246 of each battery station. More specifically, the station information collection unit 610 acquires information representing a state of each of the plurality of slots 112 provided in each battery station.

As described above, an example of the state of each slot is a usage state or deterioration state of each slot. Examples of the usage state or deterioration state of each slot include the number of times of accommodation of the battery 20 in each slot, the number of times of attachment/detachment between each slot and the battery 20, and the like. The above-described number of times of attachment/detachment may be the number of times that has been determined or estimated based on the above-described number of times of accommodation. Moreover, the above-described number of times of accommodation and number of times of attachment/detachment may be used as an example of an index that indicates the deterioration degree of the connector 350 of the slot 112.

In the present embodiment, the maintenance management unit 620 manages a maintenance or repair/maintenance of the battery station 110. For example, the maintenance management unit 620 manages a maintenance plan or a repair/maintenance plan of the battery station 110 or a constituent component thereof. In addition, the maintenance management unit 620 manages a procurement plan of a component, equipment, fixture, or the like used for the maintenance or repair/maintenance of the battery station 110.

In the present embodiment, the deterioration estimation unit 622 estimates a deterioration degree of the battery station 110 or a constituent component thereof. For example, the deterioration estimation unit 622 estimates a deterioration degree of the power connector 352 or communication connector 354 of the slot 112.

More specifically, the deterioration estimation unit 622 acquires, from the station information collection unit 610 or the station information storage unit 542, information representing the number of times of attachment/detachment between each slot and the battery 20, for each of the one or more battery stations 110. Then, the deterioration estimation unit 622 determines or estimates the deterioration degree of the power connector 352 or communication connector 354 of each slot based on the number of times of attachment/detachment between each slot and the battery 20.

In one embodiment, the deterioration estimation unit 622 estimates a deterioration degree of at least one of the power connector 22 or the power connector 352 regarding the power connector 22 and the power connector 352. The deterioration degree of at least one of the power connector 22 or the power connector 352 regarding the power connector 22 and the power connector 352 may simply be referred to as a deterioration degree of at least one of the power connector 22 or the power connector 352, a deterioration degree in at least one of the power connector 22 or the power connector 352, or the like.

In another embodiment, the deterioration estimation unit 622 estimates a deterioration degree of at least one of the communication connector 24 or the communication connector 354 regarding the communication connector 24 and the communication connector 354. The deterioration degree of at least one of the communication connector 24 or the communication connector 354 regarding the communication connector 24 and the communication connector 354 may simply be referred to as a deterioration degree of at least one of the communication connector 24 or the communication connector 354, a deterioration degree in at least one of the communication connector 24 or the communication connector 354, or the like.

For example, the deterioration estimation unit 622 determines or estimates a deterioration degree of each connector based on an accumulated value of the above-described number of times of attachment/detachment obtained during a period from a usage start time point of each connector to an estimation processing execution time point. More specifically, the deterioration estimation unit 622 determines or estimates the deterioration degree of each connector based on the above-described accumulated value of the number of times of attachment/detachment and the number of times of attachment/detachment guaranteed by a manufacturer or seller of each connector (may be referred to as the guaranteed number of times).

For example, the deterioration estimation unit 622 determines a remaining period before the accumulated value of the number of times of attachment/detachment in each connector reaches the guaranteed number of times, as the deterioration degree of each connector. More specifically, first, the deterioration estimation unit 622 calculates, based on the above-described accumulated value of the number of times of attachment/detachment obtained during the period from the usage start time point of each connector to the estimation processing execution time point, the number of times of attachment/detachment of the battery 20 per unit period for each slot 112 in each of the one or more battery stations 110. Examples of the unit period include one day, one week, two weeks, four weeks, one month, and the like. As described above, the number of times of attachment/detachment of the battery 20 indicates the number of times of accommodation, the number of times of return, the number of times of lending, or the number of times of replacement of the battery 20.

For example, when a fluctuation of the number of times of attachment/detachment of the battery 20 per unit period is relatively small and the accumulated value of the number of times of attachment/detachment of the battery 20 shows linearity with respect to an elapsed time from the usage start time point of the slot 112 or the connector 350, and when the guaranteed number of times related to a particular connector is represented by A [times], the accumulated value of the number of times of attachment/detachment of the battery 20 obtained during the period from the usage start time point of the connector to the estimation processing execution time point is represented by B [times], a length of the above-described period is represented by Y [months], and a length of the above-described remaining period is represented by X [months], the deterioration estimation unit 622 calculates the above-described remaining period based on the following Mathematical Expression 1.

$$X = (A/B - 1) \times Y \qquad \text{(Mathematical Expression 1)}$$

Note that the method of calculating the above-described remaining period by the deterioration estimation unit 622 is not limited to the above-described embodiment. In another embodiment, the deterioration estimation unit 622 derives, based on data of the above-described accumulated value of the number of times of attachment/detachment obtained during the period from the usage start time point of each connector to the estimation processing execution time point, an approximate function that uses the above-described accumulated value of the number of times of attachment/detachment as an objective function and uses the elapsed time from the usage start time point of the slot 112 or the connector 350 as an explanatory variable. Based on the above-described approximate function, the deterioration estimation unit 622 calculates the remaining period before the accumulated value of the number of times of attachment/detachment of each connector reaches the guaranteed number of times. Further in another embodiment, based on the length of the period from the usage start time point of each connector and the above-described accumulated value of the number of times of attachment/detachment obtained during the period, the deterioration estimation unit 622 estimates the above-described X from the above-described B and Y using an estimation model generated by machine learning for estimating the above-described remaining period.

Further in another embodiment, the deterioration estimation unit 622 may estimate, based on a state of an anomaly caused in each of the plurality of slots 112 provided in the battery station 110, a deterioration degree of (i) the power connector 22 of the battery 20 stored in each slot and/or (ii) the power connector 352 of each slot. The deterioration estimation unit 622 may estimate, based on a degree of an anomaly caused in each of the plurality of slots 112 provided in the battery station 110, a deterioration degree of (i) the power connector 22 of the battery 20 stored in each slot and/or (ii) the power connector 352 of each slot.

Note that as described above, the anomaly is an example of a type of an anomalous change or a degree of an anomalous change, and a degree of an anomaly is an example of the degree of an anomalous change. The deterioration estimation unit 622 may execute different processing depending on the type or degree of the anomalous change. For example, the deterioration estimation unit 622 executes different processing for a case where it is judged that an anomaly has occurred and a case where it is judged that a sign of an anomaly has occurred.

For example, when a value of a parameter related to the charging efficiency described above is 5 to 6, an anomalous change is detected, and processing for prompting a maintenance crew to inspect various connectors is executed. For example, when the value of the above-described parameter is 3 to 4, a sign of an anomaly is detected, and processing for prompting the maintenance crew to clean various connectors is executed. For example, when the value of the above-described parameter is 0 to 2, an anomaly is detected, and processing for prompting the maintenance crew to replace various connectors or a component of the various connectors, replace the slot 112, or replace the battery 20 is executed. Examples of the processing for prompting the maintenance crew to take various actions include a transmission of a message, an output of a warning or an alert, and the like.

The inspection of various connectors may be an example of the maintenance of the battery 20 or the battery station 110. The cleaning of various connectors may be an example of the maintenance or repair/maintenance of the battery 20 or the battery station 110. The above-described various replacements may be an example of the repair/maintenance of the battery 20 or the battery station 110.

In the present embodiment, the repair/maintenance period estimation unit 624 estimates, for each of the one or more battery stations 110, a repair/maintenance period of the battery station or constituent components thereof. For example, the repair/maintenance period estimation unit 624 estimates the repair/maintenance period of the battery station or constituent components thereof based on a deterioration degree of each battery station or constituent components thereof that has been estimated by the deterioration estimation unit 622. In the present embodiment, the repair/maintenance period estimation unit 624 estimates the above-described repair/maintenance period based on the above-described deterioration degree and a reference that has been predetermined in consideration of durability of the battery station 110 or constituent components thereof. Information representing the above-described predetermined reference is stored in the station information storage unit 542, for example.

More specifically, in one embodiment, when the number of times of attachment/detachment between the connector 350 of the slot 112 and the power connector 22 or communication connector 24 of the battery 20 is larger than a predetermined value (may be referred to as the endurable number of times of insertion/removal), the repair/maintenance period estimation unit 624 judges that the replacement period of the slot 112 or the connector 350 has arrived. In another embodiment, the repair/maintenance period estimation unit 624 estimates a period in which the above-described number of times of attachment/detachment exceeds the predetermined endurable number of times of insertion/removal based on a past history of the number of times of attachment/detachment between the connector 350 of the slot 112 and the power connector 22 or communication connector 24 of the battery 20. The number of times of attachment/detachment guaranteed by the manufacturer or seller of each connector may be an example of the endurable number of times of insertion/removal.

In one embodiment, when the repair/maintenance period of the battery station or constituent components thereof has arrived for each of the one or more battery stations 110, the repair/maintenance period estimation unit 624 outputs, to the procurement planning unit 626, for example, information representing an arrival of the above-described repair/maintenance period. In another embodiment, the repair/maintenance period estimation unit 624 outputs, to the procurement planning unit 626, for example, information representing a period in which repair/maintenance of the battery station or constituent components thereof is predicted to be performed (may be referred to as a repair/maintenance prediction period) for each of the one or more battery stations 110.

Further in another embodiment, the repair/maintenance period estimation unit 624 estimates, based on a state of an anomaly caused in each of the plurality of slots 112 provided in the battery station 110, the repair/maintenance period of the battery station or constituent components thereof. The repair/maintenance period estimation unit 624 may estimate, based on a degree of an anomaly caused in each of the plurality of slots 112 provided in the battery station 110, the repair/maintenance period of the battery station or constituent components thereof. For example, based on the state of an anomaly caused in each of the plurality of slots 112 provided in the battery station 110, the repair/maintenance period of (i) the power connector 22 of the battery 20 stored in each slot and/or (ii) the power connector 352 of each slot is estimated.

Note that as described above, the anomaly is an example of a type of an anomalous change or a degree of an anomalous change, and a degree of an anomaly is an example of the degree of an anomalous change. The repair/maintenance period estimation unit 624 may execute different processing depending on the type or degree of an anomalous change. For example, the repair/maintenance period estimation unit 624 executes different processing for a case where it is judged that an anomaly has occurred and a case where it is judged that a sign of an anomaly has occurred.

For example, when a value of a parameter related to the charging efficiency described above is 5 to 6, an anomalous change is detected, and processing for prompting a maintenance crew to inspect various connectors is executed. For example, when the value of the above-described parameter is 3 to 4, a sign of an anomaly is detected, and processing for prompting the maintenance crew to clean various connectors is executed. For example, when the value of the above-described parameter is 0 to 2, an anomaly is detected, and processing for prompting the maintenance crew to replace various connectors or a component of the various connectors, replace the slot 112, or replace the battery 20 is executed. Examples of the processing for prompting the maintenance crew to take various actions include a transmission of a message, an output of a warning or an alert, and the like.

In the present embodiment, the procurement planning unit 626 generates at least a part of a manufacturing plan or a distribution plan of replacement equipment, a replacement component, repair/maintenance goods, or repair/maintenance equipment (may be referred to as a product) to be used for the maintenance or repair/maintenance of at least one of the battery stations 110. The manufacturing plan may be information in which (i) information representing a delivery date, (ii) information representing a type and specification of a product, and (iii) information representing the number of products are associated with one another. The manufacturing plan may also include information representing a price of the product. The distribution plan may be information in which (i) information representing a delivery time of a product and (ii) information representing a delivery destination of the product are associated with each other. The distribution plan may also include information representing a delivery cost of the product.

For example, when, in a maintenance or repair/maintenance of a particular battery station 110, the whole particular battery station 110 is to be replaced, the procurement planning unit 626 generates at least a part of a manufacturing plan and a delivery plan of a new battery station 110. Moreover, when, in a maintenance or repair/maintenance of a particular battery station 110, a whole particular slot 112 is to be replaced, the procurement planning unit 626 generates at least a part of a manufacturing plan and a delivery plan of a new slot 112. Similarly, when, in a maintenance or repair/maintenance of a particular battery station 110, some of constituent components of a particular slot 112 are to be replaced or repaired, the procurement planning unit 626 generates at least a part of a manufacturing plan and a delivery plan of a replacement product or repair goods for the constituent components.

Moreover, the procurement planning unit 626 outputs information to be supplied to the above-described manufacturing plan or distribution plan. For example, in response to a request from a terminal (not shown) used by the administrator or maintenance and repair/maintenance personnel of the battery station 110, the procurement planning unit 626 outputs information to be supplied to the above-described manufacturing plan or distribution plan as a response to the request. An example of the information to be supplied to the manufacturing plan or distribution plan is at least one of information representing a completion period of a product, information representing a type and specification of a product, information representing the number of products, information representing a price of a product, information representing a delivery time of a product, information representing a delivery destination of a product, or information representing a delivery cost of a product.

According to the present embodiment, the station management unit 510 manages the number of times of accommodation of the battery 20 in each of the one or more slots 112, the number of times of attachment/detachment of the battery 20, and the like. Accordingly, by predicting a progress of deterioration of the slot 112, the station management unit 510 can relatively accurately estimate the replacement period of the slot 112. As a result, a stock of replacement components or the like is maintained at an appropriate level, and stock management costs for the replacement components or the like can be suppressed.

Note that as described above, the anomaly is an example of a type of an anomalous change or a degree of an anomalous change, and a degree of an anomaly is an example of the degree of an anomalous change. The procurement planning unit 626 may execute different processing depending on the type or degree of an anomalous change. For example, the procurement planning unit 626 executes different processing for a case where it is judged that an anomaly has occurred and a case where it is judged that a sign of an anomaly has occurred.

For example, when a value of a parameter related to the charging efficiency described above is 5 to 6, an anomalous change is detected, and processing for prompting a maintenance crew to inspect various connectors is executed. For example, when the value of the above-described parameter is 3 to 4, a sign of an anomaly is detected, and processing for prompting the maintenance crew to clean various connectors is executed. For example, when the value of the above-described parameter is 0 to 2, an anomaly is detected, and processing for prompting the maintenance crew to replace various connectors or a component of the various connectors, replace the slot 112, or replace the battery 20 is executed. Examples of the processing for prompting the maintenance crew to take various actions include a transmission of a message, an output of a warning or an alert, and the like.

The procurement planning unit 626 may procure an article necessary for the above-described inspection, cleaning, or replacement. According to the present embodiment, since different processing are executed depending on the type or degree of an anomalous change, a necessary article may also differ depending on the type or degree of an anomalous change. Accordingly, the procurement planning unit 626 can execute different processing depending on the type or degree of an anomalous change.

In the present embodiment, the insertion/removal control unit 630 controls lending and return of the battery 20 in each of the one or more battery stations 110. For example, the insertion/removal control unit 630 generates a control signal for controlling insertion/removal of the battery 20 in each of the one or more battery stations 110, and transmits the control signal to each battery station. Accordingly, the lending and return of the battery 20 in each battery station can be controlled.

In one embodiment, the insertion/removal control unit 630 generates a control signal including information representing the policy or priority described above. For example, the insertion/removal control unit 630 generates, based on a deterioration degree of the plurality of slots 112 provided in the battery station 110 to be controlled, information representing a policy or priority related to the battery station 110 to be controlled.

More specifically, the insertion/removal control unit 630 acquires, from the station information collection unit 610, information representing the number of times of detection of the battery 20, information representing the number of times of accommodation of the battery 20, or information representing the number of times of attachment/detachment between each slot and the battery 20, in each slot of the battery station 110 to be controlled. As the number of times of detection of the battery 20 in the slot 112, the number of times of accommodation of the battery 20, or the number of times of attachment/detachment between each slot and the battery 20 increases, the deterioration degree of the slot 112 also becomes larger.

For example, the insertion/removal control unit 630 determines the priority of each slot such that the priority becomes higher as the deterioration degree of the slot 112 becomes smaller. In this case, as the lending and return of the battery 20 are repeated based on the control signal including the above-described information representing the priority, an unbalanced state of the deterioration degrees of the plurality of slots 112 provided in the battery station 110 may be eliminated.

For example, the insertion/removal control unit 630 determines the priority of each slot such that the priority becomes higher as the deterioration degree of the slot 112 becomes larger. In this case, as the lending and return of the battery 20 are repeated based on the control signal including the above-described information representing the priority, the deterioration of a particular slot 112 may be promoted more than the deterioration of other slots 112.

In another embodiment, the insertion/removal control unit 630 generates a control signal including identification information of the slot 112 accommodating the battery 20 to be lent out to a particular user 30 or the battery 20 to be lent out next. A control signal including identification information of the slot 112 that is to accept the battery 20 to be returned from a particular user 30 or the battery 20 to be returned next is generated. The insertion/removal control unit 630 generates the above-described control signal based on the deterioration degree of the plurality of slots 112 provided in battery station 110 to be controlled.

More specifically, in one embodiment, the insertion/removal control unit 630 selects the slot 112 to be a control target of the lending processing such that the battery 20 accommodated in the slot 112 having a smaller deterioration degree is provided more preferentially to the user 30 than the battery 20 accommodated in the slot 112 having a larger deterioration degree. Similarly, the insertion/removal control unit 630 selects the slot 112 to be a control target of the return processing such that the slot 112 having a smaller deterioration degree accepts the battery 20 more preferentially than the slot 112 having a larger deterioration degree. In this case, as the lending and return of the battery 20 are repeated based on the above-described control signal including the identification information of the slot 112, the unbalanced state of the deterioration degrees of the plurality of slots 112 provided in the battery station 110 may be eliminated.

In another embodiment, the insertion/removal control unit 630 selects the slot 112 to a control target of the lending processing such that the battery 20 accommodated in the slot 112 having a larger deterioration degree is provided more preferentially to the user 30 than the battery 20 accommodated in the slot 112 having a smaller deterioration degree. Similarly, the insertion/removal control unit 630 selects the slot 112 to be a control target of the return processing such that the slot 112 having a larger deterioration degree accepts the battery 20 more preferentially than the slot 112 having a smaller deterioration degree. In this case, as the lending and return of the battery 20 are repeated based on the above-described control signal including the identification information of the slot 112, deterioration of a particular slot 112 may be promoted more than the deterioration of other slots 112.

The station information collection unit 610 may be an example of the attachment/detachment information acquisition unit, the deterioration information acquisition unit, or the information acquisition device. The maintenance management unit 620 may be an example of the estimation unit, the repair/maintenance information acquisition unit, the first output unit, or the second output unit. The deterioration estimation unit 622 may be an example of the estimation unit. The procurement planning unit 626 may be an example of the repair/maintenance information acquisition unit or the first output unit. The insertion/removal control unit 630 may be an example of the attachment/detachment information acquisition unit, the deterioration information acquisition unit, or the information acquisition device. The insertion/removal control unit 630 may be an example of the selection unit. The information representing an arrival of the repair/maintenance period of the battery station 110 may be an example of the repair/maintenance information. The information representing the period in which the repair/maintenance of the battery station 110 or constituent components thereof is predicted to be performed may be an example of the repair/maintenance information.

The station information collection unit 610 may be an example of the reception unit. The maintenance management unit 620 may be an example of the comparison unit.

[One example of another embodiment] The allocation of the information processing in the battery station 110 and the information processing in the management server 120 is not limited to the present embodiment. A part of the information processing in the battery station 110 according to the present embodiment may be executed in the management server 120, and a part of the information processing in the management server 120 according to the present embodiment may be executed in the battery station 110.

For example, in the present embodiment, the battery management system 100 has been described in detail while taking the case where the maintenance management unit 620 is provided in the management server 120 as an example. However, the battery management system 100 is not limited to the present embodiment. In another embodiment, all or a part of the maintenance management unit 620 may be provided in the battery station 110.

For example, in the present embodiment, the battery management system 100 has been described in detail while taking, as an example, the case where the battery management system 100 executes the processing of acquiring various electrical power amounts, the processing of comparing the various electrical power amounts, the processing of judging whether various anomalous changes have occurred, the processing of handling the various anomalous changes, and the like. In the present embodiment, (a) the battery station 110 has executed the processing of acquiring the various electrical power amounts, the processing of comparing the various electrical power amounts, and the processing of judging whether the various anomalous changes have occurred, and (b) the management server 120 has executed the processing of handling the various anomalous changes.

More specifically, the state management unit 246 of each battery station has executed the processing for managing at state of each of the plurality of slots 112 provided in each battery station, the station information collection unit 610 of the management server 120 has acquired the information representing the state of each of the plurality of slots 112 provided in each battery station, and the maintenance management unit 620 of the management server 120 has executed the various types of information processing. As described above, examples of the state of each slot include (i) a usage state or deterioration state of each slot, (ii) presence or absence of an anomaly caused in each slot, a type of the anomaly, a degree of the anomaly, and the like. However, the battery management system 100 is not limited to the present embodiment.

In another embodiment, (a) the battery station 110 may execute the processing of acquiring the various electrical power amounts, and (b) the management server 120 may execute the processing of acquiring the various electrical power amounts from the battery station 110, the processing of comparing the various electrical power amounts, the processing of judging whether various anomalous changes have occurred, and the processing of handling the various anomalous changes.

The processing of acquiring, by the management server 120, the various electrical power amounts from the battery station 110 is realized by, for example, the station information collection unit 610 of the management server 120 receiving information representing the various electrical power amounts from the battery station 110. In the management server 120, the processing of comparing the various electrical power amounts and the processing of judging whether various anomalous changes have occurred are executed by, for example, the station information collection unit 610 or the maintenance management unit 620. The processing of handling the various anomalous changes is executed by, for example, the maintenance management unit 620.

In this case, the station information collection unit 610 may be an example of the reception unit or the comparison unit. The maintenance management unit 620 may be an example of the comparison unit or the handling unit.

Figure 7:
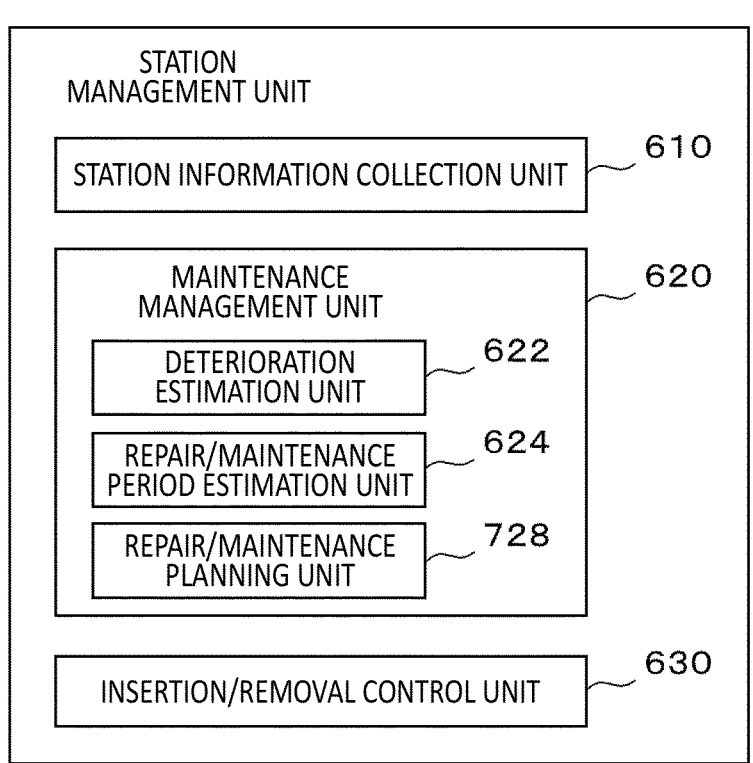
FIG. 7 schematically illustrates an example of an internal configuration of a station management unit 710.

FIG. 7 schematically illustrates an example of an internal configuration of the station management unit 710. The station management unit 710 may be an example of another embodiment of the station management unit 510. In the present embodiment, the station management unit 710 differs from the station management unit 510 in that the maintenance management unit 620 includes a repair/maintenance planning unit 728 in place of the procurement planning unit 626. A difference from the station management unit 510 is that the repair/maintenance period estimation unit 624 outputs the above-described information representing an arrival of the repair/maintenance period or the above-described information representing the repair/maintenance prediction period to the repair/maintenance planning unit 728. Regarding configurations other than the above-described different points, the station management unit 710 may have features similar to those of the station management unit 510.

In the present embodiment, the repair/maintenance planning unit 728 generates, for at least one of the battery stations 110, at least a part of the maintenance plan or repair/maintenance plan of the battery station or constituent components thereof. Examples of the constituent components of the battery station 110 include the slot 112, the connector 350, the power connector 352, the communication connector 354, and the like. Examples of the maintenance or repair/maintenance of the battery station 110 or constituent components thereof include a replacement of the battery station 110, a repair or replacement of the constituent components of the battery station 110, and the like. Examples of the replacement of the constituent components of the battery station 110 include a replacement of the slot 112, a replacement of the connector 350, a replacement of the power connector 352 or the communication connector 354, and the like.

For example, the repair/maintenance planning unit 728 acquires, from the repair/maintenance period estimation unit 624, at least one of (i) the information representing an arrival of the repair/maintenance period of at least one of the battery stations 110 or (i) information representing the repair/maintenance prediction period of at least one of the battery stations 110 or constituent components thereof. Based on at least one of the above-described information representing an arrival of the repair/maintenance period or the information representing the repair/maintenance prediction period, the repair/maintenance planning unit 728 generates at least a part of the maintenance plan or repair/maintenance plan of the battery station or constituent components thereof.

The maintenance plan or the repair/maintenance plan may be information in which (a) information representing a time or period and (b) information representing at least one of (i) a content of a work performed at the time or during the period, (ii) the number of hours or number of man hours of the above-described work, (iii) replacement equipment, a replacement component, repair/maintenance goods, or repair/maintenance equipment used in the above-described work, (iv) costs of the above-described work (for example, cumulative costs or budgets), or (v) a condition related to a maintenance and repair/maintenance personnel who performs the work at the time or during the period are associated with each other. Examples of the above-described work include an inspection, repair, replacement, and the like. Examples of the condition related to a maintenance and repair/maintenance personnel include conditions related to the number of the maintenance and repair/maintenance personnels, identification information of the maintenance and repair/maintenance personnel, a skill required for the maintenance and repair/maintenance personnel, a labor cost of the maintenance and repair/maintenance personnel, and the like.

Further, the repair/maintenance planning unit 728 outputs information to be supplied to the above-described maintenance plan or repair/maintenance plan. For example, in response to a request from a terminal (not shown) used by an administrator or maintenance and repair/maintenance personnel of the battery station 110, the repair/maintenance planning unit 728 outputs information to be supplied to the above-described maintenance plan or repair/maintenance plan as a response to the request. An example of the information to be supplied to the maintenance plan or repair/maintenance plan is at least one of information representing a time or period of the work, information representing a content of the work, information representing the number of hours or number of man hours of the work, information representing replacement equipment, a replacement component, repair/maintenance goods, or repair/maintenance equipment used in the work, information representing costs of the work, or information representing a condition related to a maintenance and repair/maintenance personnel who performs the work.

Accordingly, for example, when the number of slots 112 that require a maintenance or repair/maintenance is larger than a predetermined value, when a ratio of the number of slots 112 that require a maintenance or repair/maintenance to the number of slots 112 provided in the battery station 110 is larger than a predetermined value, or the like, the administrator or maintenance and repair/maintenance personnel of the battery station 110 can determine to replace the whole battery station 110 in consideration of the construction costs and labor costs. On the other hand, for example, when the number of slots 112 that require a maintenance or repair/maintenance is smaller than a predetermined value, when the ratio of the number of slots 112 that require a maintenance or repair/maintenance to the number of slots 112 provided in the battery station 110 is smaller than a predetermined value, or the like, the administrator or maintenance and repair/maintenance personnel of the battery station 110 can determine to replace the slot 112 in consideration of the construction costs and the labor costs.

According to the present embodiment, for example, the administrator or maintenance and repair/maintenance personnel of the battery station 110 can perform a component replacement work according to a plan prepared in advance. Accordingly, an excess in the number of man hours of maintenance workers can be suppressed. As a result, a reduction of the number of man hours in maintenance and a reduction of maintenance costs can be realized.

Note that as described above, the anomaly is an example of a type of an anomalous change or a degree of an anomalous change, and a degree of an anomaly is an example of the degree of an anomalous change. The repair/ maintenance planning unit 728 may execute different processing depending on the type or degree of an anomalous change. For example, the repair/maintenance planning unit 728 executes different processing for a case where it is judged that an anomaly has occurred and a case where it is judged that a sign of an anomaly has occurred.

For example, when a value of a parameter related to the charging efficiency described above is 5 to 6, an anomalous change is detected, and processing for prompting a maintenance crew to inspect various connectors is executed. For example, when the value of the above-described parameter is 3 to 4, a sign of an anomaly is detected, and processing for prompting the maintenance crew to clean various connectors is executed. For example, when the value of the above-described parameter is 0 to 2, an anomaly is detected, and processing for prompting the maintenance crew to replace various connectors or a component of the various connectors, replace the slot 112, or replace the battery 20 is executed. Examples of the processing for prompting the maintenance crew to take various actions include a transmission of a message, an output of a warning or an alert, and the like.

According to the present embodiment, since different processing are executed depending on the type or degree of an anomalous change, a content of the maintenance or repair/maintenance also differs depending on the type or degree of the anomalous change. Accordingly, the repair/maintenance planning unit 728 can execute different processing depending on the type or degree of the anomalous change.

The repair/maintenance planning unit 728 may be an example of the handling unit.

[One example of another embodiment] In the present embodiment, the station management unit 710 which is another embodiment of the station management unit 510 has been described in detail while taking, as an example, the case where the maintenance management unit 620 includes the repair/maintenance planning unit 728 in place of the procurement planning unit 626. However, the another embodiment of the station management unit 510 is not limited to the present embodiment. In further another embodiment of the station management unit 510, the maintenance management unit 620 may include the repair/maintenance planning unit 728 together with the procurement planning unit 626.

Figure 8:
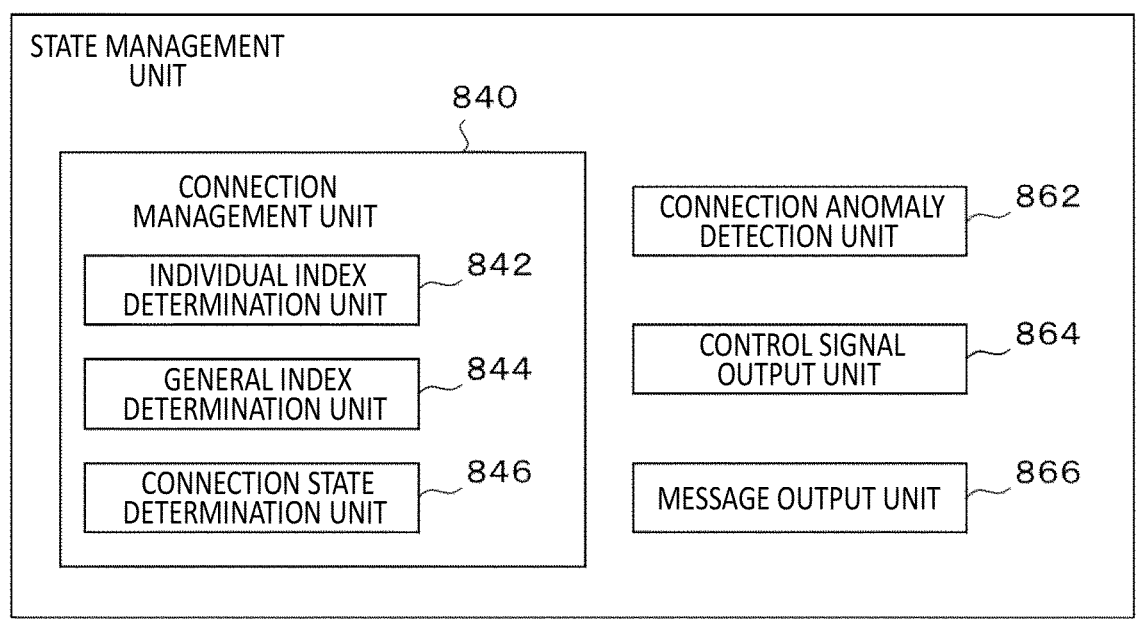
FIG. 8 schematically illustrates an example of an internal configuration of a state management unit 246.

FIG. 8 schematically illustrates an example of an internal configuration of the state management unit 246. In the present embodiment, the state management unit 246 includes a connection management unit 840, a connection anomaly detection unit 862, a control signal output unit 864, and a message output unit 866. In the present embodiment, the connection management unit 840 includes an individual index determination unit 842, a general index determination unit 844, and a connection state determination unit 846. In the present embodiment, each unit of the state management unit 246 is configured to be capable of communicating with one another.

In the present embodiment, the connection management unit 840 manages an electrical connection state between the battery 20 and the slot 112. An example of the electrical connection state between the battery 20 and the slot 112 is at least one of a state related to electric characteristics of the power connector 22, a state related to electric characteristics of the power connector 352, or a connection state between the power connector 22 and the power connector 352.

Examples of the state related to the electric characteristics of the power connector 22 include a deterioration state of the power connector 22, a state of an electric resistance of the power connector 22, and the like. Examples of the state related to the electric characteristics of the power connector 352 include a deterioration state of the power connector 352, a state of an electric resistance of the power connector 352, and the like. Examples of the connection state between the power connector 22 and the power connector 352 include presence or absence of foreign matter inclusion between the power connector 22 and the power connector 352, a state of a foreign matter that has entered between the power connector 22 and the power connector 352, an attachment state of the power connector 22 and the power connector 352, and the like. In the present embodiment, the individual index determination unit 842 determines a value of an index that indicates a degree of the individual exchange efficiency (may be referred to as an individual index) described in relation to FIG. 4. The individual index may be the individual exchange efficiency itself, or may be a physical quantity used for transmitting the individual exchange efficiency. Examples of the individual index include internal resistance of the internal circuit 440, a charging loss of the battery 20, a discharging loss of the battery 20, charging efficiency of the battery 20, discharging efficiency of the battery 20, and the like.

The charging loss of the battery 20 is derived as, for example, a value obtained by subtracting, from an electrical power amount received by the power connector 22, an input electrical power amount derived by the battery management unit 452 based on the current detector 446 and the voltage detector 447. Similarly, the discharging loss of the battery 20 is derived as a value obtained by subtracting an electrical power amount output by the power connector 22 from an output electrical power amount derived by the battery management unit 452 based on the current detector 446 and the voltage detector 447.

In one embodiment, the individual index determination unit 842 acquires information representing a value of the individual index from the slot control unit 370. In another embodiment, the individual index determination unit 842 derives a value of the individual index based on the information acquired from the slot control unit 370.

In the present embodiment, the general index determination unit 844 determines a value of an index that indicates a degree of a ratio of an electrical power amount exchanged by the battery 20 to an electrical power amount exchanged by the slot 112 (may be referred to as general exchange efficiency) (may be referred to as a general index). The general index may be the general exchange efficiency itself, or may be a physical quantity used for transmitting the general exchange efficiency. Examples of the general index include (i) the first input/output electrical power amount, (ii) the second input/output electrical power amount, (iii) a difference between the first input/output electrical power amount and the second input/output electrical power amount, (iv) an absolute value of the difference between the first input/output electrical power amount and the second input/output electrical power amount, (v) a ratio of the first input/output electrical power amount to the second input/output electrical power amount during a charging period of the battery 20, (vi) a ratio of the second input/output electrical power amount to the first input/output electrical power amount during a discharging period of the battery 20, (vii) a value of resistance of an electric circuit including the electric terminal 462, the electric terminal 432, the wiring 443, the power storage cell 441, the wiring 444, the electric terminal 434, and the electric terminal 464 (may be referred to as general resistance), and the like.

In one embodiment, the general index determination unit 844 acquires information representing a value of the general index from the slot control unit 370. In another embodiment, the general index determination unit 844 derives a value of the general index based on the information acquired from the slot control unit 370.

In the present embodiment, the connection state determination unit 846 determines an electrical connection state between the battery 20 and the slot 112 based on the value of the individual index determined by the individual index determination unit 842 and the value of the general index determined by the general index determination unit 844. For example, the connection state determination unit 846 compares the first input/output electrical power amount and the second input/output electrical power amount obtained when input/output of electrical power is performed between the power connector 22 and the power connector 352 in a state where the power connector 22 and the power connector 352 are attached to each other, to thus determine the electrical connection state between the battery 20 and the slot 112 (may be referred to as a connection state between the battery 20 and the slot 112). The connection state determination unit 846 will be described later in detail.

In the present embodiment, the connection anomaly detection unit 862 detects an anomaly of the connection state between the battery 20 and the slot 112. For example, the connection anomaly detection unit 862 detects an anomaly of the connection state between the battery 20 and the slot 112 based on a determination result of the connection state determination unit 846. For example, the connection anomaly detection unit 862 determines whether an anomaly has occurred in the connection state between the battery 20 and the slot 112 based on a result of the comparison between the first input/output electrical power amount and the second input/output electrical power amount.

For example, when the determination result of the connection state determination unit 846 or the result of the comparison between the first input/output electrical power amount and the second input/output electrical power amount satisfies a predetermined condition, the connection anomaly detection unit 862 determines that an anomaly has occurred in at least one of the power connector 22, the power connector 352, or the connection portion 490 between the power connector 22 and the power connector 352. The information processing in the connection anomaly detection unit 862 will be described later in detail.

In the present embodiment, the control signal output unit 864 outputs a control signal for controlling an operation of the slot 112 to at least one of the charge/discharge control unit 244 or the lending management unit 248. For example, the control signal output unit 864 outputs the above-described control signal based on the determination result of the connection state determination unit 846. For example, the control signal output unit 864 outputs the above-described control signal based on the result of the comparison between the first input/output electrical power amount and the second input/output electrical power amount.

The above-described control signal may be a signal for prohibiting or suppressing the input/output of electrical power via the power connector 22 and the power connector 352. Accordingly, charging and discharging of the battery 20 in the slot 112 for which an anomaly has been detected by the connection anomaly detection unit 862 are prohibited or suppressed.

The above-described control signal may be a signal for prohibiting or suppressing return and lending of the battery 20. Accordingly, return and lending of the battery 20 in the slot 112 for which an anomaly has been detected by the connection anomaly detection unit 862 are prohibited or suppressed.

In the present embodiment, the message output unit 866 outputs a message indicating that an anomaly has occurred in the connection state between the battery 20 and the slot 112. For example, the message output unit 866 outputs the above-described message based on the determination result of the connection state determination unit 846. For example, the message output unit 866 outputs the above-described message based on the result of the comparison between the first input/output electrical power amount and the second input/output electrical power amount. A destination of the message may be a predetermined communication terminal of an operator or maintenance person of the battery station 110.

The connection management unit 840 may be an example of the comparison system or the management device. The general index determination unit 844 may be an example of the first acquisition unit or the second acquisition unit. The connection state determination unit 846 may be an example of the comparison unit. The connection anomaly detection unit 862 may be an example of the handling unit. The control signal output unit 864 may be an example of the handling unit. The message output unit 866 may be an example of the handling unit. The message indicating that an anomaly has occurred in the connection state between the battery 20 and the slot 112 may be an example of information representing that an anomaly has occurred in at least one of the first terminal, the second terminal, or the connection portion between the first terminal and the second terminal.

Figure 9:
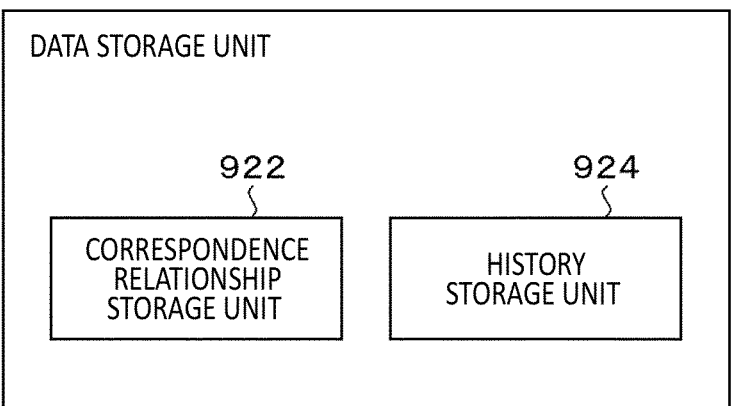
FIG. 9 schematically illustrates an example of an internal configuration of a data storage unit 250.

FIG. 9 schematically illustrates an example of an internal configuration of the data storage unit 250. In the present embodiment, the data storage unit 250 includes a correspondence relationship storage unit 922 and a history storage unit 924.

In the present embodiment, the correspondence relationship storage unit 922 stores information representing a correspondence relationship (may be referred to as correspondence relationship information) between a value of the internal resistance R of the battery 20 and a value of the individual exchange efficiency of the battery 20. The correspondence relationship information may be a table that stores the value of the internal resistance R of the battery 20 and the value of the individual exchange efficiency of the battery 20 in association with each other, or may be a function that uses the individual exchange efficiency of the battery 20 as an objective variable and uses the internal resistance R of the battery 20 as an explanatory variable.

The correspondence relationship information may be information representing a correspondence relationship between the value of the internal resistance R of the battery 20 and a value of the first input/output electrical power amount of the battery 20. The correspondence relationship information may be a table that stores the value of the internal resistance R of the battery 20 and the value of the first input/output electrical power amount of the battery 20 in association with each other, or may be a function that uses the first input/output electrical power amount of the battery 20 as an objective variable and uses the internal resistance R of the battery 20 as an explanatory variable.

In one embodiment, the correspondence relationship storage unit 922 stores correspondence relationship information that can be applied in common to the plurality of batteries 20. In another embodiment, the correspondence relationship storage unit 922 stores correspondence relationship information for each battery 20.

In the present embodiment, the history storage unit 924 stores information representing a history (may be referred to as history information) of the determination result of the connection state determination unit 846. The history storage unit 924 may also store information representing a history of the result of the comparison between the first input/output electrical power amount and the second input/output electrical power amount.

For example, the history storage unit 924 stores information representing a history of a relationship between the individual exchange efficiency and the general exchange efficiency of the battery 20 stored in each of the one or more slots 112. An example of the relationship between the individual exchange efficiency and the general exchange efficiency is at least one of a difference between the individual exchange efficiency and the general exchange efficiency, a ratio of the general exchange efficiency to the individual exchange efficiency, or statistical values of these. Examples of the difference between the individual exchange efficiency and the general exchange efficiency include a value obtained by subtracting the general exchange efficiency from the individual exchange efficiency, an absolute value of the difference between the individual exchange efficiency and the general exchange efficiency, and the like.

Examples of the statistical value include an average value, a central value, a dispersion, a deviation, a standard deviation, and the like. The above-described statistical value may be a statistical value related to the one or more batteries 20 stored in the slots 112 during a predetermined period of the past, or may be a statistical value related to a predetermined number of batteries 20 out of the batteries 20 that haven been stored in the slots 112 in the past.

In one embodiment, the history storage unit 924 stores history information for each battery station 110. In another embodiment, the history storage unit 924 stores history information for each slot 112.

The history storage unit 924 may be an example of the storage unit.

Figure 10:
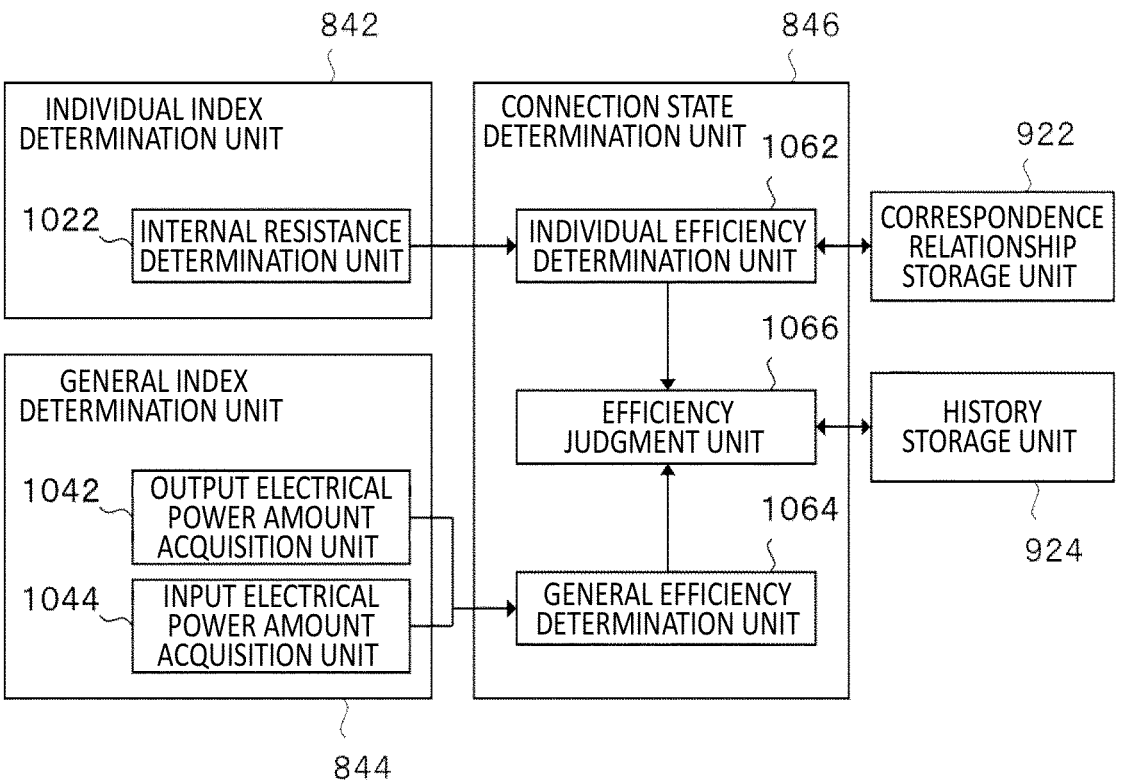
FIG. 10 schematically illustrates an example of an internal configuration of each unit of a connection management unit 840.

FIG. 10 schematically illustrates an example of an internal configuration of each unit of the connection management unit 840. Using FIG. 10, an example of information processing in the connection management unit 840 will be described. In the present embodiment, the individual index determination unit 842 includes an internal resistance determination unit 1022. In the present embodiment, the general index determination unit 844 includes an output electrical power amount acquisition unit 1042 and an input electrical power amount acquisition unit 1044. In the present embodiment, the connection state determination unit 846 includes an individual efficiency determination unit 1062, a general efficiency determination unit 1064, and an efficiency judgment unit 1066.

In the present embodiment, the internal resistance determination unit 1022 determines a value of the internal resistance R of the battery 20 stored in the slot 112. The internal resistance determination unit 1022 may determine the value of the internal resistance R of the battery 20 obtained when input/output of electrical power is performed between the battery 20 and the slot 112 in a state where the power connector 22 of the battery 20 and the power connector 352 of the slot 112 are attached to each other.

In one embodiment, the internal resistance determination unit 1022 acquires, from the slot control unit 370, information representing the value of the internal resistance R of the battery 20 inserted into the slot 112. In the present embodiment, the value of the internal resistance R of the battery 20 is derived by the battery management unit 452, for example.

When the communication connector 24 of the battery 20 and the communication connector 354 of the slot 112 are connected, the slot control unit 370 acquires the information representing the value of the internal resistance R of the battery 20 stored in the memory 454. The slot control unit 370 outputs the information representing the value of the internal resistance R of the battery 20 to the state management unit 246. Accordingly, the internal resistance determination unit 1022 can acquire the information representing the value of the internal resistance R of the battery 20.

In another embodiment, the internal resistance determination unit 1022 derives the value of the internal resistance R of the battery 20. For example, the internal resistance determination unit 1022 acquires, from the slot control unit 370, a measurement result of the open circuit voltage (OCV) and the closed circuit voltage (CCV) of the internal circuit 440 obtained during a period in which charging and discharging of the battery 20 are not performed and a measurement result of a current value obtained during the CCV measurement. The internal resistance determination unit 1022 derives the internal resistance R of the battery 20 as (voltage value of CCV−voltage value of OCV)/current value I. Note that as described above, the derivation method of the internal resistance R is not limited to the present embodiment.

In the present embodiment, the output electrical power amount acquisition unit 1042 acquires information representing an electrical power amount output by the battery 20 or the slot 112. The output electrical power amount acquisition unit 1042 may acquire information representing an electrical power amount that has been output per unit time. As the unit time, a period having any length may be set. The unit time may be 1 minute, may be 5 minutes, may be 10 minutes, may be 15 minutes, may be 30 minutes, or may be 1 hour.

For example, during a charging period of the battery 20, the output electrical power amount acquisition unit 1042 acquires information representing the electrical power amount output by the power control circuit 360 of the slot 112. Accordingly, the output electrical power amount acquisition unit 1042 can acquire an input/output electrical power amount obtained more on the slot 112 side than the power connector 352. As described in relation to FIG. 4, the electrical power amount output by the power control circuit 360 of the slot 112 is derived based on detection values of the current detector 476 and the voltage detector 477 provided in the power control circuit 360, for example.

Similarly, during a discharging period of the battery 20, the output electrical power amount acquisition unit 1042 may acquire information representing an electrical power amount output by the internal circuit 440 of the battery 20. Accordingly, the output electrical power amount acquisition unit 1042 can acquire an input/output electrical power amount obtained more on the battery 20 side than the power connector 22. As described in relation to FIG. 4, the electrical power amount output by the internal circuit 440 of the battery 20 is derived based on detection values of the current detector 446 and the voltage detector 447 provided in the internal circuit 440, for example.

In the present embodiment, the input electrical power amount acquisition unit 1044 acquires information representing an electrical power amount input to the battery 20 or the slot 112. The input electrical power amount acquisition unit 1044 may acquire the information representing the electrical power amount that has been input per unit time. As the unit time, a period having any length may be set. The unit time may be 1 minute, may be 5 minutes, may be 10 minutes, may be 15 minutes, may be 30 minutes, or may be 1 hour.

For example, during a charging period of the battery 20, the input electrical power amount acquisition unit 1044 may acquire information representing the electrical power amount input to the internal circuit 440 of the battery 20. Accordingly, the input electrical power amount acquisition unit 1044 can acquire an input/output electrical power amount obtained more on the battery 20 side than the power connector 22. As described in relation to FIG. 4, the electrical power amount input to the internal circuit 440 of the battery 20 is derived based on the detection values of the current detector 446 and the voltage detector 447 provided in the internal circuit 440, for example.

Note that the procedure for acquiring the electrical power amount input to the internal circuit 440 of the battery 20 is not limited to the above-described embodiment. In another embodiment, the input electrical power amount acquisition unit 1044 may derive the electrical power amount input to the internal circuit 440 of the battery 20 based on the internal resistance R of the battery 20. For example, the input electrical power amount acquisition unit 1044 acquires, from the slot control unit 370, information representing the detection values of the current detector 446 and the voltage detector 447 provided in the internal circuit 440. Moreover, the input electrical power amount acquisition unit 1044 determines the internal resistance R of the battery 20 based on the detection values of the current detector 446 and the voltage detector 447. The input electrical power amount acquisition unit 1044 derives the electrical power amount input to the internal circuit 440 of the battery 20 based on the internal resistance R of the battery 20, a current value of a charging current of the battery 20, and a charging time.

Similarly, during a discharging period of the battery 20, the input electrical power amount acquisition unit 1044 acquires information representing the electrical power amount input to the power control circuit 360 of the slot 112. Accordingly, the input electrical power amount acquisition unit 1044 can acquire an input/output electrical power amount obtained more on the slot 112 side than the power connector 352. As described in relation to FIG. 4, the electrical power amount input to the power control circuit 360 of the slot 112 is derived based on the detection values of the current detector 476 and the voltage detector 477 provided in the power control circuit 360, for example.

In the present embodiment, the individual efficiency determination unit 1062 determines individual exchange efficiency based on a value of the individual index determined by the individual index determination unit 842. In one embodiment, the individual efficiency determination unit 1062 derives the individual exchange efficiency of the battery 20 based on a value of the internal resistance R of the battery 20 determined by the internal resistance determination unit 1022. Examples of the individual exchange efficiency of the battery 20 include charging efficiency of the battery 20, discharging efficiency of the battery 20, and the like.

The individual efficiency determination unit 1062 may derive the individual exchange efficiency of the battery 20 by a procedure similar to the procedure for deriving the individual exchange efficiency in the battery management unit 452, that has been described in relation to FIG. 4. The individual efficiency determination unit 1062 may use the correspondence relationship information stored in the correspondence relationship storage unit 922 to derive the individual exchange efficiency of the battery 20. Accordingly, the individual efficiency determination unit 1062 can estimate the charging efficiency or discharging efficiency of the battery 20 based on the value of the internal resistance R of the battery 20 acquired by the internal resistance determination unit 1022.

Note that the procedure for determining the individual exchange efficiency is not limited to the above-described embodiment. In another embodiment, when the battery management unit 452 derives the individual exchange efficiency of the battery 20 (for example, the charging efficiency or discharging efficiency of the battery 20), the individual efficiency determination unit 1062 may acquire, from the slot control unit 370, information representing a value of the individual exchange efficiency of the battery 20 derived by the battery management unit 452.

In the present embodiment, the general efficiency determination unit 1064 determines general exchange efficiency based on a value of the general index determined by the general index determination unit 844. The general efficiency determination unit 1064 may determine the general exchange efficiency based on the output electrical power amount acquired by the output electrical power amount acquisition unit 1042 and the input electrical power amount acquired by the input electrical power amount acquisition unit 1044.

The general exchange efficiency of the battery 20 and the slot 112 is expressed as a product of the individual exchange efficiency of the battery 20 and the electrical power exchange efficiency at the connection portion 490 between the power connector 22 and the power connector 352. Since the numerical range of the values of the above-described efficiencies is 0 or more and 1 or less or 0% or more and 100% or less, it means that as a difference between the individual exchange efficiency of the battery 20 and the general exchange efficiency of the battery 20 and the slot 112 becomes smaller, the electrical power exchange efficiency at the connection portion 490 between the power connector 22 and the power connector 352 becomes more favorable. Therefore, (i) when the difference between the individual exchange efficiency of the battery 20 and the general exchange efficiency of the battery 20 and the slot 112 is larger than a predetermined value or (ii) when the difference between the individual exchange efficiency of the battery 20 and the general exchange efficiency of the battery 20 and the slot 112 increases abruptly, it may be presumed that an anomaly has occurred at the connection portion 490 between the power connector 22 and the power connector 352.

In one embodiment, the general efficiency determination unit 1064 calculates a ratio of the input electrical power amount [Wh] of the internal circuit 440 acquired by the input electrical power amount acquisition unit 1044 to the output electrical power amount [Wh] of the power control circuit 360 acquired by the output electrical power amount acquisition unit 1042, to derive the general exchange efficiency of the battery 20 and the slot 112 during the charging period of the battery 20. The unit of the general exchange efficiency may be dimensionless, or may be %.

In another embodiment, the general efficiency determination unit 1064 calculates a ratio of the input electrical power amount [Wh] of the power control circuit 360 acquired by the input electrical power amount acquisition unit 1044 to the output electrical power amount [Wh] of the internal circuit 440 acquired by the output electrical power amount acquisition unit 1042, to derive the general exchange efficiency of the battery 20 and the slot 112 during the discharging period of the battery 20. The unit of the general exchange efficiency may be dimensionless, or may be %. In the present embodiment, the efficiency judgment unit 1066 judges an electrical connection state between the battery 20 and the slot 112. The efficiency judgment unit 1066 compares the individual exchange efficiency determined by the individual efficiency determination unit 1062 and the general exchange efficiency determined by the general efficiency determination unit 1064. The efficiency judgment unit 1066 judges the electrical connection state between the battery 20 and the slot 112 based on the above-described comparison result. More specifically, the efficiency judgment unit 1066 judges the electrical connection state between the battery 20 and the slot 112 based on the difference between the individual exchange efficiency determined by the individual efficiency determination unit 1062 and the general exchange efficiency determined by the general efficiency determination unit 1064.

As described above, the general efficiency determination unit 1064 determines the general exchange efficiency by comparing the output electrical power amount acquired by the output electrical power amount acquisition unit 1042 and the input electrical power amount acquired by the input electrical power amount acquisition unit 1044 when input/output of electrical power is performed between the battery 20 and the slot 112 in a state where the power connector 22 and the power connector 352 are attached to each other. Therefore, the efficiency judgment unit 1066 can judge the electrical connection state between the battery 20 and the slot 112 based on the result of the comparison between the output electrical power amount acquired by the output electrical power amount acquisition unit 1042 and the input electrical power amount acquired by the input electrical power amount acquisition unit 1044.

In addition, as described above, history information representing a comparison result of the past is stored in the history storage unit 924. In this regard, the efficiency judgment unit 1066 may judge the electrical connection state between the battery 20 and the slot 112 based on the comparison result obtained this time and the comparison result of the past. The information processing in the efficiency judgment unit 1066 will be described later in detail.

The efficiency judgment unit 1066 may output information representing the judgment result to the connection anomaly detection unit 862. Accordingly, the connection anomaly detection unit 862 can determine presence or absence of an anomaly based on the judgment result of the efficiency judgment unit 1066. The connection anomaly detection unit 862 may determine at least one of the presence or absence of an anomaly, the type of an anomaly, or the degree of an anomaly based on the judgment result of the efficiency judgment unit 1066.

For example, based on the comparison result of the comparison unit, the connection anomaly detection unit 862 (*i*) determines that an anomaly has occurred in at least one of the power connector 22, the power connector 352, or the connection portion 490 between the power connector 22 and the power connector 352. Moreover, the connection anomaly detection unit 862 may determine the type of an anomaly based on a plurality of comparison results of the past stored in the history storage unit 924. Examples of the type of an anomaly include deterioration of an electric terminal, foreign matter inclusion, and the like. When a degree of a change of the plurality of comparison results exceeds a predetermined level, the connection anomaly detection unit 862 may determine that a sudden anomaly has occurred at the connection portion 490 between the power connector 22 and the power connector 352. An example of the sudden anomaly is foreign matter inclusion. The information processing in the connection anomaly detection unit 862 will be described later in detail.

When an anomaly is detected, the connection anomaly detection unit 862 may transmit information representing that an anomaly has been detected to the management server 120. The information representing that an anomaly has been detected may include information representing at least one of the type of an anomaly or the degree of an anomaly. When the detected anomaly satisfies a predetermined condition, the connection anomaly detection unit 862 may transmit the information representing that an anomaly has been detected to the management server 120. When the detected anomaly does not satisfy the predetermined condition, the connection anomaly detection unit 862 does not need to transmit the information representing that an anomaly has been detected to the management server 120. Examples of the predetermined condition include a condition that the type of an anomaly is a predetermined type, a condition that the degree of an anomaly is larger than a predetermined degree, and the like.

Accordingly, the management server 120 can accurately plan a maintenance or repair/maintenance of at least one of the battery 20 or the slot 112. For example, based on the information transmitted from the connection anomaly detection unit 862, the management server 120 can generate maintenance and repair/maintenance information including at least one of (i) information representing an arrival of the maintenance of repair/maintenance period of the power connector 22 or the power connector 352 or (ii) information representing a maintenance and repair/maintenance prediction period which is a period in which a maintenance or repair/maintenance of the power connector 22 or the power connector 352 is predicted to be performed.

More specifically, the repair/maintenance period estimation unit 624 of the management server 120 can estimate the repair/maintenance period of the power connector 22 or the power connector 352 based on the above-described information representing at least one of the type of an anomaly or the degree of an anomaly. Similarly, the procurement planning unit 626 of the management server 120 can generate a procurement plan of the power connector 22 or the power connector 352. Moreover, the repair/maintenance planning unit 728 of the management server 120 can generate a repair/maintenance plan of the power connector 22 or the power connector 352.

The output electrical power amount acquisition unit 1042 may be an example of one of the first acquisition unit or the second acquisition unit. The input electrical power amount acquisition unit 1044 may be an example of the other one of the first acquisition unit or the second acquisition unit. The individual efficiency determination unit 1062 may be an example of the charging efficiency estimation unit. The general efficiency determination unit 1064 may be an example of the first acquisition unit, the second acquisition unit, the comparison unit, or the comparison device. The efficiency judgment unit 1066 may be an example of the comparison unit. The repair/maintenance period estimation unit 624 may be an example of the handling unit. The procurement planning unit 626 may be an example of the handling unit. The repair/maintenance planning unit 728 may be an example of the handling unit.

The electrical power amount output by the battery 20 or the slot 112 may be an example of one of the first electrical power amount or the second electrical power amount. The electrical power amount output by the power control circuit 360 of the slot 112 may be an example of one of the first electrical power amount or the second electrical power amount. The input/output electrical power amount obtained more on the slot 112 side than the power connector 352 may be an example of one of the first electrical power amount or the second electrical power amount. The electrical power amount input to the battery 20 or the slot 112 may be an example of the other one of the first electrical power amount or the second electrical power amount. The electrical power amount input to the internal circuit 440 of the battery 20 may be an example of the other one of the first electrical power amount or the second electrical power amount. The input/ output electrical power amount obtained more on the battery 20 side than the power connector 22 may be an example of the other one of the first electrical power amount or the second electrical power amount.

Figure 11:
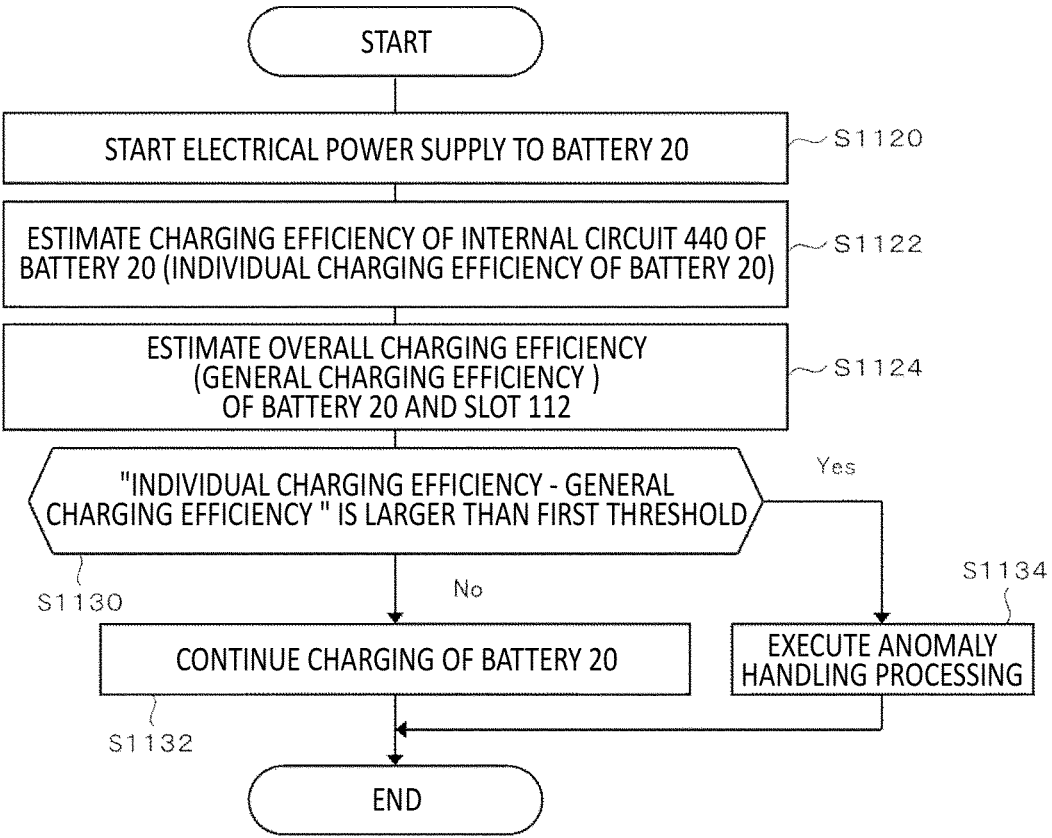
FIG. 11 schematically illustrates an example of information processing performed during charging in the connection management unit 840.

FIG. 11 schematically illustrates an example of information processing performed during charging in the connection management unit 840. According to the present embodiment, first, in Step 1120 (Step may be abbreviated to S), the battery 20 is attached to the slot 112, and the slot 112 starts an electrical power supply to the battery 20.

Next, in S1122, charging efficiency of the internal circuit 440 of the battery 20 (may be referred to as the individual charging efficiency) is estimated. The individual charging efficiency may be individual exchange efficiency obtained during charging of the battery 20.

In one embodiment, the internal resistance determination unit 1022 acquires a value of the internal resistance R of the battery 20 from the slot control unit 370. The individual efficiency determination unit 1062 references the correspondence relationship information stored in the correspondence relationship storage unit 922, to determine a value of the charging efficiency corresponding to the value of the internal resistance R acquired by the internal resistance determination unit 1022. Accordingly, the charging efficiency of the internal circuit 440 of the battery 20 is estimated. In another embodiment, the individual efficiency determination unit 1062 acquires, from the slot control unit 370, information representing the value of the charging efficiency of the internal circuit 440 of the battery 20 estimated by the battery management unit 452. Accordingly, the charging efficiency of the internal circuit 440 of the battery 20 is estimated.

Next, in S1124, an overall charging efficiency (may be referred to as a general charging efficiency) of the battery 20 and the slot 112 is estimated. The general charging efficiency may be general exchange efficiency obtained during charging.

Specifically, the output electrical power amount acquisition unit 1042 acquires, from the slot control unit 370, information representing an electrical power amount output by the power control circuit 360 of the slot 112. The above-described electrical power amount may be an electrical power amount per unit time. Moreover, the input electrical power amount acquisition unit 1044 acquires, from the slot control unit 370, information representing the electrical power amount input to the internal circuit 440 of the battery 20. The above-described electrical power amount may be an electrical power amount per unit time. Further, the general efficiency determination unit 1064 calculates a ratio of the input electrical power amount acquired by the input electrical power amount acquisition unit 1044 to the output electrical power amount acquired by the output electrical power amount acquisition unit 1042, to derive the general charging efficiency. Accordingly, the general charging efficiency of the battery 20 and the slot 112 is estimated.

Next, in S1130, it is judged whether the result of the comparison between the individual charging efficiency and the general charging efficiency satisfies a predetermined condition (may be referred to as a first anomaly condition). Specifically, the efficiency judgment unit 1066 compares a magnitude relationship between a value obtained by subtracting the general charging efficiency from the individual charging efficiency and a first threshold. Since the value of the general charging efficiency is usually smaller than the value of the individual charging efficiency, the value obtained by subtracting the general charging efficiency from the individual charging efficiency becomes a positive value.

When the value obtained by subtracting the general charging efficiency from the individual charging efficiency is smaller than the first threshold (the case of No in S1130), continuance of charging of the battery 20 is determined in S1132. For example, since an electrical power loss at the connection portion 490 between the power connector 22 and the power connector 352 is small when the individual charging efficiency is 98% and the general charging efficiency is 97.5%, it is presumed that the deterioration of the power connector 22 and the power connector 352 has not progressed, and that foreign matter inclusion has not occurred at the connection portion 490 between the power connector 22 and the power connector 352.

In this regard, in one embodiment, the efficiency judgment unit 1066 outputs, to the connection anomaly detection unit 862, information representing a comparison result indicating that the value obtained by subtracting the general charging efficiency from the individual charging efficiency is smaller than the first threshold. The connection anomaly detection unit 862 determines that an anomaly has not occurred at the connection portion 490 between the power connector 22 and the power connector 352 based on the above-described comparison result. In another embodiment, when the value obtained by subtracting the general charging efficiency from the individual charging efficiency is smaller than the first threshold, the efficiency judgment unit 1066 does not need to transmit the information representing the comparison result to the connection anomaly detection unit 862. Accordingly, the processing ends.

On the other hand, when the value obtained by subtracting the general charging efficiency from the individual charging efficiency is larger than the first threshold (the case of Yes in S1130), anomaly handling processing is executed in S1134. Specifically, the efficiency judgment unit 1066 outputs, to the connection anomaly detection unit 862, information representing a comparison result indicating that the value obtained by subtracting the general charging efficiency from the individual charging efficiency is larger than the first threshold. The connection anomaly detection unit 862 determines that an anomaly has occurred at the connection portion 490 between the power connector 22 and the power connector 352 based on the above-described comparison result. The connection anomaly detection unit 862 may estimate at least one of the type of an anomaly or the degree of an anomaly.

The connection anomaly detection unit 862 outputs, to the control signal output unit 864 and the message output unit 866, information representing that an anomaly has occurred at the connection portion 490 between the power connector 22 and the power connector 352. The connection anomaly detection unit 862 may also transmit, to the management server 120, information representing that an anomaly has occurred at the connection portion 490 between the power connector 22 and the power connector 352.

When the control signal output unit 864 receives the above-described information representing that an anomaly has occurred, the control signal output unit 864 outputs, to the charge/discharge control unit 244, a control signal for prohibiting or suppressing input/output of electrical power via the power connector 22 and the power connector 352. The charge/discharge control unit 244 stops charging of the battery 20 based on the above-described control signal. When the message output unit 866 receives the above-described information representing that an anomaly has occurred, the message output unit 866 outputs a message indicating that an anomaly has occurred in the connection state between the battery 20 and the slot 112. Moreover, when the management server 120 receives the above-described information representing that an anomaly has occurred, the management server 120 generates the maintenance and repair/maintenance information described above. Accordingly, the processing ends.

[One example of another embodiment] In the present embodiment, the information processing in the battery management system 100 has been described in detail while taking, as an example, the case where the connection management unit 840 of the battery station 110 executes the information processing in S1122, S1124, S1130, and S1132. However, the information processing in the battery management system 100 is not limited to the present embodiment. In another embodiment, the management server 120 may receive various types of information from the battery station 110 and execute the information processing in at least one of the steps of S1122, S1124, S1130, and S1132 using the information.

Similarly, the information processing in the battery management system 100 has been described in detail while taking, as an example, the case where, in S1134 of the present embodiment, the connection management unit 840 of the battery station 110 executes the judgment processing on whether an anomaly which is an example of an anomalous change has occurred and the estimation processing of at least one of the type of an anomaly or the degree of an anomaly. However, the information processing in the battery management system 100 is not limited to the present embodiment. In another embodiment, the management server 120 may execute at least one of these information processing.

Figure 12:
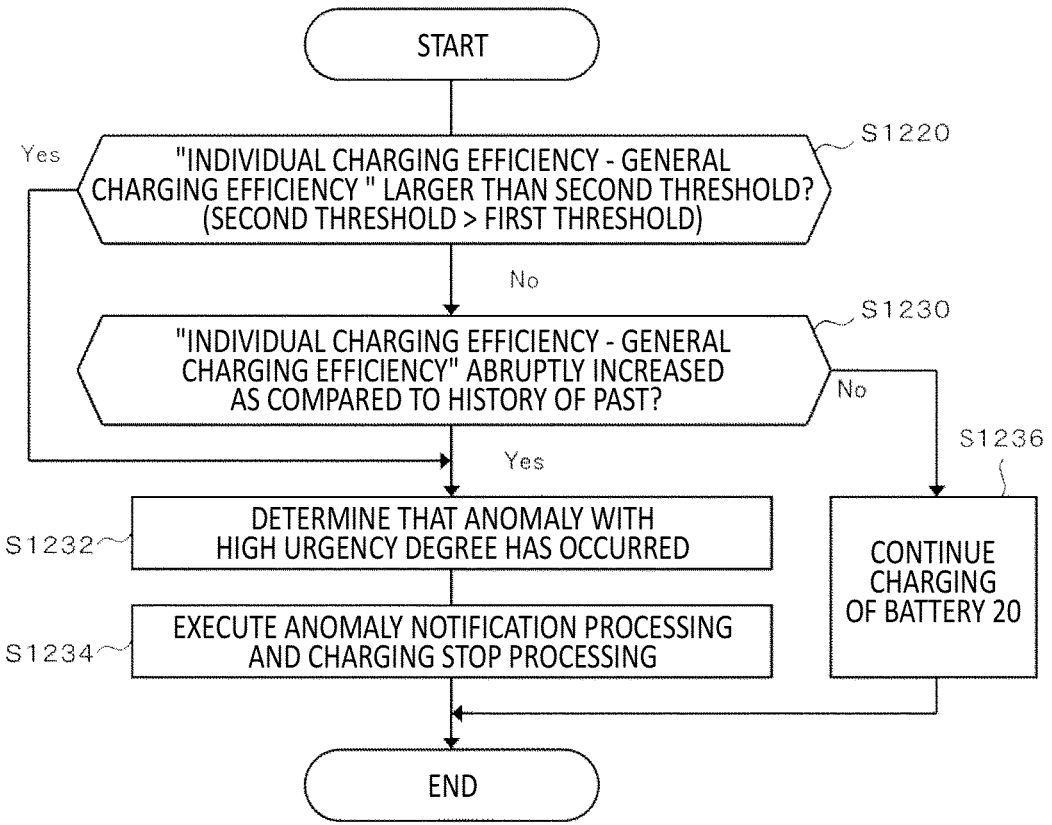
FIG. 12 schematically illustrates an example of anomaly handling processing.

FIG. 12 schematically illustrates an example of the anomaly handling processing. Using FIG. 12, another example of the anomaly handling processing described in relation to S1134 of FIG. 11 will be described. According to the present embodiment, first, in S1220, it is judged whether the result of the comparison between the individual charging efficiency and the general charging efficiency satisfies a predetermined condition (may be referred to as a second anomaly condition). Specifically, the efficiency judgment unit 1066 compares a magnitude relationship between the value obtained by subtracting the general charging efficiency from the individual charging efficiency and a second threshold. The second threshold may be a value larger than the first threshold. For example, the first threshold is 5%, and the second threshold is 10%.

When the value obtained by subtracting the general charging efficiency from the individual charging efficiency is larger than the second threshold (the case of Yes in S1220), it is determined that an anomaly with a high urgency degree has occurred in S1232. Examples of the anomaly with a high urgency degree include (i) a case where foreign matter inclusion has occurred at the connection portion 490 between the power connector 22 and the power connector 352, (ii) a case where a degree of bending or breakage of at least one of the power connector 22 or the power connector 352 is large, and thus the power connector 22 and the power connector 352 cannot be attached normally, and the like.

Specifically, the efficiency judgment unit 1066 outputs, to the connection anomaly detection unit 862, information representing a comparison result indicating that the value obtained by subtracting the general charging efficiency from the individual charging efficiency is larger than the second threshold. The connection anomaly detection unit 862 determines that an anomaly has occurred at the connection portion 490 between the power connector 22 and the power connector 352 based on the above-described comparison result. Moreover, the connection anomaly detection unit 862 determines that the degree of an anomaly is larger than a predetermined degree. The connection anomaly detection unit 862 may estimate the type of an anomaly.

In 51234, the connection anomaly detection unit 862 outputs, to the control signal output unit 864 and the message output unit 866, information related to the above-described anomaly caused at the connection portion 490 between the power connector 22 and the power connector 352. The above-described information related to the anomaly may include information related to the degree of an anomaly. The above-described information related to the anomaly may include information related to the type of an anomaly. The connection anomaly detection unit 862 may also transmit the above-described information related to the anomaly to the management server 120.

When the control signal output unit 864 receives the above-described information related to the anomaly, the control signal output unit 864 outputs, to the charge/discharge control unit 244, a control signal for prohibiting or suppressing the input/output of electrical power via the power connector 22 and the power connector 352. The charge/discharge control unit 244 stops charging of the battery 20 based on the above-described control signal. Similarly, when the message output unit 866 receives the above-described information representing that an anomaly has occurred, the message output unit 866 outputs a message indicating that an anomaly has occurred in the connection state between the battery 20 and the slot 112. Moreover, when the management server 120 receives the above-described information representing that an anomaly has occurred, the management server 120 generates the maintenance and repair/maintenance information described above. Accordingly, the processing ends.

On the other hand, when the value obtained by subtracting the general charging efficiency from the individual charging efficiency is smaller than the second threshold (the case of No in S1220), it is judged whether the value obtained by subtracting the general charging efficiency from the individual charging efficiency has increased abruptly as compared to the history of the past in S1230. Specifically, the efficiency judgment unit 1066 compares the history of the past regarding the result of the comparison between the individual charging efficiency and the general charging efficiency with the comparison result obtained this time. For example, the efficiency judgment unit 1066 references the history storage unit 924 and extracts a comparison result of the past related to the slot 112 that is a target of the current judgment processing. The efficiency judgment unit 1066 may calculate a statistical value of the comparison results of the past. The efficiency judgment unit 1066 compares the extracted comparison result of the past or a statistical value thereof with the comparison result obtained this time.

When a difference between the comparison result obtained this time and the extracted comparison result of the past or a statistical value thereof satisfies a predetermined condition, it is judged that the value obtained by subtracting the general charging efficiency from the individual charging efficiency has increased abruptly as compared to the history of the past. An example of the predetermined condition is a condition of being larger than a predetermined value. For example, when the value obtained by subtracting the general charging efficiency from the individual charging efficiency is 8% in the comparison of this time, and an average value of values each obtained by subtracting the general charging efficiency from the individual charging efficiency in the past comparison is 1%, the efficiency judgment unit 1066 judges that the value obtained by subtracting the general charging efficiency from the individual charging efficiency has increased abruptly as compared to the history of the past.

When it is judged that the value obtained by subtracting the general charging efficiency from the individual charging efficiency has increased abruptly as compared to the history of the past (the case of Yes in S1230), it is judged that an anomaly with a high urgency degree has occurred, and the processing of S1232 and 51234 described above is executed.

On the other hand, when it is not judged that the value obtained by subtracting the general charging efficiency from the individual charging efficiency has increased abruptly as compared to the history of the past (the case of No in S1230), it is judged that an anomaly with a high urgency degree has not occurred. As a result, in 51236, continuance of charging of the battery 20 is determined. Specifically, processing similar to that of S1132 described in relation to FIG. 11 is executed. Accordingly, the processing ends.

Figure 13:
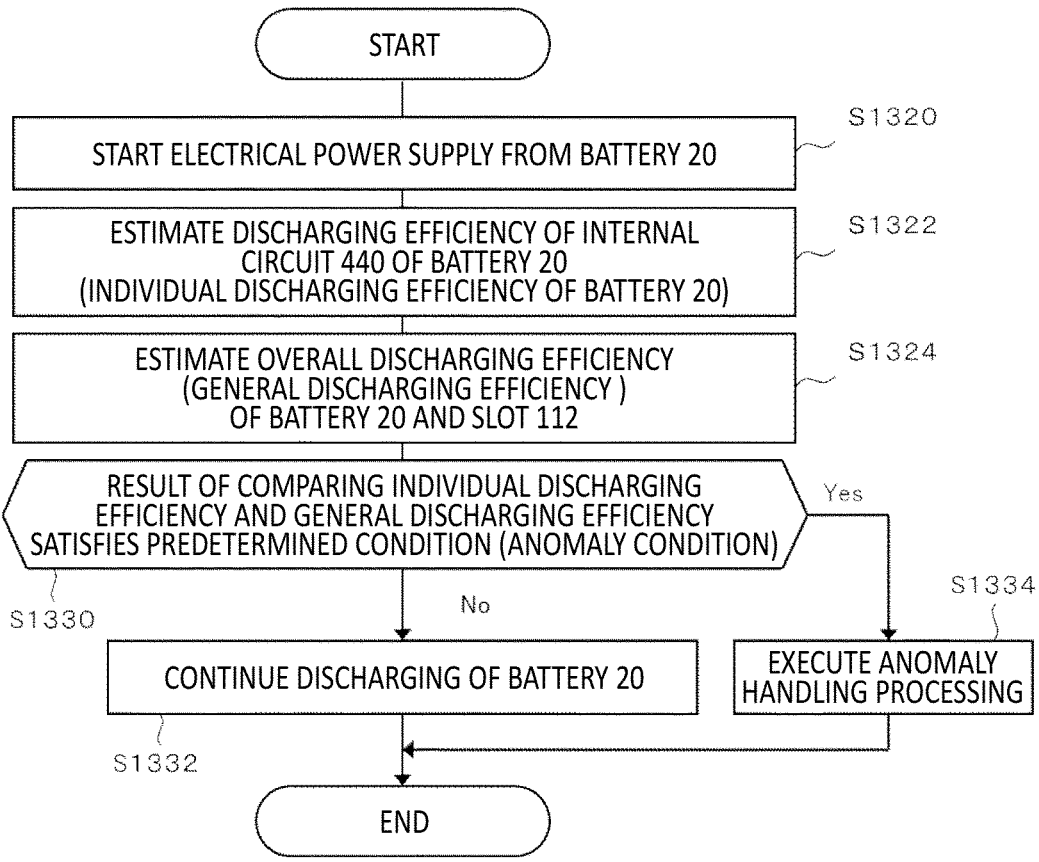
FIG. 13 schematically illustrates an example of information processing performed during discharging in the connection management unit 840.

FIG. 13 schematically illustrates an example of information processing performed during discharging in the connection management unit 840. In the present embodiment, the information processing performed during discharging will be described while taking a case where electrical power is supplied from the battery 20 to the slot 112 as an example. However, the information processing performed during discharging is not limited to the present embodiment. Similar information processing may be executed also when electrical power is supplied from the battery 20 to the electric motorbike 34.

According to the present embodiment, first, in 51320, an electrical power supply from the battery 20 to the slot 112 is started.

Next, in 51322, discharging efficiency of the internal circuit 440 of the battery 20 (may be referred to as the individual discharging efficiency) is estimated. The individual discharging efficiency may be individual exchange efficiency obtained during discharging of the battery 20. The individual discharging efficiency of the battery 20 is estimated by a procedure similar to that of S1122, for example.

Next, in 51324, an overall discharging efficiency (may be referred to as a general discharging efficiency) of the battery 20 and the slot 112 is estimated. The general discharging efficiency may be general exchange efficiency obtained during discharging. The general discharging efficiency of the battery 20 and the slot 112 is estimated by a procedure similar to that of S1124, for example.

Next, in S1330, it is judged whether the result of the comparison between the individual discharging efficiency and the general discharging efficiency satisfies a predetermined condition (may be referred to as a third anomaly condition). Specifically, the efficiency judgment unit 1066 compares a magnitude relationship between a value obtained by subtracting the general discharging efficiency from the individual discharging efficiency and a third threshold. Since the value of the general discharging efficiency is usually smaller than the value of the individual discharging efficiency, the value obtained by subtracting the general discharging efficiency from the individual discharging efficiency becomes a positive value.

When the value obtained by subtracting the general discharging efficiency from the individual discharging efficiency is smaller than the third threshold (the case of No in S1330), continuance of discharging of the battery 20 is determined in S1332. Specifically, processing similar to that of S1132 is executed. Accordingly, the processing ends.

On the other hand, when the value obtained by subtracting the general discharging efficiency from the individual discharging efficiency is larger than the third threshold (the case of Yes in S1330), the anomaly handling processing is executed in S1334. Specifically, processing similar to that of S1134 is executed. Accordingly, the processing ends.

Figure 14:
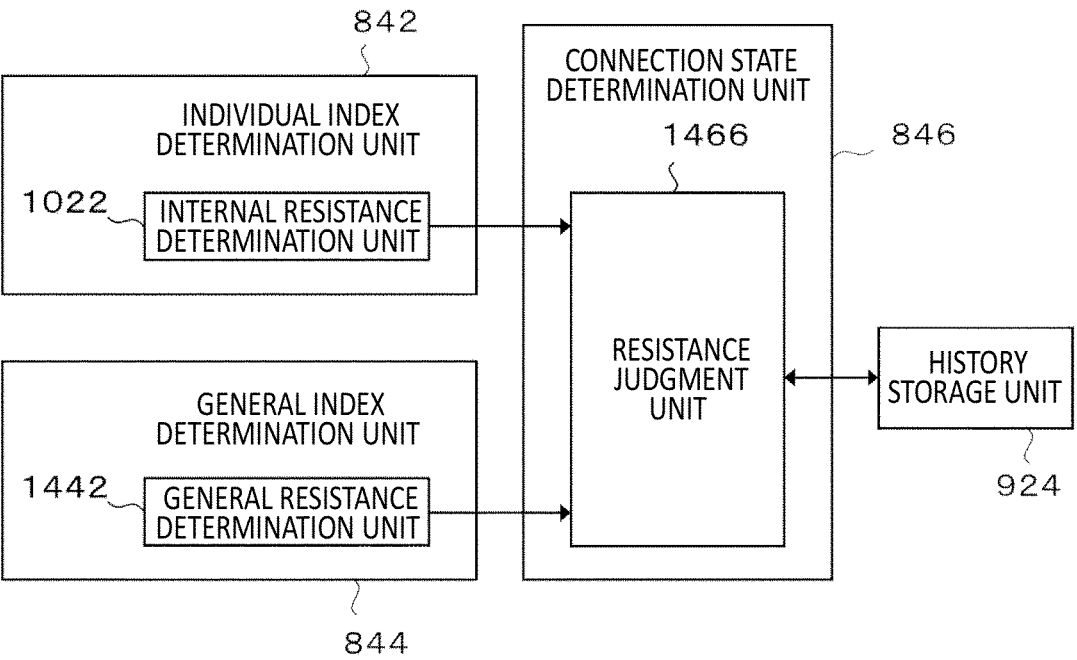
FIG. 14 schematically illustrates another example of the internal configuration of each unit of the connection management unit 840.

FIG. 14 schematically illustrates another example of the internal configuration of each unit of the connection management unit 840. In the present embodiment, the individual index determination unit 842 includes an internal resistance determination unit 1022. In the present embodiment, the general index determination unit 844 includes a general resistance determination unit 1442. In the present embodiment, the connection state determination unit 846 includes a resistance judgment unit 1466.

In the present embodiment, the general resistance determination unit 1442 determines a value of resistance of a circuit including the power connector 22, the power connector 352, and the internal circuit 440 (may be referred to as general resistance) obtained when input/output of electrical power is performed between the battery 20 and the slot 112 in a state where the power connector 22 and the power connector 352 are attached to each other. The general resistance may be an example of the general index.

In the present embodiment, the resistance judgment unit 1466 judges an electrical connection state between the battery 20 and the slot 112. The value of the internal resistance R of the battery 20 determined by the internal resistance determination unit 1022 and the value of the general resistance determined by the general resistance determination unit 1442 are compared. Note that the value of the general resistance determined by the general resistance determination unit 1442 is usually larger than the value of the internal resistance R of the battery 20 determined by the internal resistance determination unit 1022. The resistance judgment unit 1466 judges the electrical connection state between the battery 20 and the slot 112 based on the above-described comparison result. More specifically, the resistance judgment unit 1466 judges the electrical connection state between the battery 20 and the slot 112 based on a difference between the value of the general resistance determined by the general resistance determination unit 1442 and the value of the internal resistance R of the battery 20 determined by the internal resistance determination unit 1022. The resistance judgment unit 1466 may judge the electrical connection state between the battery 20 and the slot 112 by information processing similar to that of the efficiency judgment unit 1066.

As the difference between the value of the general resistance determined by the general resistance determination unit 1442 and the value of the internal resistance R of the battery 20 determined by the internal resistance determination unit 1022 becomes larger, a difference between the individual exchange efficiency determined by the individual efficiency determination unit 1062 and the general exchange efficiency determined by the general efficiency determination unit 1064 also becomes larger. Moreover, as the difference between the value of the general resistance determined by the general resistance determination unit 1442 and the value of the internal resistance R of the battery 20 determined by the internal resistance determination unit 1022 becomes smaller, the difference between the individual exchange efficiency determined by the individual efficiency determination unit 1062 and the general exchange efficiency determined by the general efficiency determination unit 1064 also becomes smaller. Using the above-described property, the resistance judgment unit 1466 can judge the electrical connection state between the battery 20 and the slot 112 by information processing similar to that of the efficiency judgment unit 1066.

Figure 15:
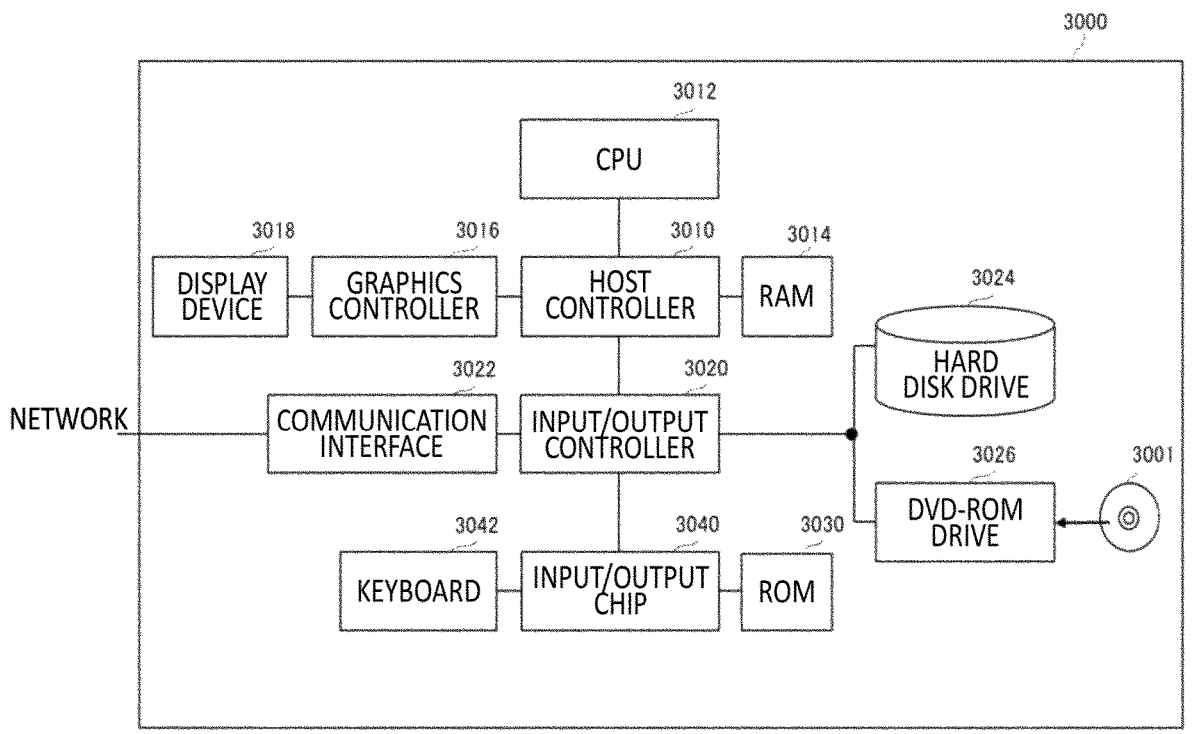
FIG. 15 schematically illustrates an example of a system configuration of a computer 3000.

FIG. 15 illustrates an example of a computer 3000 in which a plurality of embodiments of the present invention may be entirely or partly realized. A part of the battery management system 100 may be realized by the computer 3000.

According to one embodiment, for example, at least a part of the battery station 110 is realized by the computer 3000. At least a part of the station control unit 240 may be realized by the computer 3000, at least a part of the state management unit 246 may be realized by the computer 3000, or at least a part of the slot control unit 370 may be realized by the computer 3000. According to another embodiment, for example, at least a part of the management server 120 is realized by the computer 3000. At least a part of the station management unit 510 may be realized by the computer 3000, or at least a part of the station management unit 710 may be realized by the computer 3000.

A program that is installed in the computer 3000 can cause the computer 3000 to perform an operation associated with an apparatus according to the embodiment of the present invention or to function as one or more "units" of the apparatus, or cause the computer 3000 to perform the operation or the one or more units thereof, and/or cause the computer 3000 to perform processes according to the embodiment of the present invention or steps of the processes. Such a program may be performed by the CPU 3012 to cause the computer 3000 to perform particular operations associated with some or all of the blocks of flowcharts and block diagrams described herein.

The computer 3000 according to the present embodiment includes the CPU 3012, a RAM 3014, a GPU 3016, and a display device 3018, which are mutually connected by a host controller 3010. The computer 3000 also includes an input/output unit such as a communication interface 3022, a hard disk drive 3024, a DVD-ROM drive 3026, and an IC card drive, which are connected to the host controller 3010 via the input/output controller 3020. The computer also includes legacy input/output units such as a ROM 3030 and a keyboard 3042, which are connected to the input/output controller 3020 via an input/output chip 3040.

The CPU 3012 operates according to programs stored in the ROM 3030 and the RAM 3014, thereby controlling each unit. The GPU 3016 acquires image data generated by the CPU 3012 on a frame buffer or the like provided in the RAM 3014 or in itself, and causes the image data to be displayed on the display device 3018.

The communication interface 3022 communicates with other electronic devices via a network. The hard disk drive 3024 stores programs and data that are used by the CPU 3012 within the computer 3000. The DVD-ROM drive 3026 reads the programs or the data from the DVD-ROM 3001, and provides the hard disk drive 3024 with the programs or the data via the RAM 3014. The IC card drive reads programs and data from an IC card and/or writes programs and data into the IC card.

The ROM 3030 stores therein a boot program or the like that is performed by the computer 3000 at the time of activation, and/or a program depending on the hardware of the computer 3000. The input/output chip 3040 may also connect various input/output units to the input/output controller 3020 via a parallel port, a serial port, a keyboard port, a mouse port, or the like.

A program is provided by a computer-readable storage medium, such as the DVD-ROM 3001 or the IC card. The program is read from the computer-readable storage medium, installed into the hard disk drive 3024, RAM 3014, or ROM 3030, which are also examples of the computer-readable storage medium, and performed by the CPU 3012. The information processing described in these programs is read into the computer 3000, resulting in cooperation between a program and the above-described various types of hardware resources. An apparatus or method may be constituted by realizing the operation or processing of information in accordance with the usage of the computer 3000.

For example, when communication is performed between the computer 3000 and an external device, the CPU 3012 may execute a communication program loaded onto the RAM 3014 to instruct communication processing to the communication interface 3022, based on the processing described in the communication program. The communication interface 3022, under the control of the CPU 3012, reads the transmission data stored in the transmission buffer area provided in the recording medium such as the RAM 3014, hard disk drive 3024, DVD-ROM 3001, or IC card, and transmits the read transmission data to the network or writes reception data received from the network to the reception buffer area provided on the recording medium.

In addition, the CPU 3012 may cause all or a necessary portion of a file or a database to be read into the RAM 3014, the file or the database having been stored in an external recording medium such as the hard disk drive 3024, the DVD-ROM drive 3026 (DVD-ROM 3001), the IC card, etc., and perform various types of processing on the data on the RAM 3014. The CPU 3012 may then write back the processed data to the external recording medium.

Various types of information such as various types of programs, data, tables, and databases may be stored in a recording medium and subjected to information processing. The CPU 3012 may perform various types of processing on the data read from the RAM 3014, which includes various types of operations, information processing, condition judging, conditional branch, unconditional branch, search/replacement of information, etc., as described throughout this disclosure and designated by a command sequence of programs, and writes the result back to the RAM 3014. In addition, the CPU 3012 may search for information in a file, a database, etc., in the recording medium. For example, when a plurality of entries, each having an attribute value of a first attribute associated with an attribute value of a second attribute, are stored in the recording medium, the CPU 3012 may search for an entry whose attribute value of the first attribute matches a designated condition, from among the plurality of entries, and read the attribute value of the second attribute stored in the entry, thereby obtaining the attribute value of the second attribute associated with the first attribute satisfying the predetermined condition.

The above described program or software modules may be stored in the computer-readable storage medium on or near the computer 3000. In addition, a recording medium such as a hard disk or a RAM provided in a server system connected to a dedicated communication network or the Internet can be used as the computer-readable storage medium, thereby providing the program to the computer 3000 via the network.

The flowchart and the blocks in the block diagrams according to the present embodiment may represent a step of a process in which an operation is performed or a "unit" of an apparatus which has a role of performing an operation. A specific step and "unit" may be implemented by dedicated circuitry, programmable circuitry supplied along with a computer-readable instruction stored on a computer-readable storage medium, and/or a processor supplied along with the computer-readable instruction stored on the computer-readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer-readable storage medium may include any tangible device capable of storing an instruction performed by an appropriate device, so that the computer-readable storage medium having the instruction stored thereon constitutes a product including an instruction that may be performed in order to provide means for performing an operation specified by a flowchart or a block diagram. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

The computer-readable instruction may be provided to a general purpose computer, a special purpose computer, or a processor or programmable circuitry of another programmable data processing apparatus locally or via a local area network (LAN), a wide area network (WAN) such as the Internet or the like in order that the general purpose computer, the special purpose computer, or the processor or the programmable circuitry of the other programmable data processing apparatus performs the computer-readable instruction to provide means for performing operations specified by the flowchart or the block diagram. An example of the processor includes a computer processor, processing unit, microprocessor, digital signal processor, controller, microcontroller, or the like.

While the present invention has been described with the embodiments, the technical scope of the present invention is not limited to the above-described embodiments. It is apparent to persons skilled in the art that various alterations and improvements can be added to the above-described embodiments. In addition, the matters described with regard to the particular embodiment can be applied to other embodiments with a range without causing technical contradictions. It is also apparent from the scope of the claims that the embodiments added with such alterations or improvements can be included in the technical scope of the present invention.

Note that the operations, procedures, steps, and stages of each process performed by an device, system, program, and method shown in the claims, embodiments, or diagrams can be performed in any order as long as the order is not indicated by "prior to," "before," or the like and as long as the output from a previous process is not used in a later process. Even if the operation flow is described by using phrases such as "first" or "next" in the scope of the claims, specification, or drawings, it does not necessarily mean that the process must be performed in this order.

For example, the specification of the present application discloses the following matters.

[Item A-1] A management device which manages an electrical connection state between a first electrical power device including a first terminal and an internal circuit electrically connected to the first terminal and a second electrical power device which includes a second terminal provided to be attachable to the first terminal and exchanges electrical power with the first electrical power device via the first terminal and the second terminal, the management device including:

an individual index determination unit which determines a value of an individual index which is an index representing a degree of individual exchange efficiency which is a ratio of an electrical power amount exchanged by the internal circuit to an electrical power amount exchanged by the first terminal;

a general index determination unit which determines a value of a general index which is an index representing a degree of general exchange efficiency which is a ratio of an electrical power amount exchanged by the first electrical power device to an electrical power amount exchanged by the second electrical power device; and a connection state determination unit which determines the electrical connection state between the first electrical power device and the second electrical power device based on the value of the individual index determined by the individual index determination unit and the value of the general index determined by the general index determination unit.

[Item A-2] The management device according to Item A-1, in which the electrical connection state is at least one of a state related to electric characteristics of the first terminal, a state related to electric characteristics of the second terminal, or a connection state between the first terminal and the second terminal.

[Item A-3] The management device according to Item A-1 or A-2, in which the connection state determination unit includes:

an individual efficiency determination unit which determines the individual exchange efficiency based on the value of the individual index determined by the individual index determination unit;

a general efficiency determination unit which determines the general exchange efficiency based on the value of the general index determined by the general index determination unit; and an efficiency judgment unit which compares the individual exchange efficiency determined by the individual efficiency determination unit and the general exchange efficiency determined by the general efficiency determination unit, and judges the electrical connection state between the first electrical power device and the second electrical power device based on a result of the comparison.

[Item A-4] The management device according to Item A-3, in which the general index determination unit includes:

a first acquisition unit which acquires a first input/output electrical power amount of the first electrical power device, which is an input/output electrical power amount more on a side of the first electrical power device than the first terminal; and a second acquisition unit which acquires a second input/output electrical power amount of the second electrical power device, which is an input/output electrical power amount more on a side of the second electrical power device than the second terminal, in which the general efficiency determination unit determines the general exchange efficiency based on the first input/output electrical power amount acquired by the first acquisition unit and the second input/output electrical power amount acquired by the second acquisition unit.

[Item A-5] The management device according to Item A-3 or A-4, in which the individual index determination unit includes an internal resistance determination unit which determines a value of internal resistance which is resistance of the internal circuit of the first electrical power device obtained when input/output of electrical power is performed between the first electrical power device and the second electrical power device in a state where the first terminal and the second terminal are attached to each other, in which the individual efficiency determination unit determines the individual exchange efficiency based on the value of the internal resistance determined by the internal resistance determination unit.

[Item A-6] The management device according to Item A-3 or A-4, in which the individual index determination unit includes an internal resistance determination unit which determines a value of internal resistance which is resistance of the internal circuit of the first electrical power device obtained when input/output of electrical power is performed between the first electrical power device and the second electrical power device in a state where the first terminal and the second terminal are attached to each other, The management device according to Item A-3, in which the general index determination unit includes:

a general resistance determination unit which determines a value of general resistance which is resistance of a circuit including the second terminal, the first terminal, and the internal circuit obtained when input/output of electrical power is performed between the first electrical power device and the second electrical power device in a state where the first terminal and the second terminal are attached to each other, and The management device according to Item A-1 or A-2, in which the connection state determination unit includes:

a resistance judgment unit which compares the value of the internal resistance determined by the internal resistance determination unit and the value of general resistance determined by the general resistance determination unit, and judges the electrical connection state between the first electrical power device and the second electrical power device based on a result of the comparison.

[Item A-7] A management method for managing an electrical connection state between a first electrical power device including a first terminal and an internal circuit electrically connected to the first terminal and a second electrical power device which includes a second terminal provided to be attachable to the first terminal and exchanges electrical power with the first electrical power device via the first terminal and the second terminal, the management method including:

an individual index determination step of determining a value of an individual index which is an index representing a degree of individual exchange efficiency which is a ratio of an electrical power amount exchanged by the internal circuit to an electrical power amount exchanged by the first terminal;

a general index determination step of determining a value of a general index which is an index representing a degree of general exchange efficiency which is a ratio of an electrical power amount exchanged by the first electrical power device to an electrical power amount exchanged by the second electrical power device; and a connection state determination step of determining an electrical connection state between the first electrical power device and the second electrical power device based on the value of the individual index determined in the individual index determination step and the value of the general index determined in the general index determination step.

[Item A-8] A program for causing a computer to function as the management device according to any one of Items A-1 to A-6.

[Item A-9] A computer-readable recording medium having recorded thereon the program according to Item A-8.

EXPLANATION OF REFERENCES

10: communication network; 20: battery; 22: power connector; 24: communication connector, 30: user, 32: communication terminal; 34: electric motorbike; 40: slot; 42: power connector; 44: communication connector; 50: motorbike control unit; 100: battery management system; 110: battery station; 112: slot; 120: management server; 220: distribution board; 240: station control unit; 242: communication control unit; 244: charge/discharge control unit; 246: state management unit; 248: lending management unit; 250: data storage unit; 310: housing; 312: battery accommodation chamber; 320: opening/closing cover; 322: lock member; 330: locking portion; 332: locking member; 334: driving member; 340: battery detection unit; 350: connector; 352: power connector; 354: communication connector; 360: power control circuit; 370: slot control unit; 380: connector; 382: power connector; 384: communication connector; 432: electric terminal; 434: electric terminal; 440: internal circuit; 441: power storage cell; 442: control circuit; 443: wiring; 444: wiring; 446:

current detector; 447: voltage detector; 452: battery management unit; 454: memory; 462: electric terminal; 464: electric terminal; 472: charge/discharge device; 473: wiring; 474: wiring; 476: current detector; 477: voltage detector; 490: connection portion; 510: station management unit; 520: battery management unit; 530: reservation management unit; 540: data storage unit; 542: station information storage unit; 544: battery information storage unit; 546: reservation information storage unit; 610: station information collection unit; 620: maintenance management unit; 622: deterioration estimation unit; 624: repair/maintenance period estimation unit; 626: procurement planning unit; 630: insertion/removal control unit; 710: station management unit; 728: repair/maintenance planning unit; 840: connection management unit; 842: individual index determination unit; 844: general index determination unit; 846: connection state determination unit; 862: connection anomaly detection unit; 864: control signal output unit; 866: message output unit; 922: correspondence relationship storage unit; 924: history storage unit; 1022: internal resistance determination unit; 1042: output electrical power amount acquisition unit; 1044: input electrical power amount acquisition unit; 1062: individual efficiency determination unit; 1064: general efficiency determination unit; 1066: efficiency judgment unit; 1442: general resistance determination unit; 1466: resistance judgment unit; 3000: computer; 3001: DVD-ROM; 3010: host controller; 3012: CPU; 3014: RAM; 3016: GPU; 3018: display device; 3020: input/output controller; 3022: communication interface; 3024: hard disk drive; 3026: DVD-ROM drive; 3030: ROM; 3040: input/output chip; 3042: keyboard.

What is claimed is:

1. A comparison system, comprising:
a first acquisition unit which acquires a first electrical power amount of a first electrical power device including a first terminal, the first electrical power amount being an electrical power amount in a first electrical power transmission path provided more on an inner side of the first electrical power device than the first terminal;
a second acquisition unit which acquires a second electrical power amount of a second electrical power device including a second terminal provided to be attachable to the first terminal, the second electrical power amount being an electrical power amount in a second electrical power transmission path provided more on an inner side of the second electrical power device than the second terminal; and
a comparison unit which compares the first electrical power amount acquired by the first acquisition unit and the second electrical power amount acquired by the second acquisition unit when input/output of electrical power is performed between the first electrical power device and the second electrical power device in a state where the first terminal and the second terminal are attached to each other,
wherein
the comparison unit is configured to be capable of communicating with a handling unit which performs, based on a result of the comparison between the first electrical power amount and the second electrical power amount, at least any one of:

(i) determining that an anomalous change has occurred in at least one of the first terminal, the second terminal, or a connection portion between the first terminal and the second terminal;
(ii) prohibiting or suppressing the input/output of electrical power via the first terminal and the second terminal; or
(iii) outputting information representing that an anomalous change has occurred in at least one of the first terminal, the second terminal, or the connection portion between the first terminal and the second terminal.

2. The comparison system according to claim 1, further comprising:
a storage unit which stores the result of the comparison by the comparison unit,
wherein the handling unit:
(i) determines that an anomalous change has occurred in at least one of the first terminal, the second terminal, or the connection portion between the first terminal and the second terminal based on the result of the comparison by the comparison unit; and
determines a type of the anomalous change based on a plurality of the results of the comparison stored in the storage unit.

3. The comparison system according to claim 2, wherein the handling unit
determines that a sudden anomalous change has occurred at the connection portion between the first terminal and the second terminal when a change degree of a plurality of the results of the comparison stored in the storage unit exceeds a predetermined level.

4. The comparison system according to claim 1, wherein the handling unit:
(i) determines that an anomalous change has occurred in at least one of the first terminal, the second terminal, or the connection portion between the first terminal and the second terminal based on the result of the comparison by the comparison unit; and
further determines a degree of the anomalous change.

5. The comparison system according to claim 4, wherein the handling unit generates, based on the degree of the anomalous change, maintenance and repair/maintenance information including at least one of:
(iv) information representing an arrival of a maintenance or repair/maintenance period of the first terminal or the second terminal; or
(v) information representing a maintenance and repair/maintenance prediction period which is a period during which a maintenance or a repair/maintenance of the first terminal or the second terminal is predicted to be performed.

6. The comparison system according to claim 5, wherein the handling unit generates information to be supplied to a manufacturing plan or a distribution plan of the first terminal or the second terminal based on the maintenance and repair/maintenance information generated by the handling unit.

7. The comparison system according to claim 4, wherein the first electrical power device is a power storage device including a power storage unit,
the second electrical power device is a storing device including a plurality of storing units configured to be capable of storing a plurality of the power storage devices, and
the handling unit selects the power storage device to be provided to a user out of a plurality of the power storage devices or selects the storing unit to receive the power storage device from a user out of a plurality of the storing units, based on the degree of the anomalous change.

8. The comparison system according to claim 7, wherein the handling unit selects the power storage device or the storing unit such that the first terminal, the second terminal, or the connection portion in which the degree of the anomalous change is smaller is used more preferentially than the first terminal, the second terminal, or the connection portion in which the degree the anomalous change is larger.

9. The comparison system according to claim 1, wherein the first electrical power device is a power storage device including a power storage unit, the second electrical power device is a charging device which charges the power storage device, the comparison system further comprises:

an internal resistance determination unit which determines a value of internal resistance of the first electrical power device obtained when input/output of electrical power is performed between the first electrical power device and the second electrical power device in a state where the first terminal and the second terminal are attached to each other; and a charging efficiency estimation unit which estimates a value of charging efficiency of the first electrical power device based on the value of internal resistance of the first electrical power device determined by the internal resistance determination unit, and the handling unit performs, based on the result of the comparison by the comparison unit and a result of the estimation of the charging efficiency of the first electrical power device that has been estimated by the charging efficiency estimation unit, at least any one of:

(i) determining that an anomalous change has occurred in at least one of the first terminal, the second terminal, or the connection portion between the first terminal and the second terminal;

(ii) prohibiting or suppressing the input/output of electrical power via the first terminal and the second terminal; or (iii) outputting the information representing that an anomalous change has occurred in at least one of the first terminal, the second terminal, or the connection portion between the first terminal and the second terminal.

10. The comparison system according to claim 1, wherein the first electrical power amount and the second electrical power amount are each an electrical power amount per unit time.

11. The comparison system according to claim 1, wherein the first acquisition unit acquires the first electrical power amount based on detection values of a current detector and a voltage detector provided in the first electrical power transmission path.

12. The comparison system according to claim 11, wherein the first acquisition unit:

determines internal resistance of the first electrical power device based on the detection values of the current detector and the voltage detector; and acquires the first electrical power amount based on the internal resistance.

13. The comparison system according to claim 11, wherein the first electrical power device includes:

an internal resistance derivation unit which derives internal resistance of the first electrical power device based on detection values of the current detector and the voltage detector; and an internal resistance storage unit which stores information representing a value of the internal resistance derived by the internal resistance derivation unit, and the first acquisition unit:

acquires information representing a value of the internal resistance stored in the internal resistance storage unit; and acquires the first electrical power amount based on the value of the internal resistance acquired from the internal resistance storage unit.

14. The comparison system according to claim 12, wherein the first acquisition unit acquires the first electrical power amount based on information representing a predetermined relationship between the internal resistance and the first electrical power amount.

15. The comparison system according to claim 1, wherein the second acquisition unit acquires the second electrical power amount based on detection values of a current detector and a voltage detector provided in the second electrical power transmission path.

16. An information processing device, comprising:

a reception unit which receives (a) a first electrical power amount of a first electrical power device including a first terminal, the first electrical power amount being acquired by a first acquisition unit which acquires the first electrical power amount which is an electrical power amount in a first electrical power transmission path provided more on an inner side of the first electrical power device than the first terminal, and (b) a second electrical power amount of a second electrical power device including a second terminal provided to be attachable to the first terminal, the second electrical power amount being acquired by a second acquisition unit which acquires the second electrical power amount which is an electrical power amount in a second electrical power transmission path provided more on an inner side of the second electrical power device than the second terminal; and a comparison unit which compares the first electrical power amount acquired by the first acquisition unit and the second electrical power amount acquired by the second acquisition unit when input/output of electrical power is performed between the first electrical power device and the second electrical power device in a state where the first terminal and the second terminal are attached to each other, wherein the comparison unit is configured to be capable of communicating with a handling unit which performs, based on a result of the comparison between the first electrical power amount and the second electrical power amount, at least any one of:

(i) determining that an anomalous change has occurred in at least one of the first terminal, the second terminal, or a connection portion between the first terminal and the second terminal;

(ii) prohibiting or suppressing the input/output of electrical power via the first terminal and the second terminal; or (iii) outputting information representing that an anomalous change has occurred in at least one of the first terminal, the second terminal, or the connection portion between the first terminal and the second terminal.

17. A comparison method, comprising:

when input/output of electrical power is performed between a first electrical power device including a first terminal and a second electrical power device including a second terminal provided to be attachable to the first terminal in a state where the first terminal and the second terminal are attached to each other, acquiring a first electrical power amount which is an electrical power amount in a first electrical power transmission path provided more on an inner side of the first electrical power device than the first terminal;

acquiring a second electrical power amount which is an electrical power amount in a second electrical power transmission path provided more on an inner side of the second electrical power device than the second terminal; and comparing the first electrical power amount and the second electrical power amount, wherein the comparing includes performing, by a handling unit configured to be capable of communicating with the first electrical power device and the second electrical power device, based on a result of the comparison between the first electrical power amount and the second electrical power amount, at least any one of:

(i) determining that an anomalous change has occurred in at least one of the first terminal, the second terminal, or a connection portion between the first terminal and the second terminal;

(ii) prohibiting or suppressing the input/output of electrical power via the first terminal and the second terminal; or (iii) outputting information representing that an anomalous change has occurred in at least one of the first terminal, the second terminal, or the connection portion between the first terminal and the second terminal.

18. A non-transitory computer-readable recording medium having recorded thereon a program for causing a computer to execute:

when input/output of electrical power is performed between a first electrical power device including a first terminal and a second electrical power device including a second terminal provided to be attachable to the first terminal in a state where the first terminal and the second terminal are attached to each other, acquiring a first electrical power amount which is an electrical power amount in a first electrical power transmission path provided more on an inner side of the first electrical power device than the first terminal;

acquiring a second electrical power amount which is an electrical power amount in a second electrical power transmission path provided more on an inner side of the second electrical power device than the second terminal; and comparing the first electrical power amount and the second electrical power amount, wherein the comparing includes performing, by a handling unit configured to be capable of communicating with the first electrical power device and the second electrical power device, based on a result of the comparison between the first electrical power amount and the second electrical power amount, at least any one of:

(i) determining that an anomalous change has occurred in at least one of the first terminal, the second terminal, or a connection portion between the first terminal and the second terminal;

(ii) prohibiting or suppressing the input/output of electrical power via the first terminal and the second terminal; or (iii) outputting information representing that an anomalous change has occurred in at least one of the first terminal, the second terminal, or the connection portion between the first terminal and the second terminal.

* * * * *